(12) United States Patent  (10) Patent No.: US 8,125,719 B2
Aoi  (45) Date of Patent: Feb. 28, 2012

(54) LENS UNIT AND IMAGE CAPTURING DEVICE

(75) Inventor: Yuma Aoi, Ichinomiya (JP)

(73) Assignee: Sanyo Electric Co., Ltd., Osaka (JP)

( * ) Notice: Subject to any disclaimer, the term of this patent is extended or adjusted under 35 U.S.C. 154(b) by 41 days.

(21) Appl. No.: 12/553,320

(22) Filed: Sep. 3, 2009

(65) Prior Publication Data

US 2010/0110562 A1    May 6, 2010

(30) Foreign Application Priority Data

Oct. 30, 2008  (JP) ................. 2008-280307

(51) Int. Cl.
*G02B 9/34* (2006.01)
*G02B 3/02* (2006.01)

(52) U.S. Cl. .......... 359/772; 359/715; 359/771

(58) Field of Classification Search .......... 359/715, 359/716, 771, 772, 779, 784, 785, 786
See application file for complete search history.

(56) References Cited

U.S. PATENT DOCUMENTS 6,909,559 B2 *  6/2005  Nishina .............. 359/772
7,027,236 B2 *  4/2006  Nishina .............. 359/775

FOREIGN PATENT DOCUMENTS

| JP | 2002-228922 | 8/2002 |
| JP | 2003-255222 | 9/2003 |
| JP | 2005-91666  | 4/2005 |
| JP | 2006-309043 | 11/2006 |

* cited by examiner

*Primary Examiner* — David N Spector
(74) *Attorney, Agent, or Firm* — Sheridan Ross P.C.

(57) ABSTRACT

A lens unit includes a first lens having positive power, a second lens having positive power, an aperture stop, a third lens having negative power, and a fourth lens. The first lens, the second lens, the aperture stop, the third lens, and the fourth lens are arranged in order from an object side toward an image side.

14 Claims, 46 Drawing Sheets

Fig.2A
Fig.2B
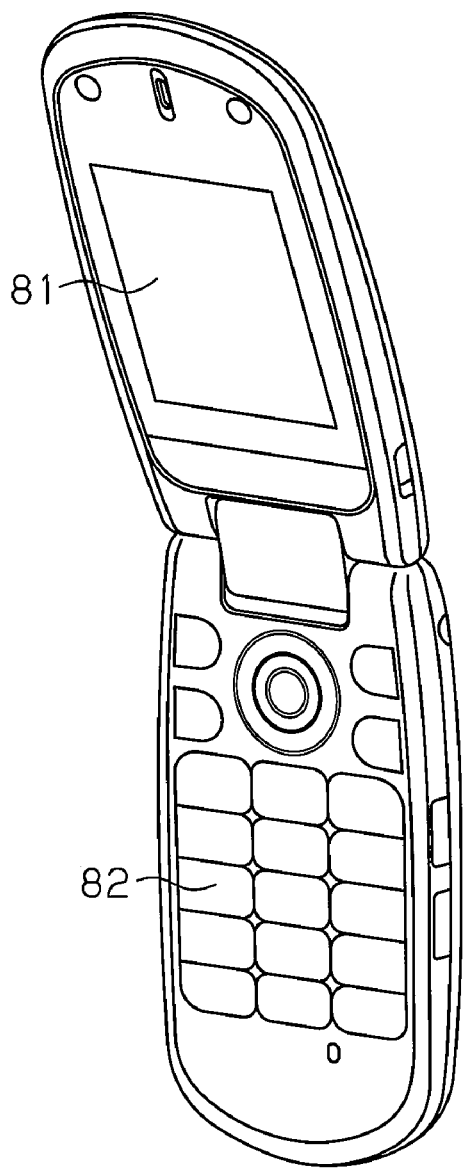
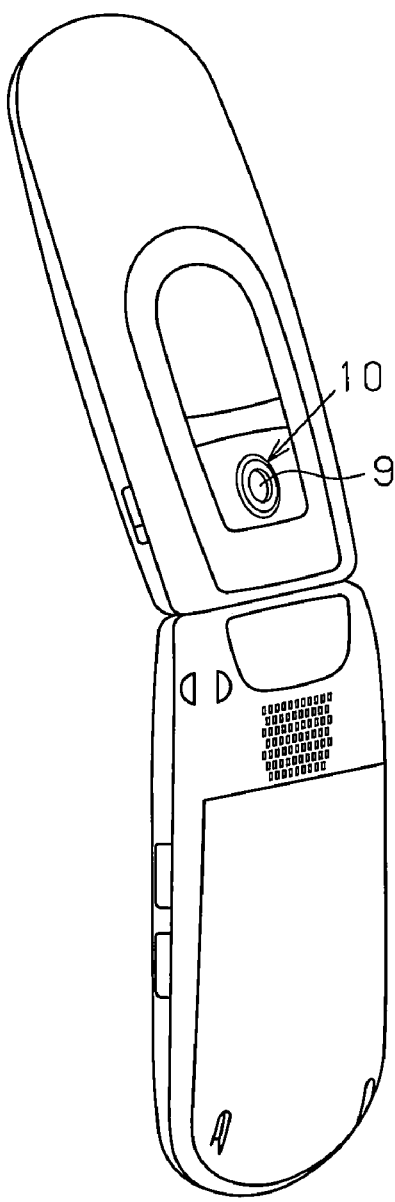

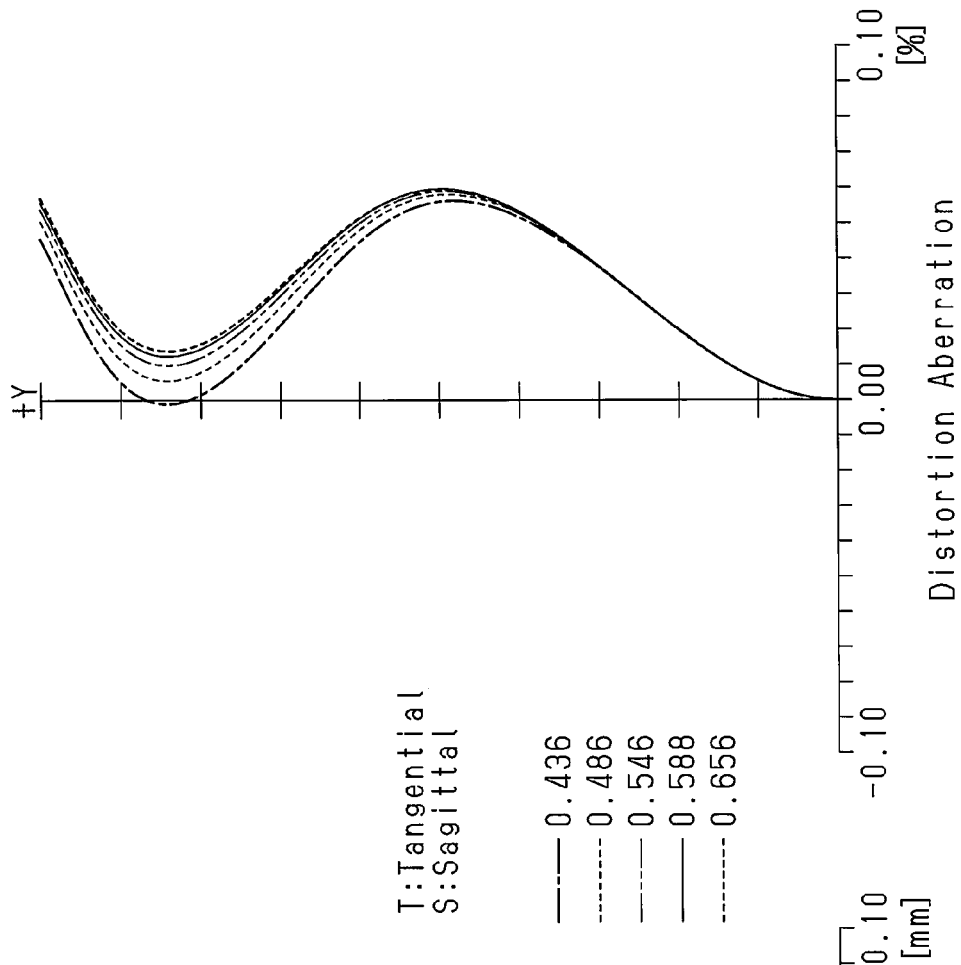
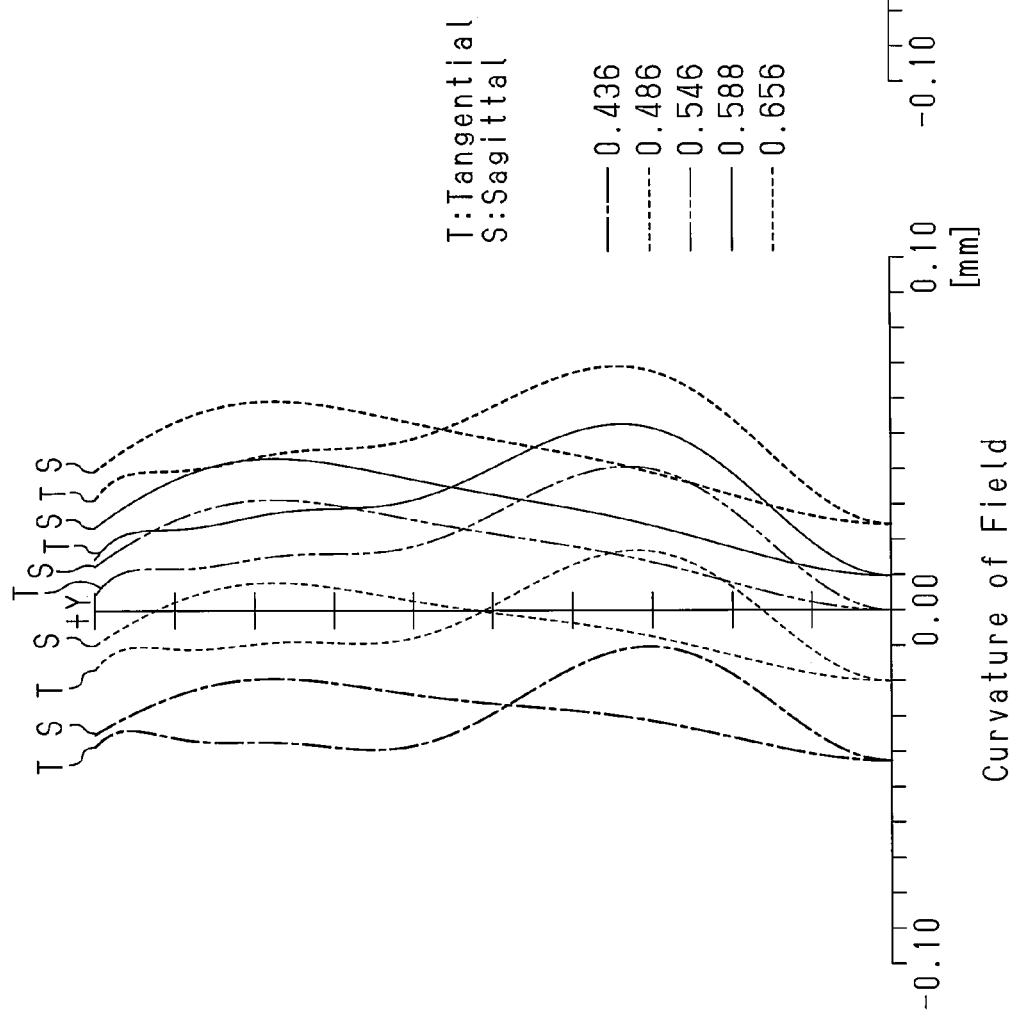

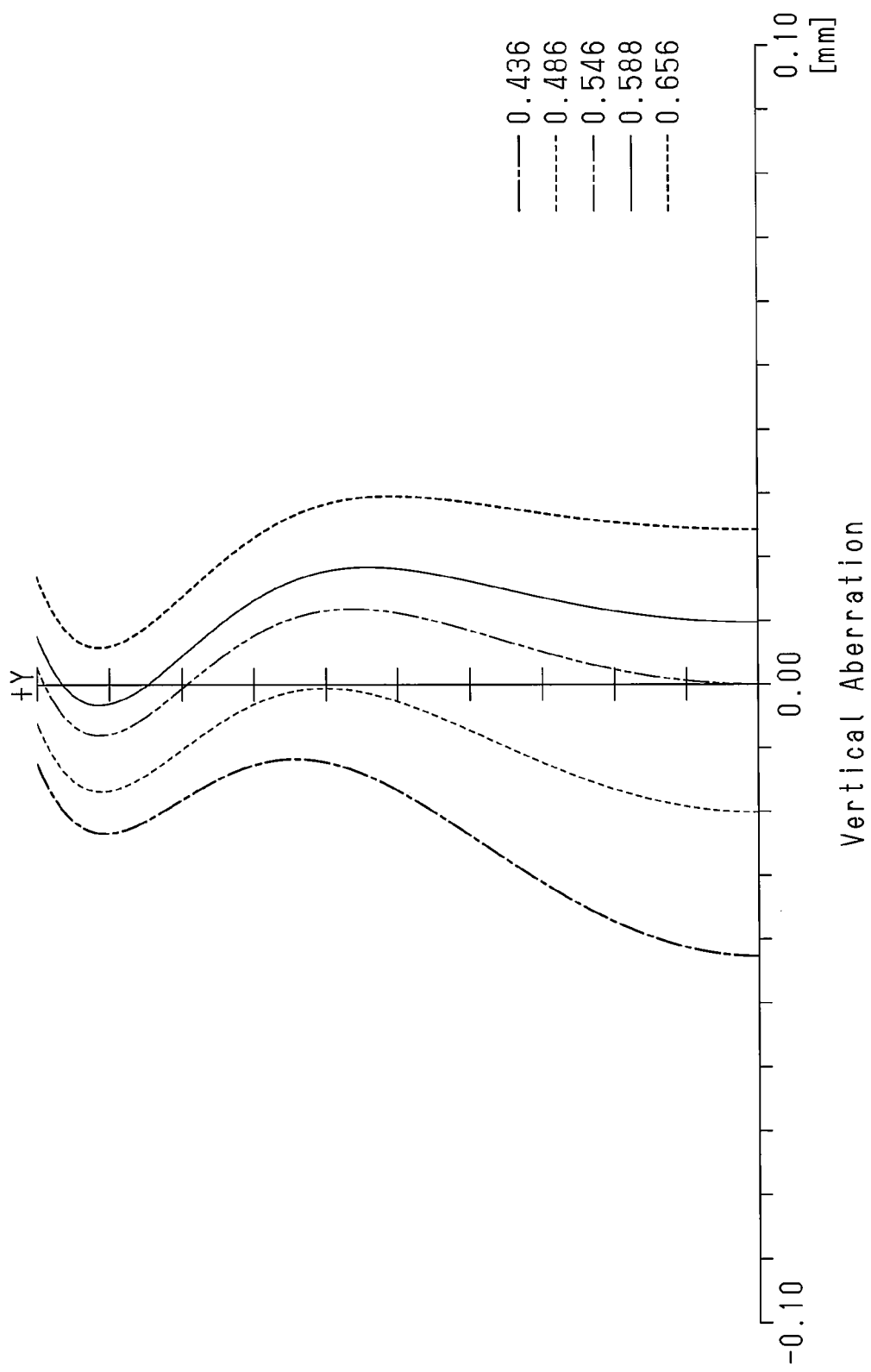

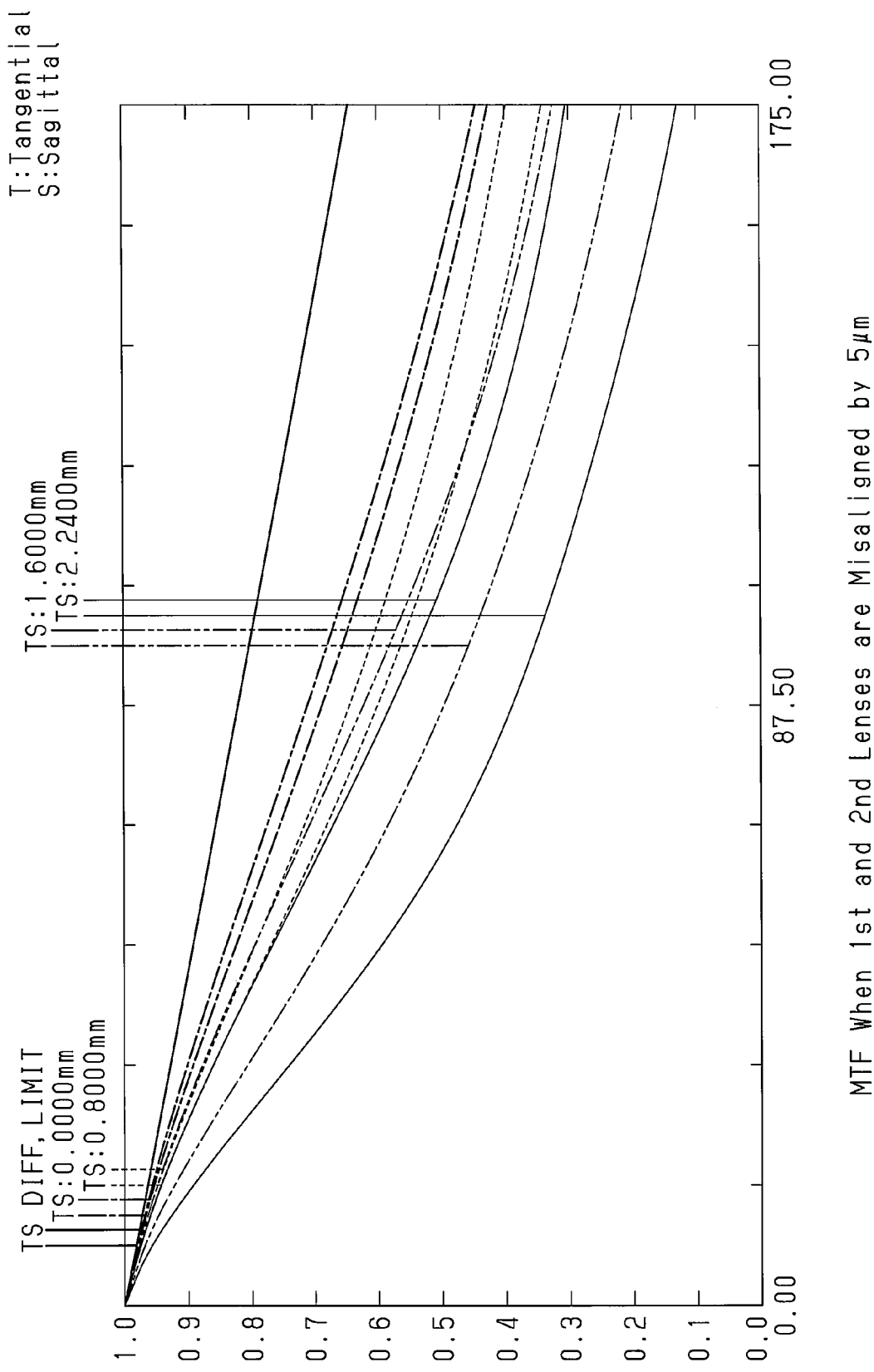

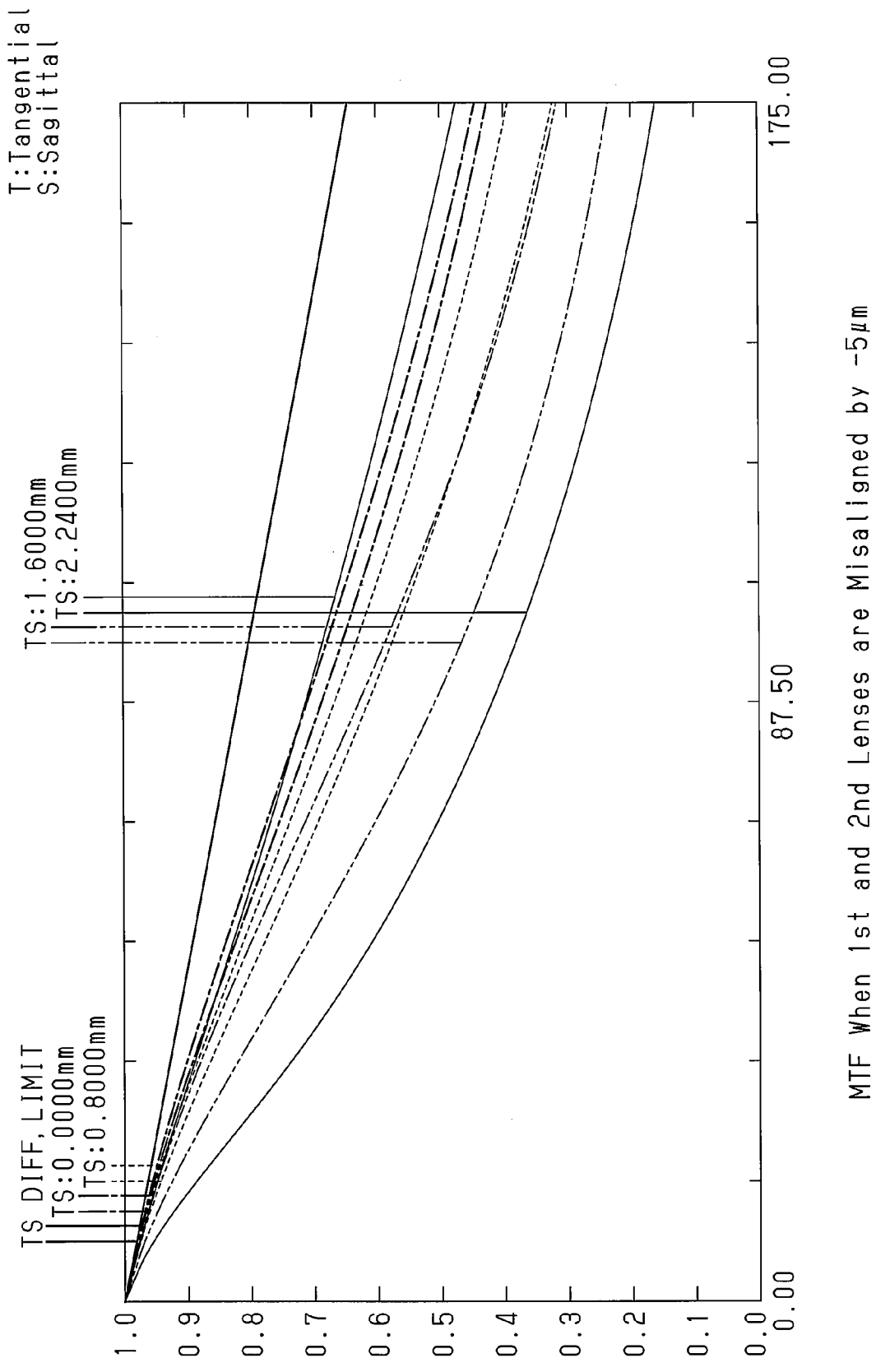

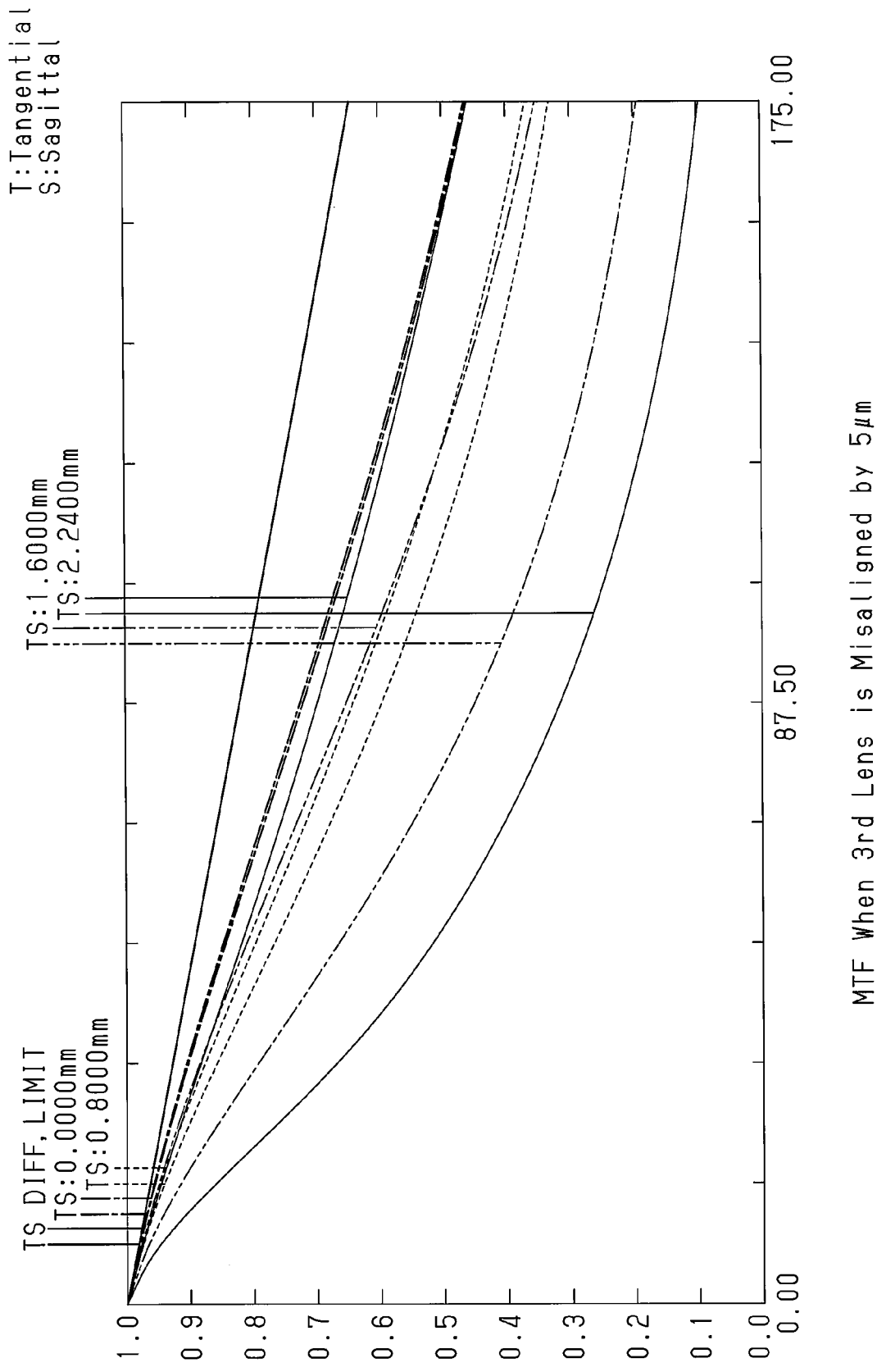

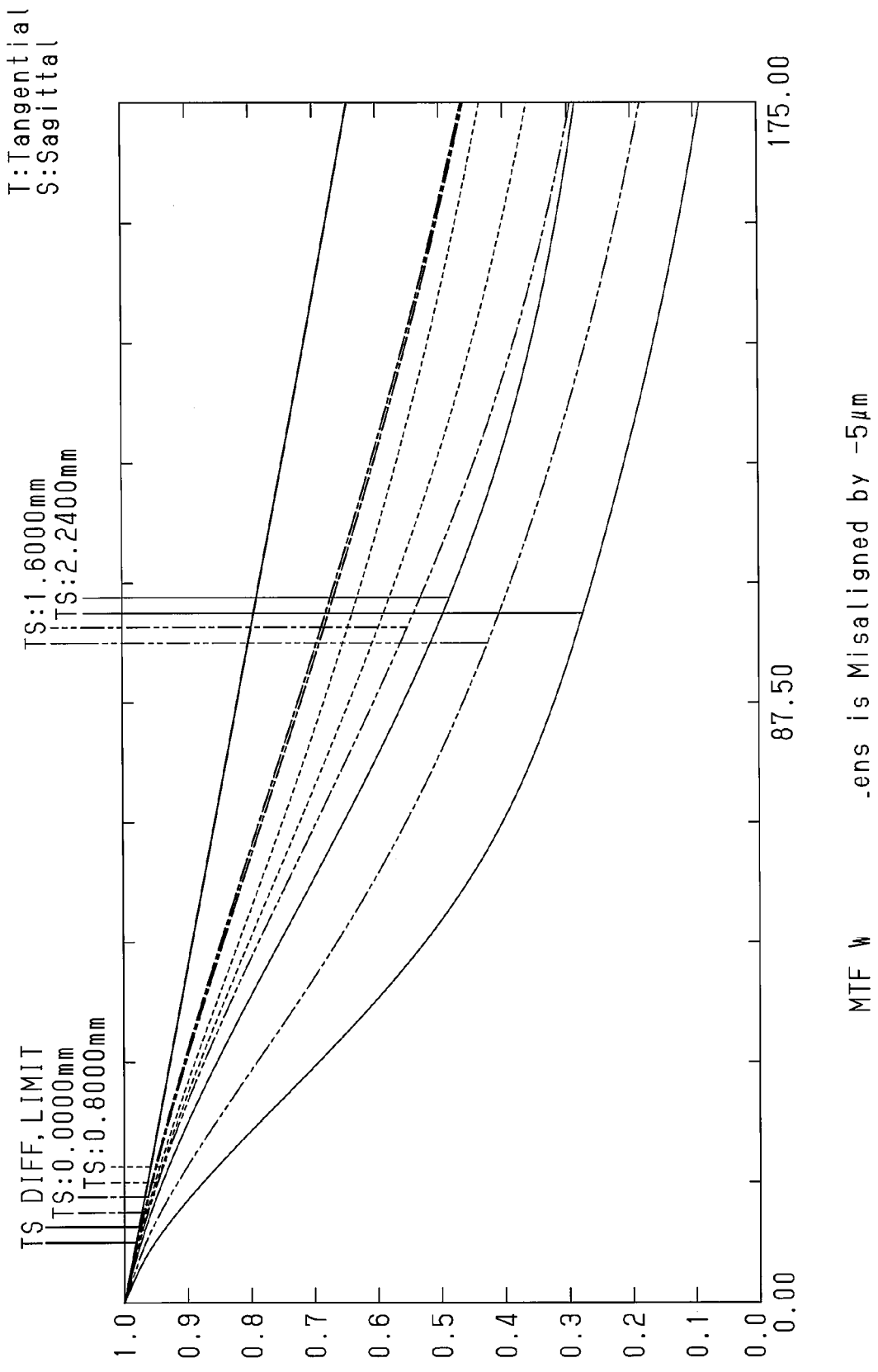

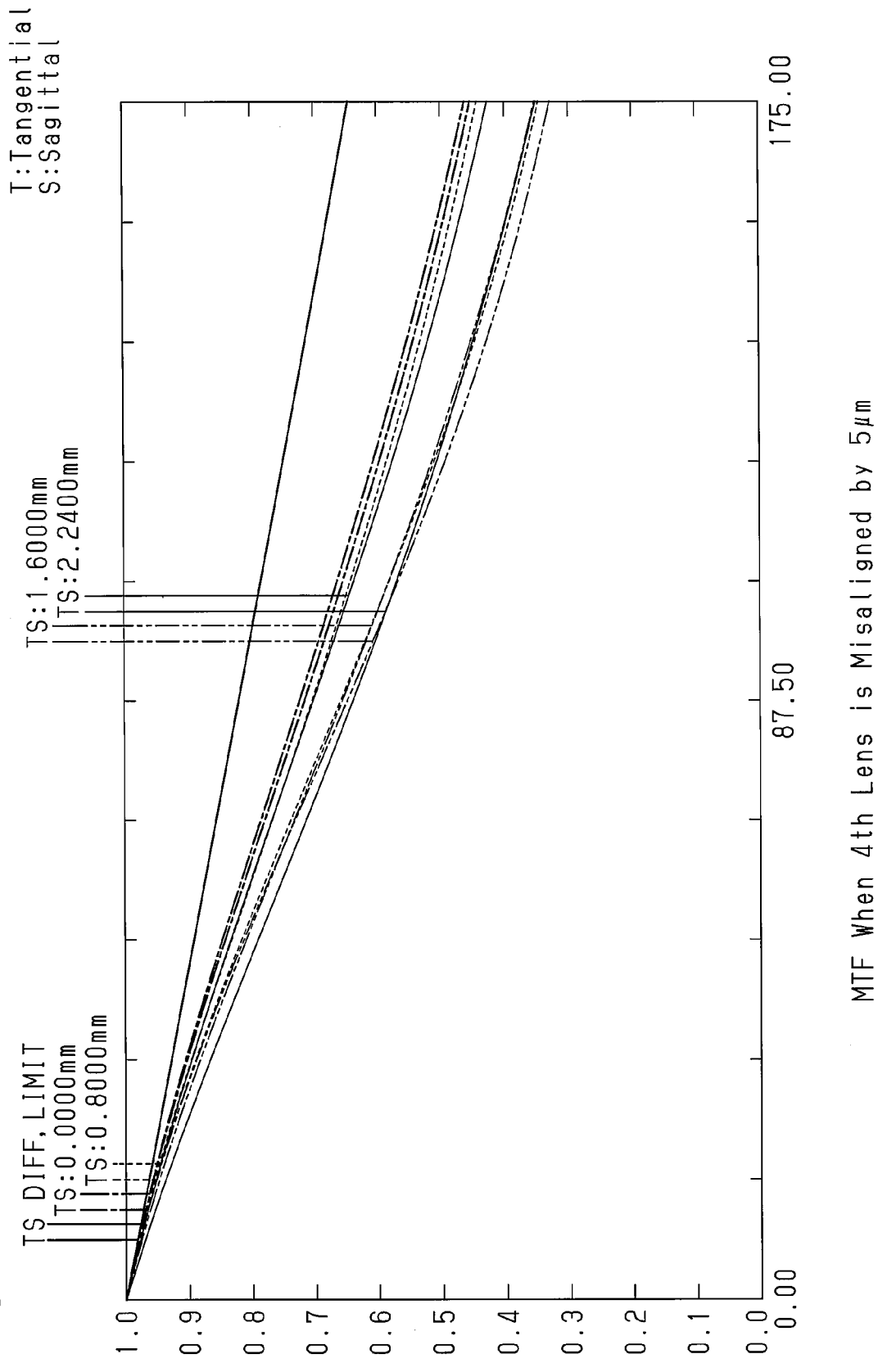

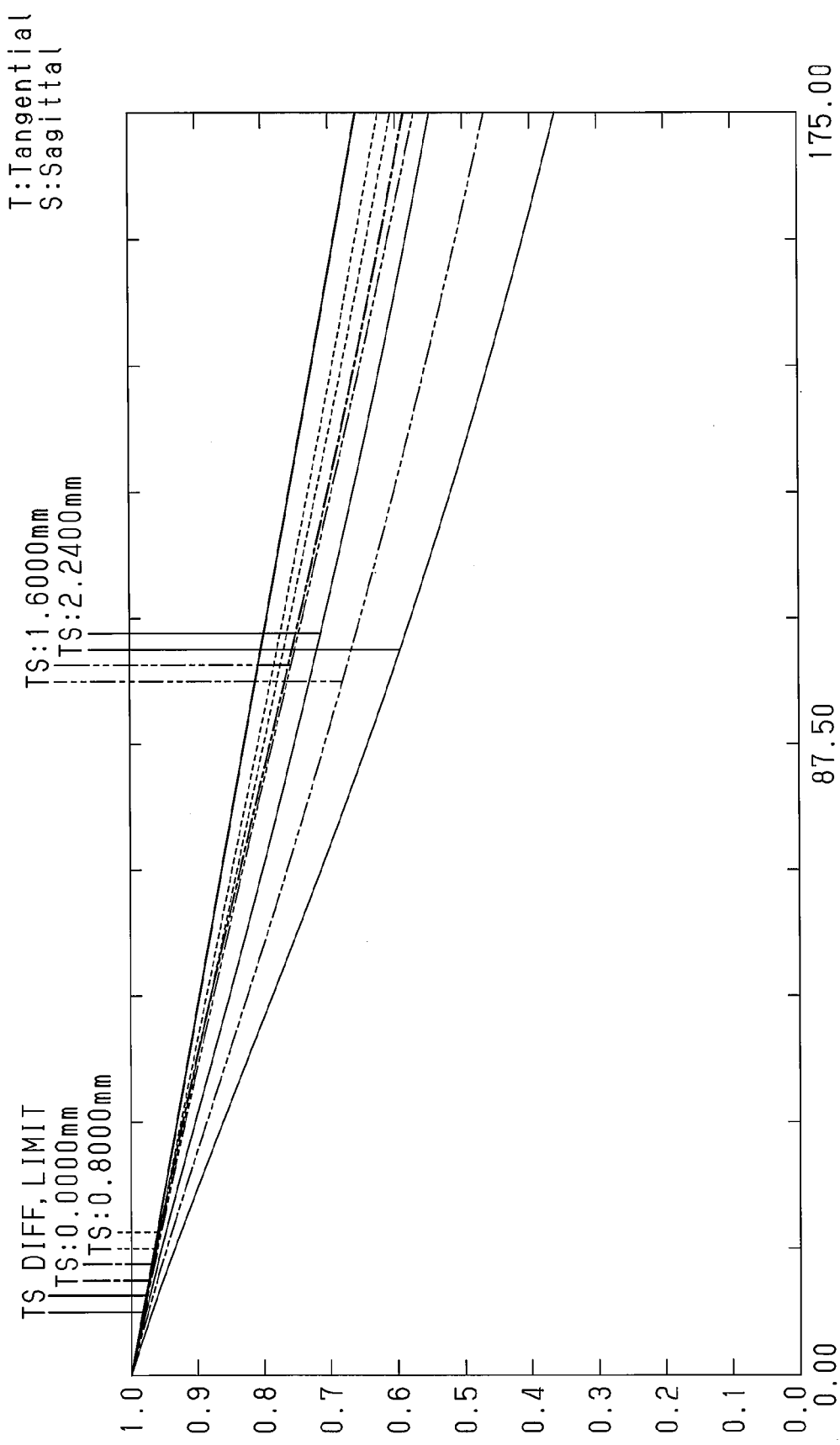

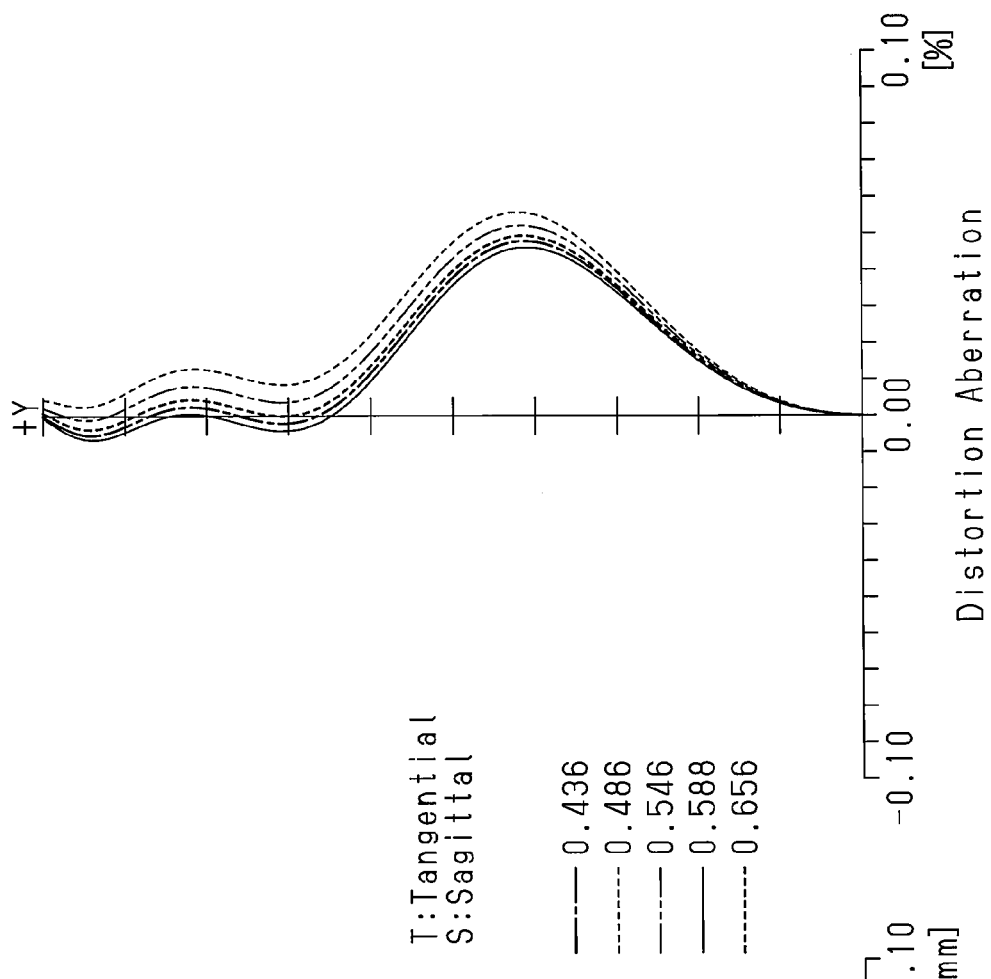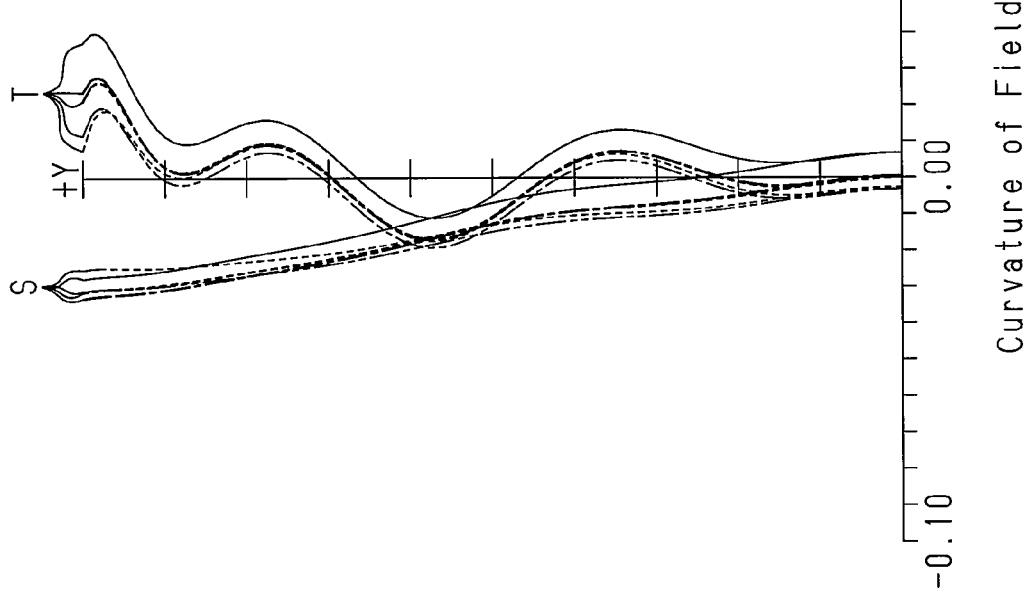

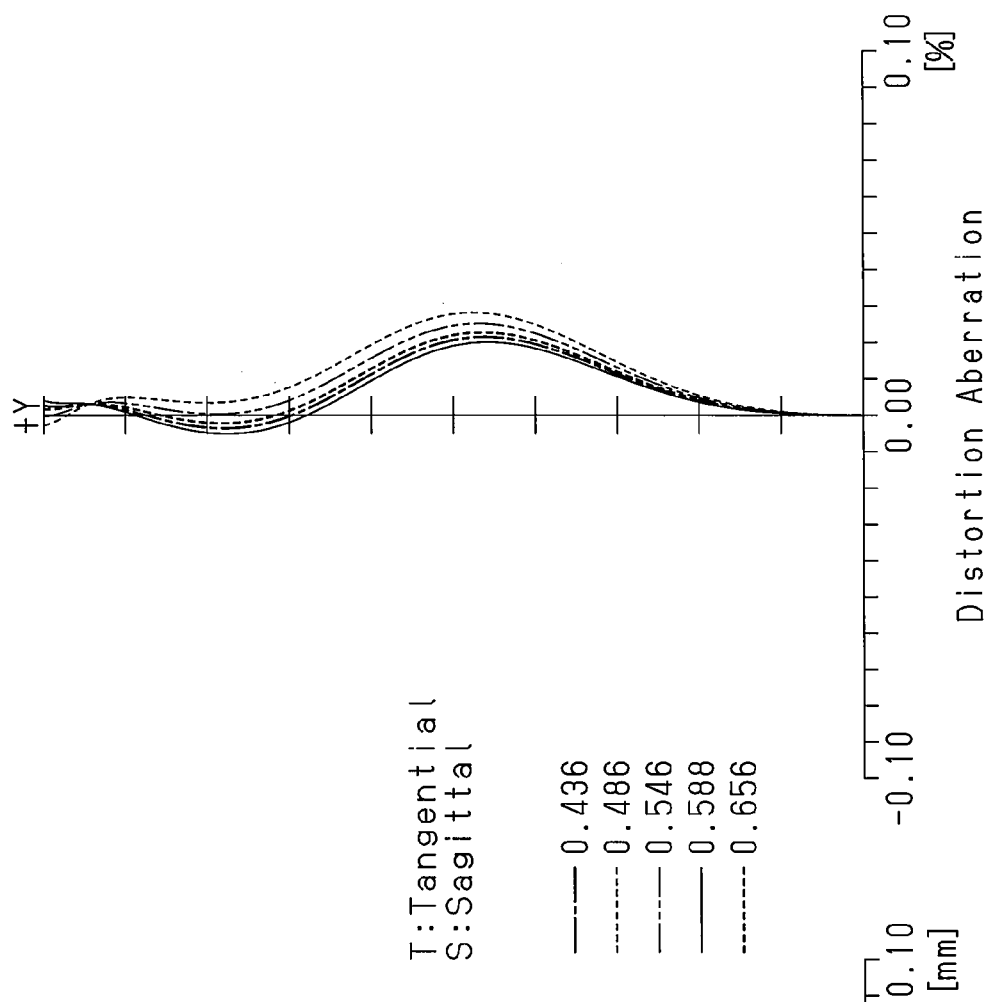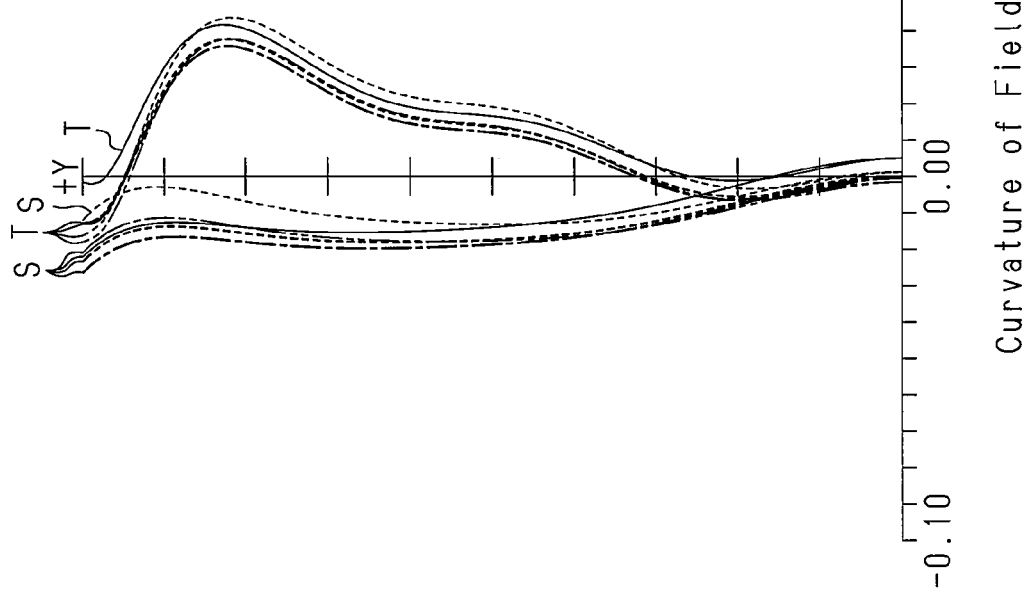

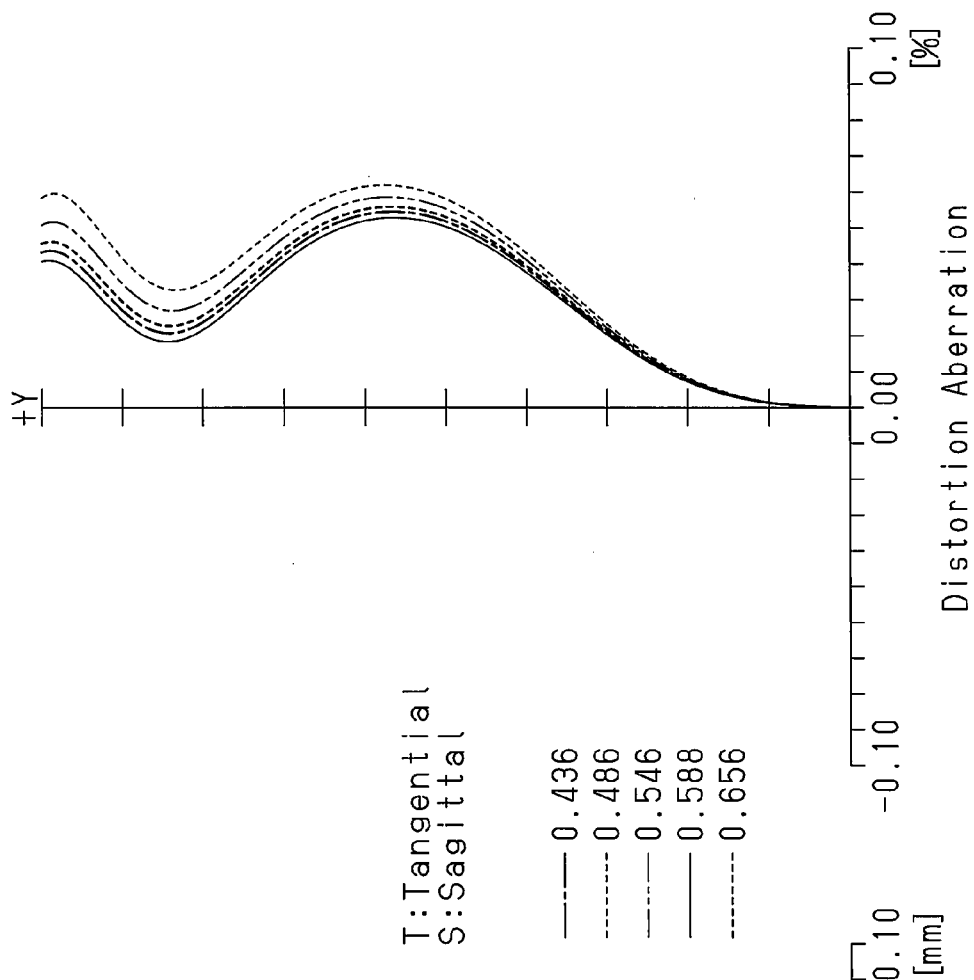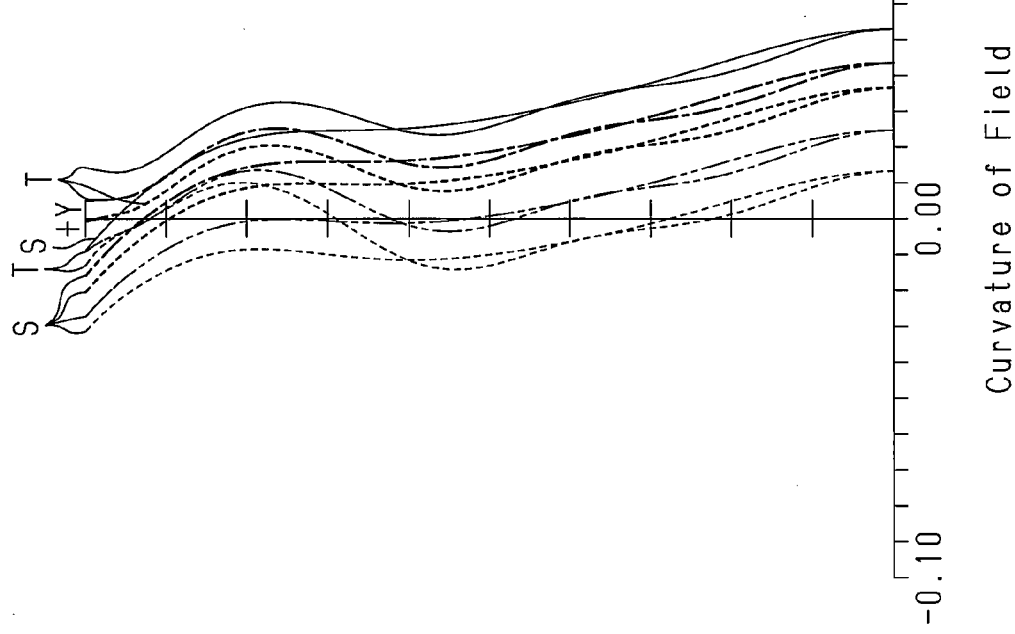

LENS UNIT AND IMAGE CAPTURING DEVICE

CROSS-REFERENCE TO RELATED APPLICATIONS

This application is based upon and claims the benefit of priority from prior Japanese Patent Application No. 2008-280307, filed on Oct. 30, 2008, the entire contents of which are incorporated herein by reference.

BACKGROUND OF THE INVENTION

The present invention relates to a lens unit, and more particularly, to a lens unit suitable for use in a compact image capturing device. Further, the present invention relates to an image capturing device.

Most of image capturing devices that are presently being used are digital cameras, which use charged coupled device (CCD) image sensors or complementary metal oxide semiconductor (CMOS) image sensors as image capturing elements. Thus, such an image capturing device must use a lens unit of which capacities differ from that of a so-called silver salt camera. For example, the sensitivity to diagonal incident light is lower in a CCD image sensor or CMOS image sensor than in a silver salt film. Thus, a CCD image sensor or CMOS image sensor must have a small chief ray angle (CRA), which is the incident angle of light rays entering an image capturing device. Due to the improvements made on the integration of image capturing elements, the image quality must be improved even for lens units used in compact camera or mobile phones. At the same time, such a lens unit must be reduced in size. Furthermore, a lens unit that is compact and used in a compact camera or mobile phone must have a structure that lowers manufacturing costs so that relatively inexpensive products can be supplied.

To improve the image quality, aberrations must be lowered. Thus, instead of a lens unit having a three-lens structure, which may easily be designed to be compact, it is desirable that a lens unit having a four-lens structure be used, which more easily suppresses aberrations. Japanese Laid-Open Patent Publication Nos. 2002-228922, 2003-255222, 2005-91666, and 2006-309043 describe compact lens units having four-lens structures.

Japanese Laid-Open Patent Publication Nos. 2002-228922 and 2003-255222 each describe a so-called front stop lens system in which the stop is located further toward an image capturing side (hereinafter referred to as the "object side") from all the lenses of the lens unit. In such a structure, it is generally known that when misalignment occurs in a lens located toward an image capturing element side (hereinafter referred to as the "image side") from the stop, the misalignment greatly affects the image quality. As a result, there is a tendency for product defects to occur due to such misalignment. This lowers the manufacturing yield of the lens unit and increases manufacturing costs.

Japanese Laid-Open Patent Publication Nos. 2005-91666 describes a so-called middle stop lens system in which the stop is located between the furthermost object side lens and the second lens from the object side. It is generally known that in such a structure, misalignments less affect the image quality than the front stop lens system. However, product defects caused by misalignments cannot be sufficiently prevented.

Japanese Laid-Open Patent Publication No. 2006-309043 recites in claim 1 "an image capturing lens comprising a first lens having a negative refractive index and including a convex surface formed on an object side, a second lens having positive refraction power and including a convex surface formed on an object side and joined with the first lens, an aperture stop having a predetermined aperture, a third lens having positive power and including a concave surface formed on the object side, and a fourth lens having negative refractive power." Accordingly, the lens system disclosed in this publication has a middle stop structure in which a stop is arranged between lenses that are second and third from the object side. It is thus considered that this structure sufficiently prevents product defects caused by misalignments. The publication also explains that "employment of a three-group, four-lens structure obtains a lens capturing lens that allows for reduction in size, thickness, and weight, achieves satisfactory optical characteristics for infinite to close-range image capturing, and is suitable for a high-density solid state image capturing element of 4,000,000 pixels or greater" (refer to paragraph [0014] of the publication.

However, in the lens unit described in Japanese Laid-Open Patent Publication No. 2009-309043, the two lenses located toward the object side from the stop includes the first lens having a negative refractive inject and the second lens having positive refractive power. Thus, the condensing of light through refraction tends to become insufficient. To cope with this problem, if the positive refractive power of the second lens is increased, the thickness of the second lens increases. This, in turn, increases the length of the entire lens unit.

SUMMARY OF THE INVENTION

The present invention provides a lens unit having a four-lens structure of a middle stop type that sufficiently prevents product defects caused by misalignments and allows for a further reduction in size. Further, the present invention provides an image capturing device having an image capturing function, such as a camera or a mobile phone incorporating a camera, and including such a lens unit.

One aspect of the present invention is a lens unit including a first lens having positive power, a second lens having positive power, an aperture stop, a third lens having negative power, and a fourth lens. The first lens, the second lens, the aperture stop, the third lens, and the fourth lens are arranged in order from an object side toward an image side.

A further aspect of the present invention is an image capturing device provided with a lens unit including a first lens having positive power, a second lens having positive power, an aperture stop, a third lens having negative power; and a fourth lens. The first lens, the second lens, the aperture stop, the third lens, and the fourth lens are arranged in order from an object side toward an image side.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 2 includes external views showing the portable terminal when in use, FIG. 2A is a front perspective view and FIG. 2B is a rear perspective view;

FIG. 5 includes graphs each showing an example indicating one of the characteristics of a lens unit in example 1, FIG. 5A is a graph showing the field curvature, and FIG. 5B is a graph showing the distortion aberration;

FIG. 6 is a graph showing a vertical aberration, which indicates one of the characteristics of the lens unit in example 1;

FIG. 7 is a graph showing the transfer function (MTF), which indicates one of the characteristics of the lens unit in example 1, when the first lens and the second lens is upwardly misaligned by 5 μm;

FIG. 8 is a graph showing the transfer function (MTF), which indicates one of the characteristics of the lens unit in example 1, when the first lens and the second lens is downwardly misaligned by 5 μm;

FIG. 9 is a graph showing the transfer function (MTF), which indicates one of the characteristics of the lens unit in example 1, when a third lens is upwardly misaligned by 5 μm;

FIG. 10 is a graph showing the transfer function (MTF), which indicates one of the characteristics of the lens unit in example 1, when the third lens is downwardly misaligned by 5 μm;

FIG. 11 is a graph showing the transfer function (MTF), which indicates one of the characteristics of the lens unit in example 1, when a fourth lens is upwardly misaligned by 5 μm;

FIG. 14 is a graph showing the transfer function (MTF), which indicates one of the characteristics of the lens unit in comparative example 1;

FIG. 15 includes graphs each showing one of the characteristics of the lens unit in comparative example 1, FIG. 15A is a graph showing the field curvature, and FIG. 15B is a graph showing the distortion aberration;

FIG. 27 includes graphs each showing one of the characteristics of the lens unit in comparative example 2, FIG. 27A is a graph showing the field curvature, and FIG. 27B is a graph showing the distortion aberration;

FIG. 39 includes graphs each showing one of the characteristics of the lens unit in comparative example 3, FIG. 39A is a graph showing the field curvature, and FIG. 39B is a graph showing the distortion aberration;

DETAILED DESCRIPTION OF THE PREFERRED EMBODIMENTS

Figure 1:
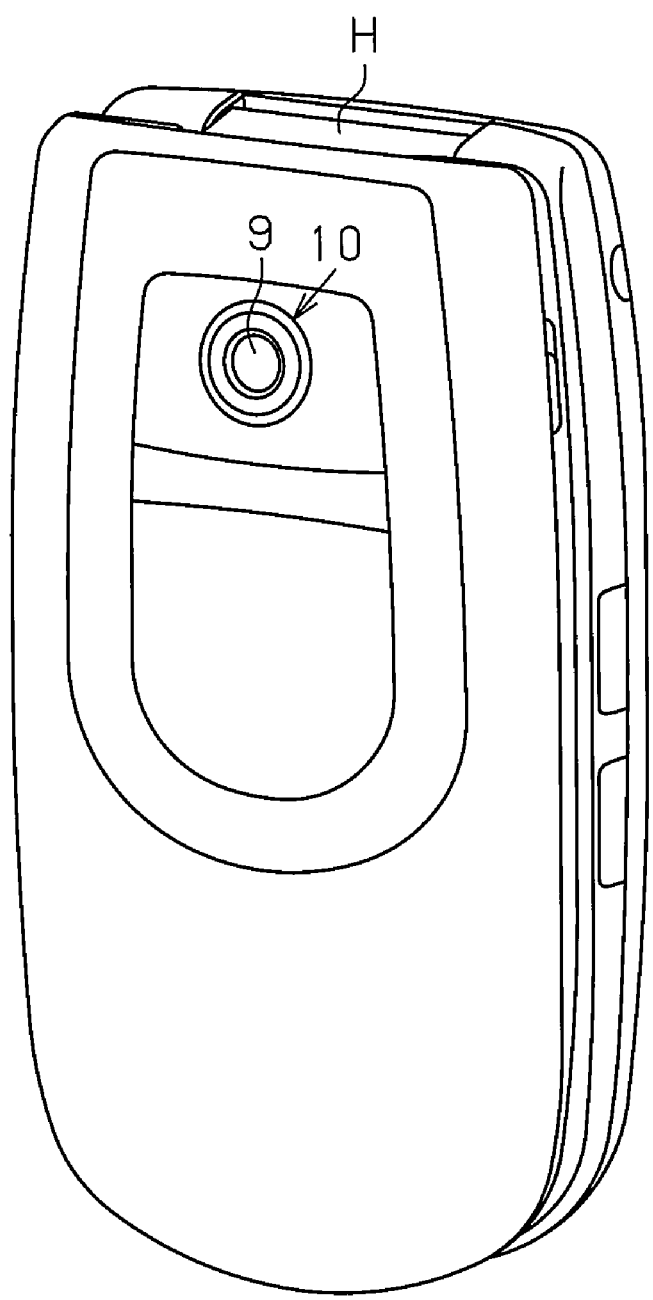
FIG. 1 is an external view showing the outer appearance of a portable terminal when not in use.

In the drawings, like numerals are used for like elements throughout.

As shown in FIG. 1, a preferred embodiment of a mobile phone has, for example, a folding structure that folds about a hinge H. FIG. 1 shows the mobile phone in a folded, or closed state. A cover glass 9, which is part of a lens unit 10, is exposed from the front surface of the mobile phone. FIG. 2A shows the mobile phone in an open state. A display 81 and an operation panel 82 are arranged on the front surfaces of the mobile phone as viewed in FIG. 2A. FIG. 2B is a rear view of the mobile phone in an open state. In this state, to capture an image of an object, for example, a user opens the mobile phone, directs the cover glass 9 toward the object, and operates the operation panel 82 to release the shutter.

Figure 3:
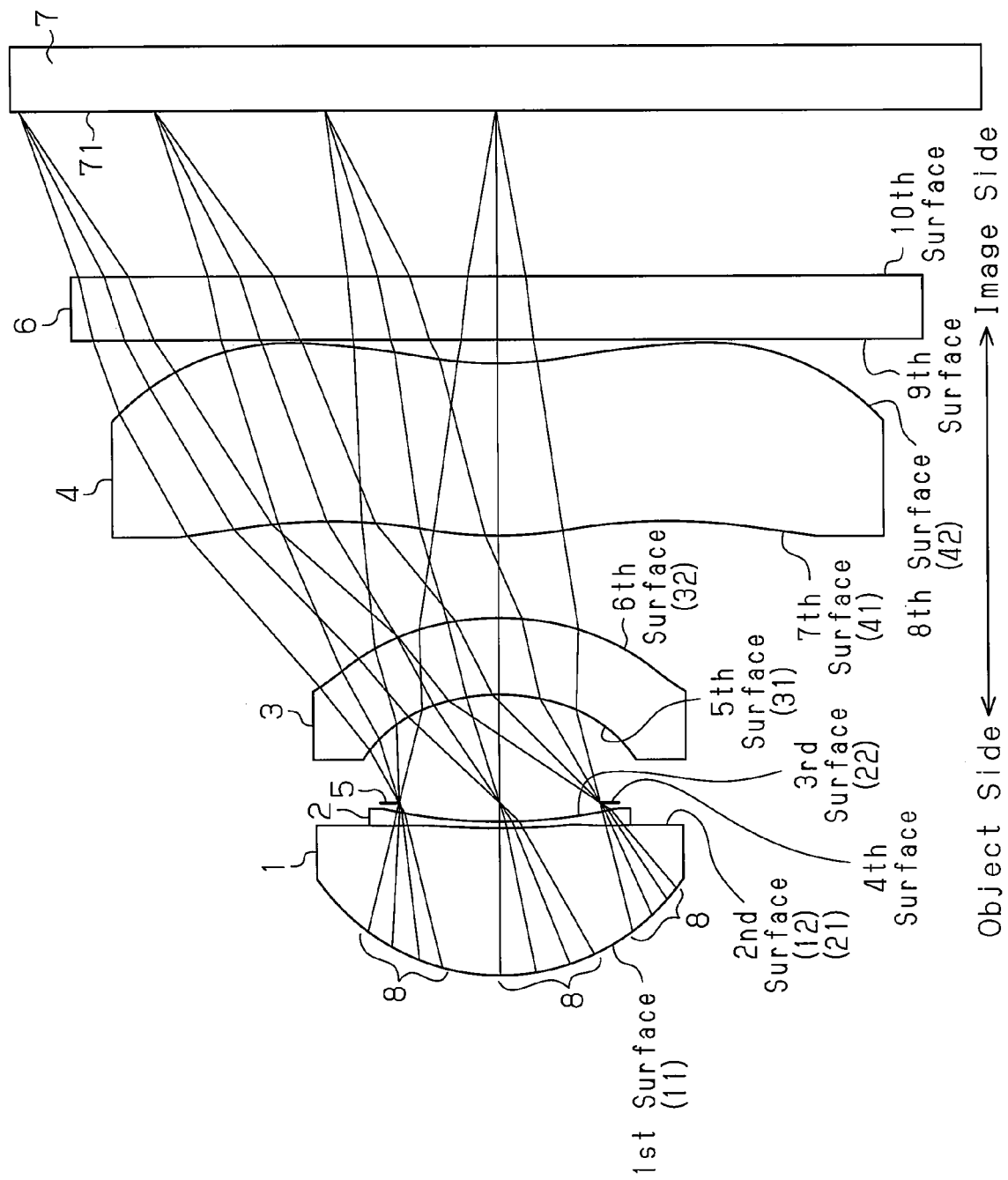
FIG. 3 is a schematic cross-sectional view of a lens unit according to a preferred embodiment taken along a plane which includes the optical axis.

Referring to FIG. 3, the lens unit includes, in order of arrangement from the object side toward the image side, a first lens 1, a second lens 2, an aperture stop 5, a third lens 3, a fourth lens 4, and a cover glass 9. Members that particularly do not have to be described, such as the cover glass 9 and frame, are not shown in FIG. 3. FIG. 3 shows a CCD image sensor 7, which is not an element of the lens unit, to illustrate an imaging plane 71. FIG. 3 also shows incident light 8. Each of the first lens 1, third lens 3, and fourth lens 4 is a plastic lens. The second lens 2 is a plastic lens formed by irradiating and curing an ultraviolet curing resin with ultraviolet rays. The structure shown in FIG. 3 will now be described in detail.

The first lens 1 has an object side surface 11 (first surface), which is convex at the object side, and an image side surface 12 (second surface), which is concave at the image side. Since the curvature of radius is greater at the object side, the first lens 1 is a lens having positive power (hereinafter simply referred to as a "positive lens"). Further, the second lens 2 has an object side surface 21 (second surface), which is convex at the image side, and an image side surface 22 (third surface), which is slightly concave at the image side. Thus, the second lens 2 is also a positive lens. The image side surface 12 of the first lens 1 is joined with the object side surface 21 of the second lens 2. Thus, the first lens 1 and the second lens 2 form a group of lenses, that is, a composite lens.

More specifically, after forming the first lens 1, an ultraviolet curing resin is filled into a mold on the image side surface 12 of the first lens 1 and then irradiated and cured by ultraviolet rays. This shapes the second lens and forms the composite lens. A composite lens formed in this manner may be reduced in thickness compared to a laminated lens, which is also a composite lens formed by independently forming the first lens and the second lens and then laminating the two lenses. Accordingly, the entire length of the lens unit may be reduced.

The aperture stop 5 is arranged at the image sides of the first lens 1 and the second lens 2. The third lens 3 is arranged further toward the image side from the aperture stop 5. The third lens 3 includes an object side surface 31, which is concave at the object side, and an image side surface 32, which is convex at the image side. The third lens 3 has negative power. The object side surface 31 (fifth surface) of the third lens 3 is concave at the object side, and the image side surface 22 (third surface) of the second lens 2 is concave at the image side. Thus, the two surfaces facing toward the aperture stop 5 at opposite sides of the aperture stop 5 are both concave surfaces. Accordingly, the incident angle of light is close to a right angle on the image side surface 22 of the second lens 2 and the object side surface 31 of the third lens 3. This prevents aberration. Further, it is known that when the curved surfaces facing toward a stop at opposite sides of the stop have similar shapes to each other, changes in optical characteristics caused by temperatures do not easily occur. Moreover, the third lens 3 is a meniscus lens including an object side surface, which is concave at the object side. This facilitates the correction of aberrations remaining in the light that has passed through the first lens 1 and the second lens 2.

A fourth lens 4 is arranged at the image side of the third lens 3. The fourth lens 4 is an aspherical lens and includes an object side surface 41 (seventh surface) and an image side surface 42 (eighth surface). The object side surface 41 and the image side surface 42 are each aspherical and includes an inflection point. Thus, the focal length differs between a central portion and a peripheral portion of the fourth lens 4. Due to this structure, the difference in image quality between the portion near the optical axis and the peripheral portion may be corrected, and aberrations may be suppressed. Further, since the image side surface 42 (eighth surface) of the fourth lens 4 is concave, a longer back focus may be provided than when the image side surface 42 of the fourth lens 4 is convex at the image side. Thus, the chief ray angle may easily be decreased.

A cover glass 6 is arranged between the fourth lens 4 and the CCD image sensor 7. A colorless, transparent glass plate is normally used as the cover glass 6 to protect the CCD image sensor 7, which is an image capturing element, from dust or the like. When necessary, a filter, such as an infrared cut filter, is used.

In the lens unit of the preferred embodiment, the composite lens, which is formed by the first lens 1 and the second lens 2, condenses the incident light 8 entering the lens unit. The aperture stop 5 restricts the passage of the incident light 8 to an amount required for imaging. Then, the light that passes through the aperture stop 5 further passes through the third lens 3 and the fourth lens 4. This condenses the light and corrects aberrations. The light that has passed through the fourth lens 4 further passes through the cover glass 6 and is then imaged on the imaging plane 71 of the CCD image sensor 7. The CCD image sensor 7 performs an electrical conversion with the image so as to record a photographic image when the shutter is released.

(1) In the preferred embodiment, the first lens 1 and the second lens 2 both have positive power. Thus, in comparison to when either one of the first lens 1 and the second lens 2 has negative power, a stronger condensing capacity may be obtained at the object side of the aperture stop 5. Accordingly, when the entire length is the same, the entire thickness of the first lens and the second lens may be reduced. At the same time, the distance from the aperture stop 5 to the imaging plane 71 may be lengthened to decrease the chief ray angle. Further, the lens at the object side of the aperture stop 5 has a two-lens structure. Thus, in comparison to a one-lens structure, aberrations may be more suppressed.

(2) In the preferred embodiment, the object side surface 41 and image side surface 42 of the fourth lens 41 are each aspherical and includes an inflection point. In other words, the fourth lens 4 is an aspherical lens. This allows for a different focal length at the central portion and peripheral portion of the fourth lens 4. Accordingly, aberrations may be effectively corrected.

(3) In the preferred embodiment, the image side surface 42 of the fourth lens 4 is concave at the image side. Thus, in comparison to when the image side surface 42 of the fourth lens 4 is convex at the image side, a longer back focus may be provided. Thus, the chief ray angle may easily be decreased.

(4) In the preferred embodiment, the third lens 3 is a meniscus lens that includes the object side surface 31, which is concave at the object side. This facilitates the correction of aberrations remaining in the light that has passed through the first lens 1 and the second lens 2.

(5) In the preferred embodiment, the image side surface 22 of the second lens 2 is concave at the image side, and the object side surface 31 of the third lens 3 is concave at the object side. That is, the two surfaces facing toward the aperture stop 5 at opposite sides of the aperture stop 5 are both concave. This easily suppresses changes in optical characteristics caused by aberration corrections and temperature variations.

(6) In the preferred embodiment, the first lens 1 and the second lens 2 form a group of lenses, or a composite lens, in which the image side surface 12 of the first lens 1 is joined with the object side surface 21 of the second lens 2. Thus, the entire length of the lens unit may be shorter than when the first lens 1 and the second lens 2 are discrete lenses. Furthermore, misalignments do not occur between the first lens 1 and the second lens 2 after the composite lens is formed. This facilitates manufacturing and increases yield.

(7) In the preferred embodiment, the second lens is molded onto the first lens to form the composite lens. This allows for the thickness of the composite lens to be reduced. Accordingly, in comparison to when using a laminated lens, the entire length of the lens unit 10 may be further reduced. The lens unit 10 has a middle stop, four-lens structure and suffi-ciently suppresses product defects caused by misalignments. Thus, in comparison with the prior art, the lens unit 10 may be further reduced in size and is thereby optimal for use in a mobile phone, which functions as an imaging device.

Example 1

Referring to FIG. 3, the lens unit of example 1 has a three-group, four-lens structure in which the aperture stop 5 is arranged between the composite lens, which is formed by the first lens 1 that has positive power and the second lens 2 that has positive power, and the third lens 3, which has negative power. Numerical data for this lens unit is shown below.

Focal length of entire system: 3.60 mm
F-number: 2.8
Entire lens length: 4.07 mm
Back focus: 1.19 mm
Chief ray angle (CRA): 25°

The lens data is shown in table 1. In table 1, a number i is allocated for each surface in order from the object side of the first lens 1, which serves as the first surface as shown in FIG. 3, toward the image side. Further, Ri represents the radius of curvature of each surface, Di represent the distance between the ith surface and the (i+1)th surface, nd represents the refractive index, and vd represents the Abbe number.

TABLE 1

| Surface No. | Ri | Di | nd | vd |
|---|---|---|---|---|
| Object | ∞ | ∞ | | |
| 1* | 1.077 | 0.693 | 1.531 | 56.0 |
| 2* | 2.335 | 0.031 | 1.593 | 29.5 |
| 3* | 2.445 | 0.089 | | |
| 4(Stop) | ∞ | 0.510 | | |
| 5* | −1.055 | 0.362 | 1.632 | 23.4 |
| 6* | −1.655 | 0.390 | | |
| 7* | 1.687 | 0.812 | 1.531 | 56.0 |
| 8* | 1.920 | 0.110 | | |
| 9 | | 0.300 | 1.523 | 58.6 |
| 10 | | 0.777 | | |
| Image | ∞ | — | | |

The equation shown below represents an aspherical shape.

$$z = \frac{(1/R)H^2}{1+\sqrt{\{1-(1+K)(H/R)^2\}}} + A4H^4 + A6H^6 + A8H^8 + A10H^{10} + A12H^{12} + A14H^{14} + A16H^{16} \quad (1)$$

In equation (1), the z axis represents the optical direction, R represents the radius of curvature, H represents the height in a direction perpendicular to the optical axis, and K represents the Korenich constant. Further, A4, A6, A8, A10, A12, A14, and A16 respectively represent the aspherical surface coefficients for the fourth order, sixth order, eighth order, tenth order, twelfth order, fourteenth order, and sixteenth order.

The aspherical surface coefficient of each surface is as shown below in Table 2.

TABLE 2

| Ri | K | A4 | A6 | A8 | A10 | A12 | A14 |
|---|---|---|---|---|---|---|---|
| 1st Surface | −5.246E−02 | 1.599E−02 | 4.515E−02 | −3.202E−02 | 4.393E−02 | 4.484E−02 | |
| 2nd Surface | 3.045E+00 | −1.302E+00 | 4.192E+00 | −1.011E+01 | 1.223E+01 | −7.447E−01 | |

TABLE 2-continued

| Ri | K | A4 | A6 | A8 | A10 | A12 | A14 |
|---|---|---|---|---|---|---|---|
| 3rd Surface | -4.586E-01 | -1.308E-01 | 9.247E-01 | -3.326E+00 | 4.954E+00 | 0.000E+00 | |
| 5th Surface | -2.699E+00 | -8.257E-01 | 2.022E+00 | -1.129E+01 | 2.844E+01 | -3.072E+01 | |
| 6th Surface | 4.205E-03 | -5.438E-01 | 1.057E-00 | -1.897E+00 | 2.122E+00 | -7.912E-01 | |
| 7th Surface | -1.434E+01 | -2.041E-01 | 1.178E-01 | -3.644E-02 | 7.802E-03 | -1.277E-03 | 1.094E-04 |
| 8th Surface | -1.040E+01 | -1.060E-01 | 2.440E-02 | -3.268E-03 | -1.343E-03 | 6.305E-04 | -7.734E-05 |

Comparative Example 1

Figure 13:
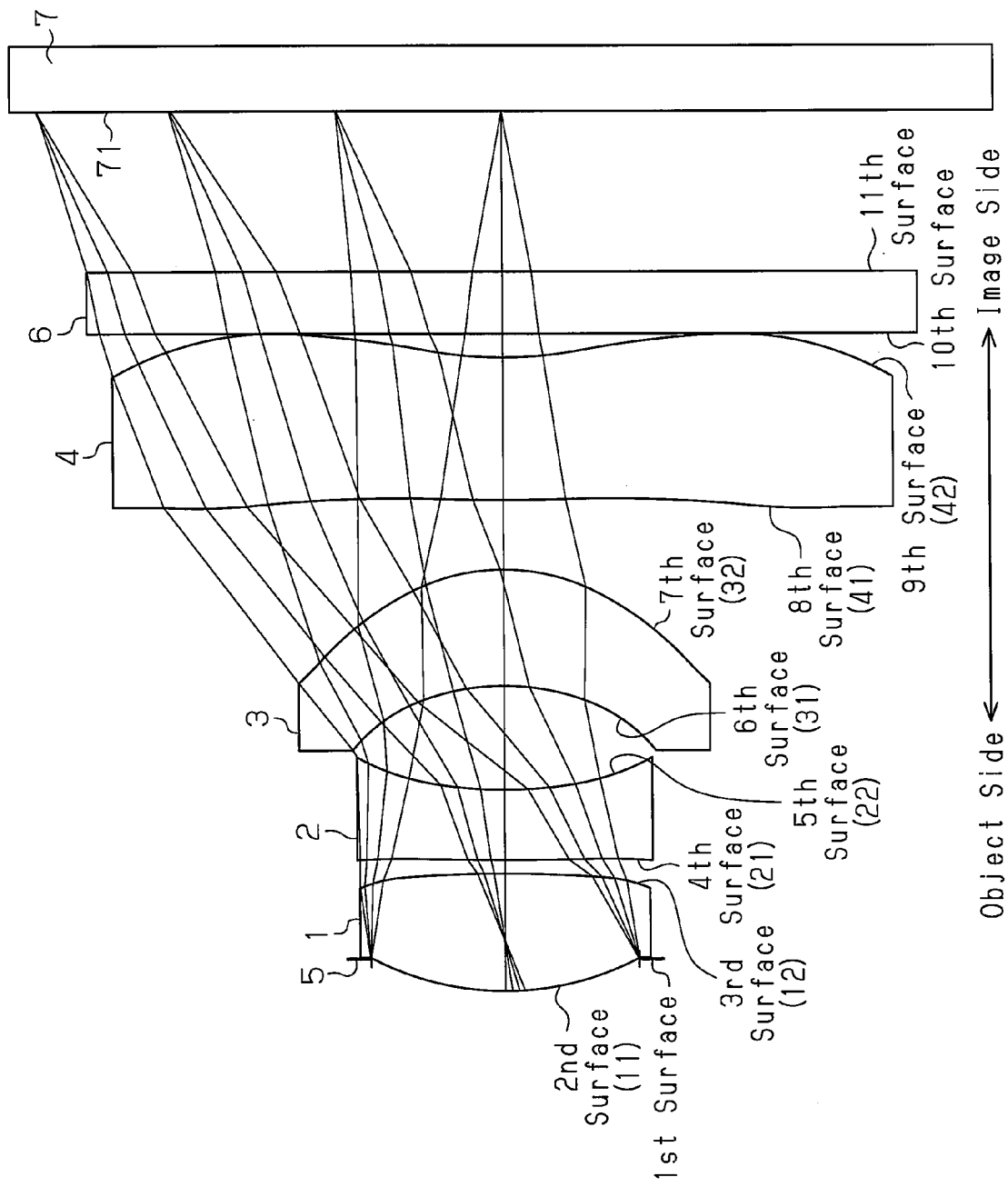
FIG. 13 is a schematic cross-sectional view showing a lens unit of comparative example 1 taken along a plane including the optical axis.

Referring to FIG. 13, the lens unit of comparative example 1 has a four-group, four-lens structure, in which the aperture stop 5 is located further outward from the first lens 1. Numerical data for this lens unit is shown below.

Focal length of entire system: 3.60 mm
F-number: 2.8
Entire lens length: 4.26 mm
Back focus: 1.19 mm
Chief ray angle (CRA): 25°

The lens data is shown in table 3. In table 3, a number i is allocated for each surface in order from the aperture stop 5, which serves as the first surface as shown in FIG. 13, toward the image side. Further, the parameters of Ri, Di, nd, and vd are the same as those of table 1.

TABLE 3

| Surface No. | Ri | Di | nd | vd |
|---|---|---|---|---|
| Object | ∞ | ∞ | | |
| 1(Stop) | ∞ | -0.155 | | |
| 2* | 1.307 | 0.568 | 1.531 | 56.0 |
| 3* | -5.874 | 0.066 | | |
| 4* | 1511.369 | 0.340 | 1.632 | 23.4 |
| 5* | 2.170 | 0.504 | | |
| 6* | -1.157 | 0.564 | 1.531 | 56.0 |
| 7* | -0.951 | 0.338 | | |
| 8* | 8.374 | 0.690 | 1.531 | 56.0 |
| 9* | 1.937 | 0.115 | | |
| 10 | | 0.300 | 1.523 | 58.6 |
| 11 | | 0.774 | | |
| Image | ∞ | — | | |

The aspherical surface coefficient for each surface is derived using equation (1) as shown in table 4.

Comparative Example 2

Figure 25:
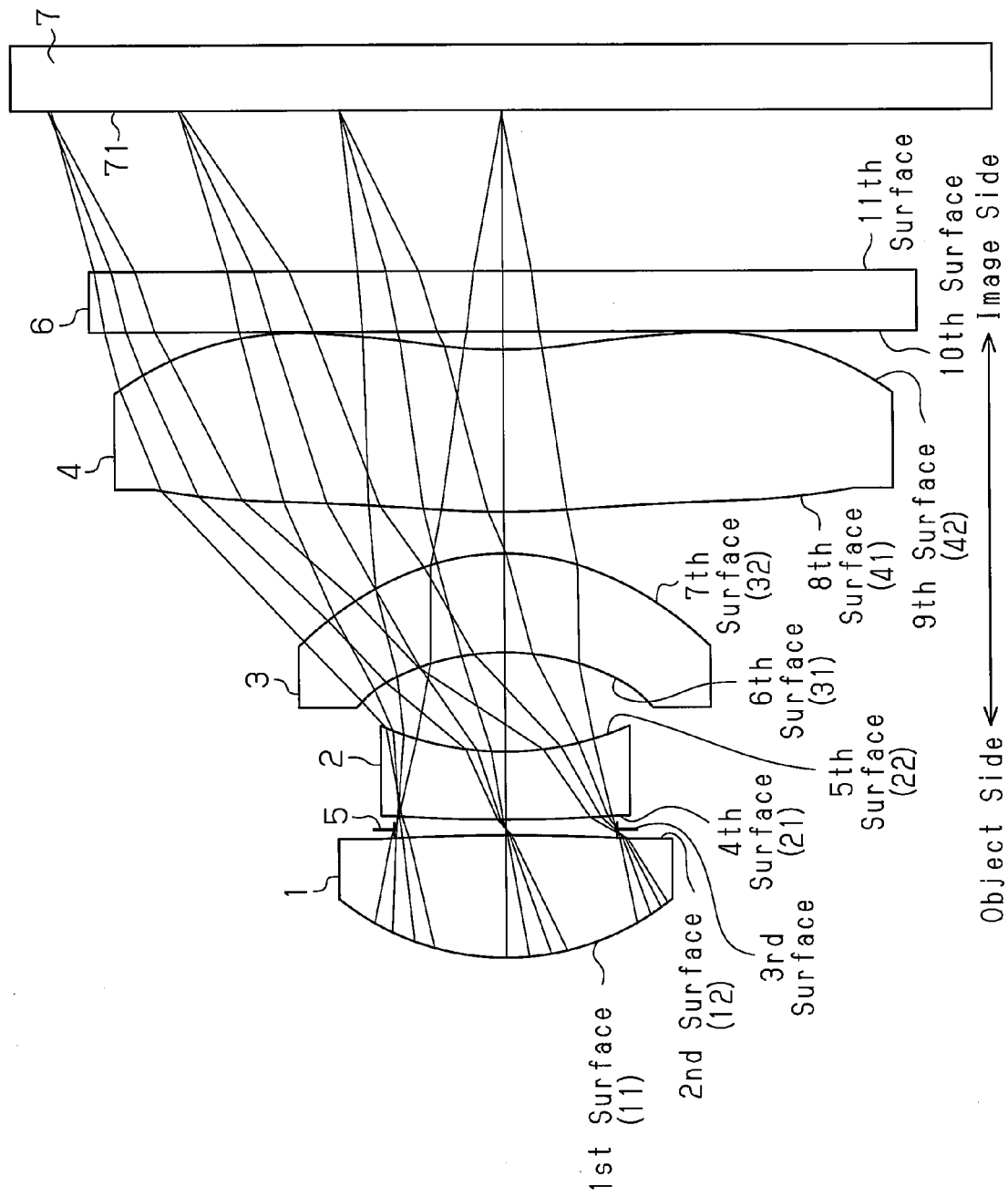
FIG. 25 is a schematic cross-sectional view showing a lens unit of comparative example 2 taken along a plane including the optical axis.

Referring to FIG. 25, the lens unit of comparative example 2 has a four-group, four-lens structure, in which the aperture stop 5 is arranged between the first lens 1 and the second lens 2. Numerical data for this lens unit is shown below.

Focal length of entire system: 3.60 mm
F-number: 2.8
Entire lens length: 4.20 mm
Back focus: 1.19 mm
Chief ray angle (CRA): 25°

The lens data is shown in table 5. In table 5, a number i is allocated for each surface in order from the object side surface 11 of the first lens 1, which serves as the first surface as shown in FIG. 25, toward the image side. Further, the parameters of Ri, Di, nd, and vd are the same as those of table 1.

TABLE 5

| Surface No. | Ri | Di | nd | vd |
|---|---|---|---|---|
| Object | ∞ | ∞ | | |
| 1* | 1.240 | 0.608 | 1.531 | 56.0 |
| 2* | -6.086 | 0.030 | | |
| 3(Stop) | ∞ | 0.048 | | |
| 4* | 26.571 | 0.338 | 1.632 | 23.4 |
| 5* | 1.748 | 0.493 | | |
| 6* | -1.245 | 0.492 | 1.531 | 56.0 |
| 7* | -1.175 | 0.208 | | |
| 8* | 4.260 | 0.804 | 1.531 | 56.0 |
| 9* | 2.486 | 0.090 | | |
| 10 | | 0.300 | 1.523 | 58.6 |
| 11 | | 0.796 | | |
| Image | ∞ | — | | |

The aspherical surface coefficient for each surface is derived using equation (1) as shown in table 6.

TABLE 4

| Ri | K | A4 | A6 | A8 | A10 | A12 | A14 | A16 |
|---|---|---|---|---|---|---|---|---|
| 2nd Surface | -1.275E-01 | -2.580E-02 | 1.435E-01 | -7.776E-01 | 1.113E+00 | -4.309E-01 | -1.108E+00 | |
| 3rd Surface | -1.336E+02 | 1.078E-01 | -8.363E-01 | 8.951E-01 | -7.742E-01 | 1.654E-01 | 9.512E-03 | |
| 4th Surface | 4.645E+06 | 2.644E-01 | -9.155E-01 | 7.399E-01 | 1.663E-03 | -1.798E-01 | 3.128E-01 | |
| 5th Surface | 3.594E+00 | 1.620E-01 | -4.019E-01 | 9.536E-01 | -2.168E+00 | 3.407E+00 | -2.329E+00 | 9.907E-01 |
| 6th Surface | 4.987E-02 | -1.132E-01 | 2.772E-01 | -1.703E+00 | 3.086E+00 | -2.532E+00 | 1.676E+00 | -2.965E+00 |
| 7th Surface | -4.435E-01 | -1.053E-02 | 2.449E-01 | -6.302E-01 | 8.056E-01 | -3.277E-01 | -1.033E-01 | 1.102E-01 |
| 8th Surface | -5.855E+01 | -1.273E-01 | 8.403E-02 | -2.236E-02 | 1.776E-03 | -1.702E-04 | 2.125E-04 | -3.520E-05 |
| 9th Surface | -1.010E-01 | -2.283E-01 | 8.981E-02 | -2.714E-02 | 3.861E-03 | -9.929E-05 | -3.049E-05 | -4.450E-07 |

TABLE 6

| Ri | K | A4 | A6 | A8 | A10 | A12 | A14 | A16 |
|---|---|---|---|---|---|---|---|---|
| 1st Surface | −1.035E−01 | −2.736E−02 | 2.412E−01 | −7.952E−01 | 1.145E+00 | −5.001E−01 | −3.733E−01 | |
| 2nd Surface | −1.926E+02 | 2.104E−01 | −6.289E−01 | 9.161E−01 | −1.383E+00 | 7.915E−01 | | |
| 4th Surface | 2.229E+03 | 3.487E−01 | −1.023E+00 | 6.632E−01 | 1.260E+00 | 1.766E+00 | −1.745E+01 | |
| 5th Surface | 1.553E+00 | 1.786E−01 | −5.296E−01 | 1.352E+00 | −2.281E+00 | 1.991E+00 | −3.620E−01 | |
| 6th Surface | −2.380E−01 | 3.853E−02 | −8.318E−02 | −1.284E+00 | 2.781E+00 | −2.385E+00 | 5.245E+00 | −1.010E+01 |
| 7th Surface | −2.945E−01 | 1.873E−02 | 2.138E−01 | −6.361E−01 | 7.678E−01 | −2.792E−01 | −1.369E−02 | −1.294E−02 |
| 8th Surface | 5.969E−01 | −1.227E−01 | 6.436E−02 | −1.483E−02 | 1.007E−03 | 1.095E−04 | −4.323E−07 | −2.915E−06 |
| 9th Surface | 2.324E−02 | −1.705E−01 | 6.259E−02 | −2.086E−02 | 4.005E−03 | −3.380E−04 | 2.225E−06 | 2.761E−07 |

Comparative Example 3

Figure 37:
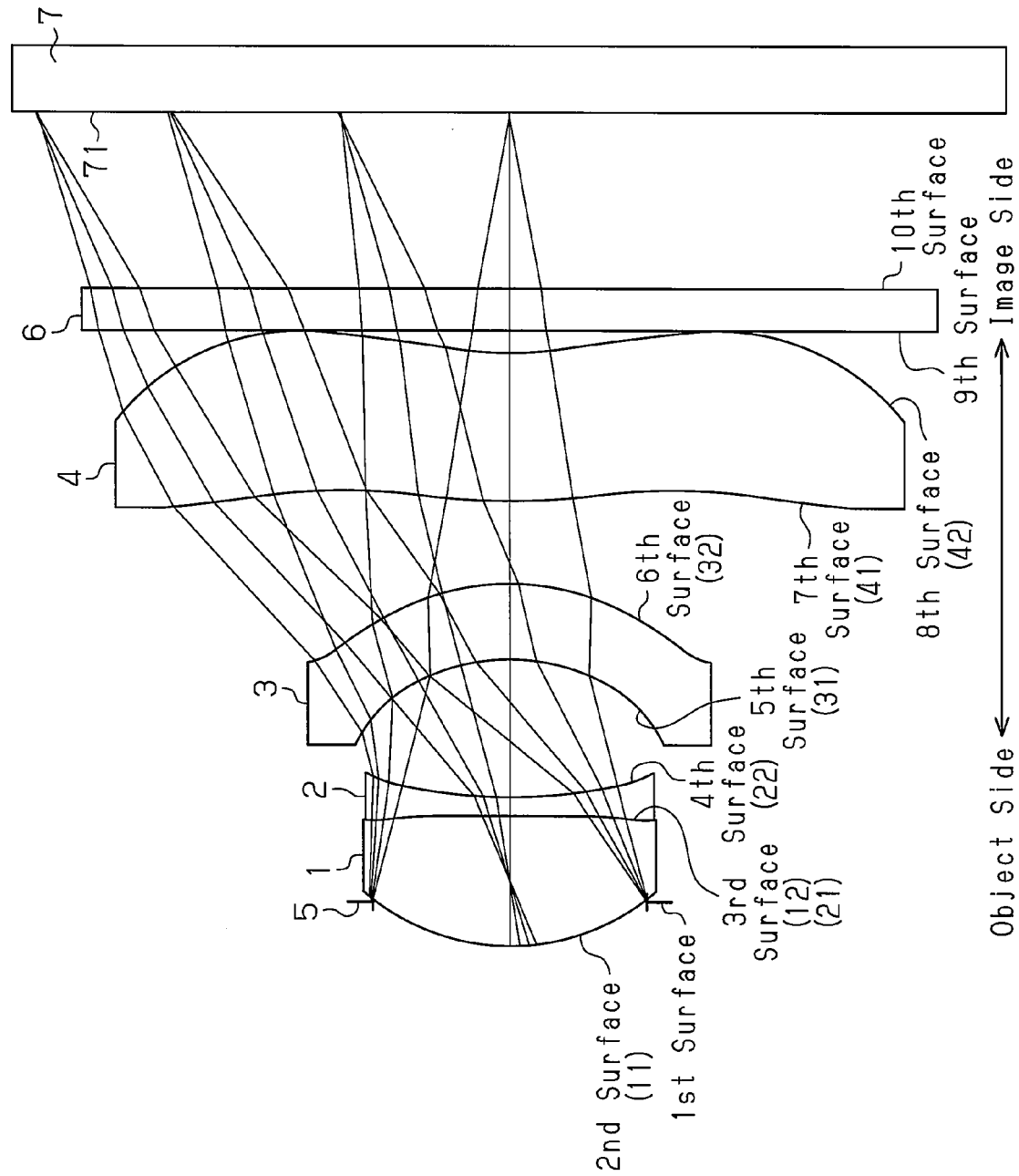
FIG. 37 is a schematic cross-sectional view showing a lens unit of comparative example 3 taken along a plane including the optical axis.

Referring to FIG. 37, the lens unit of comparative example 3 has a three-group, four-lens structure including a composite lens, which is formed by the first lens 1 that has positive power and the second lens 2 that has negative power, with the aperture stop 5 being arranged at the object side of the first lens 1. Numerical data for this lens unit is shown below.

Focal length of entire system: 3.60 mm
F-number: 2.8
Entire lens length: 3.96 mm
Back focus: 1.14 mm
Chief ray angle (CRA): 25°

The lens data is shown in table 7. In table 7, a number i is allocated for each surface in order from the surface of the stop 5, which serves as the first surface as shown in FIG. 37, toward the image side. Further, the parameters of Ri, Di, nd, and vd are the same as those of table 1.

TABLE 7

| Surface No. | Ri | Di | nd | vd |
|---|---|---|---|---|
| Object | ∞ | ∞ | | |
| 1(Stop) | ∞ | −0.210 | | |
| 2* | 1.080 | 0.617 | 1.531 | 56.0 |
| 3* | −280.883 | 0.090 | 1.593 | 29.5 |
| 4* | 2.658 | 0.654 | | |
| 5* | −0.997 | 0.360 | 1.614 | 25.6 |
| 6* | −1.219 | 0.393 | | |
| 7* | 2.506 | 0.703 | 1.531 | 56.0 |
| 8* | 1.955 | 0.105 | | |
| 9 | | 0.200 | 1.523 | 58.6 |
| 10 | | 0.833 | | |
| Image | ∞ | — | | |

The aspherical surface coefficient for each surface is derived using equation (1) as shown in table 8.

TABLE 8

| Ri | K | A4 | A6 | A8 | A10 | A12 | A14 | A16 |
|---|---|---|---|---|---|---|---|---|
| 2nd Surface | 0 | 2.529E−02 | −2.803E−02 | 1.456E−01 | −2.501E−02 | | | |
| 3rd Surface | 0 | 2.473E−01 | −2.111E+00 | 2.582E+00 | 1.032E+00 | | | |
| 4th Surface | 0 | 1.082E−01 | −4.831E−01 | 2.799E+00 | −7.937E+00 | 9.567E+00 | | |
| 5th Surface | 0 | −7.138E−02 | −6.658E−02 | −2.836E+00 | 9.864E+00 | −1.110E+01 | | |
| 6th Surface | 0 | −8.956E−02 | 2.510E−01 | −1.107E+00 | 2.616E+00 | −2.331E+00 | 8.170E−01 | |
| 7th Surface | 0 | −2.623E−01 | 1.290E−01 | −5.084E−02 | 2.773E−02 | −1.312E−02 | 3.226E−03 | −2.976E−04 |
| 8th Surface | 0 | −2.358E−01 | 9.378E−02 | −3.955E−02 | 9.594E−03 | −1.029E−03 | −9.803E−06 | |
| 9th Surface | | | | | | | | |

Comparison of Example With Comparative Examples 1 to 3

The lens units of comparative examples 1 to 3 are designed so that the focal length of the entire system, the F-number, and the CRA are the same as the lens unit of example 1. The lens units of comparative examples 1 to 3 will now be compared with the lens unit of example 1.

1. Optical Characteristics

Figure 4:
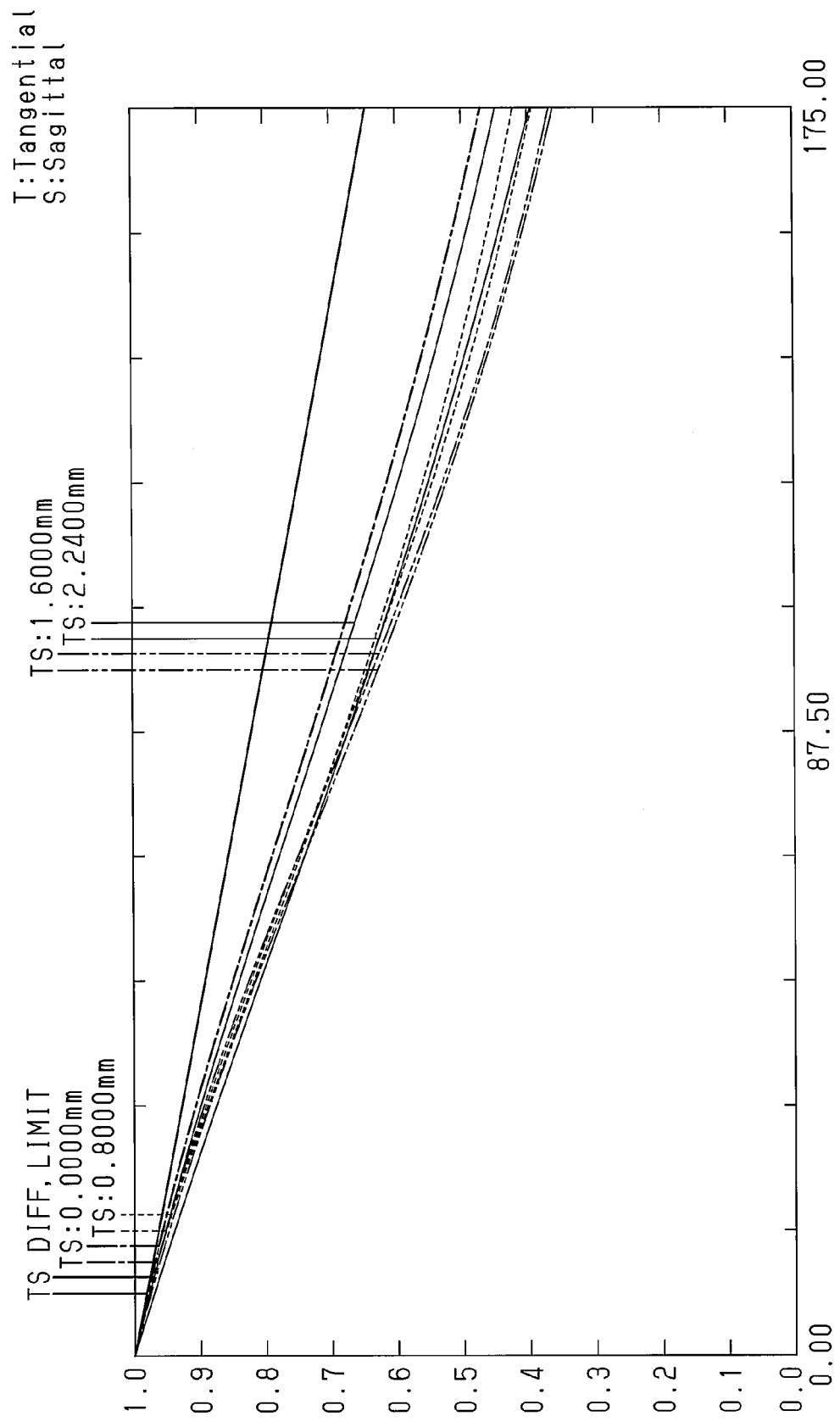
FIG. 4 is a graph showing a transfer function (MTF), which indicates one of the characteristics of a lens unit in example 1.
Figure 12:
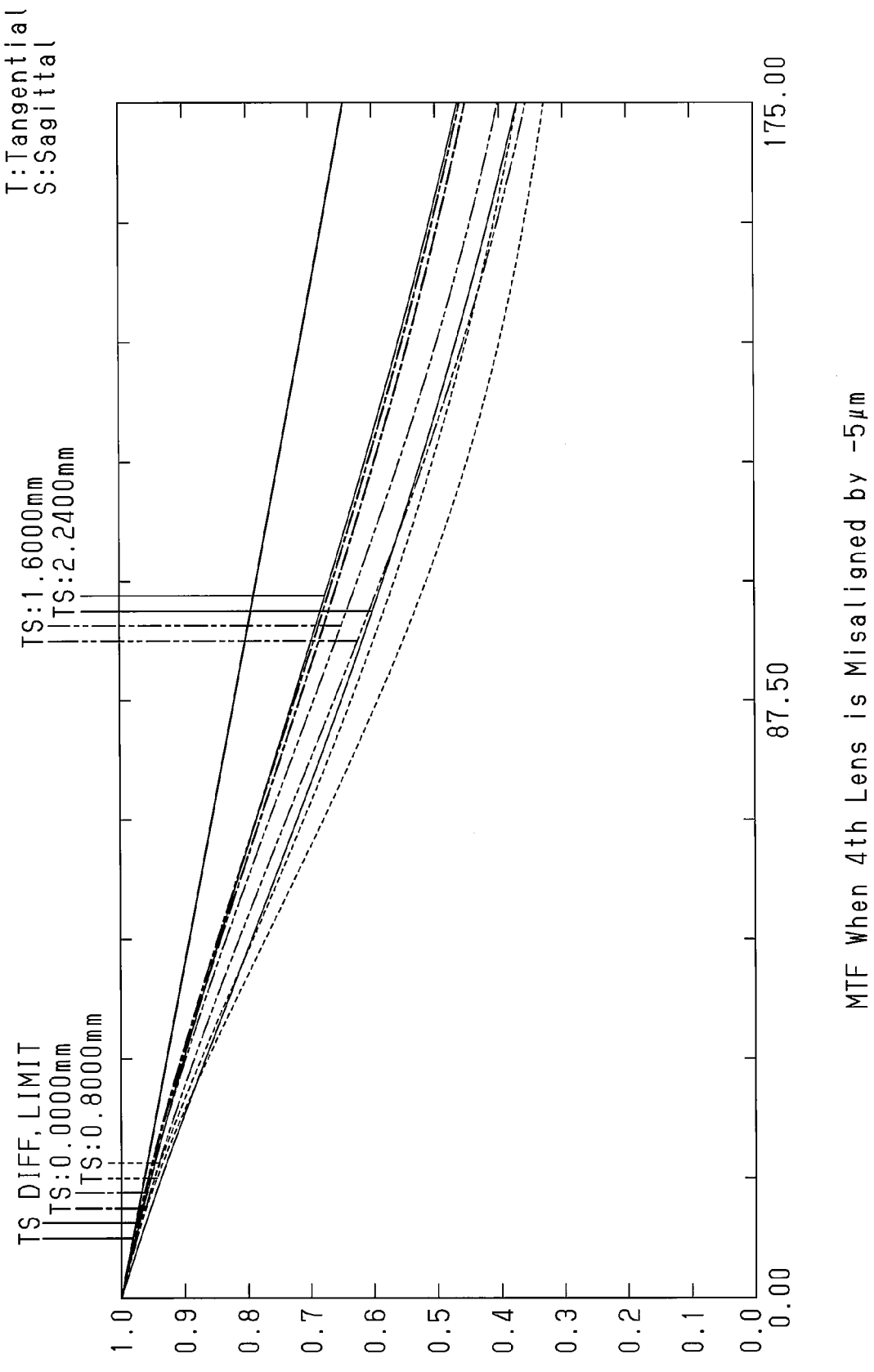
FIG. 12 is a graph showing the transfer function (MTF), which indicates one of the characteristics of the lens unit in example 1, when the fourth lens is downwardly misaligned by 5 μm.
Figure 26:
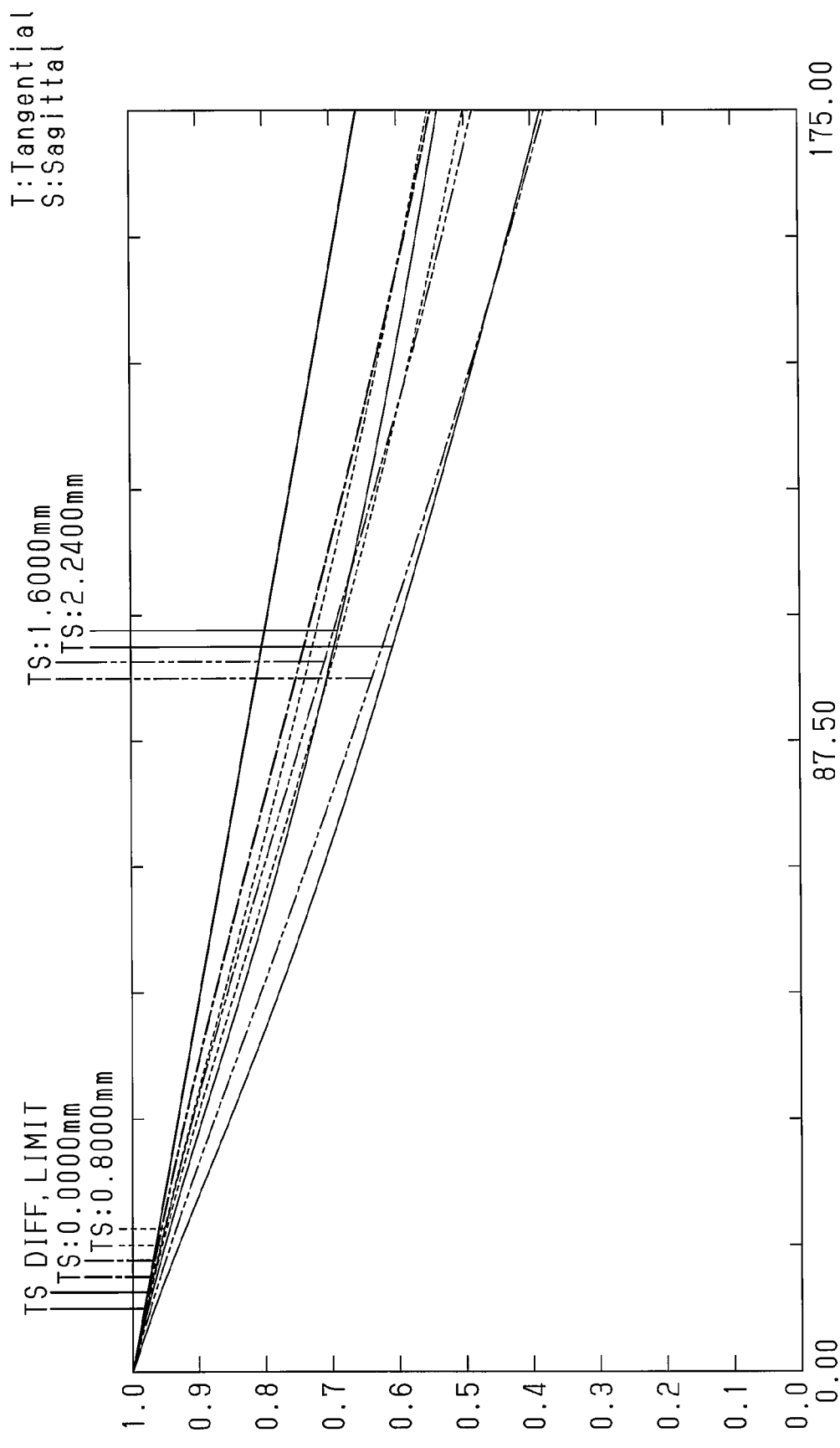
FIG. 26 is a graph showing the transfer function (MTF), which indicates one of the characteristics of the lens unit in comparative example 2.
Figure 38:
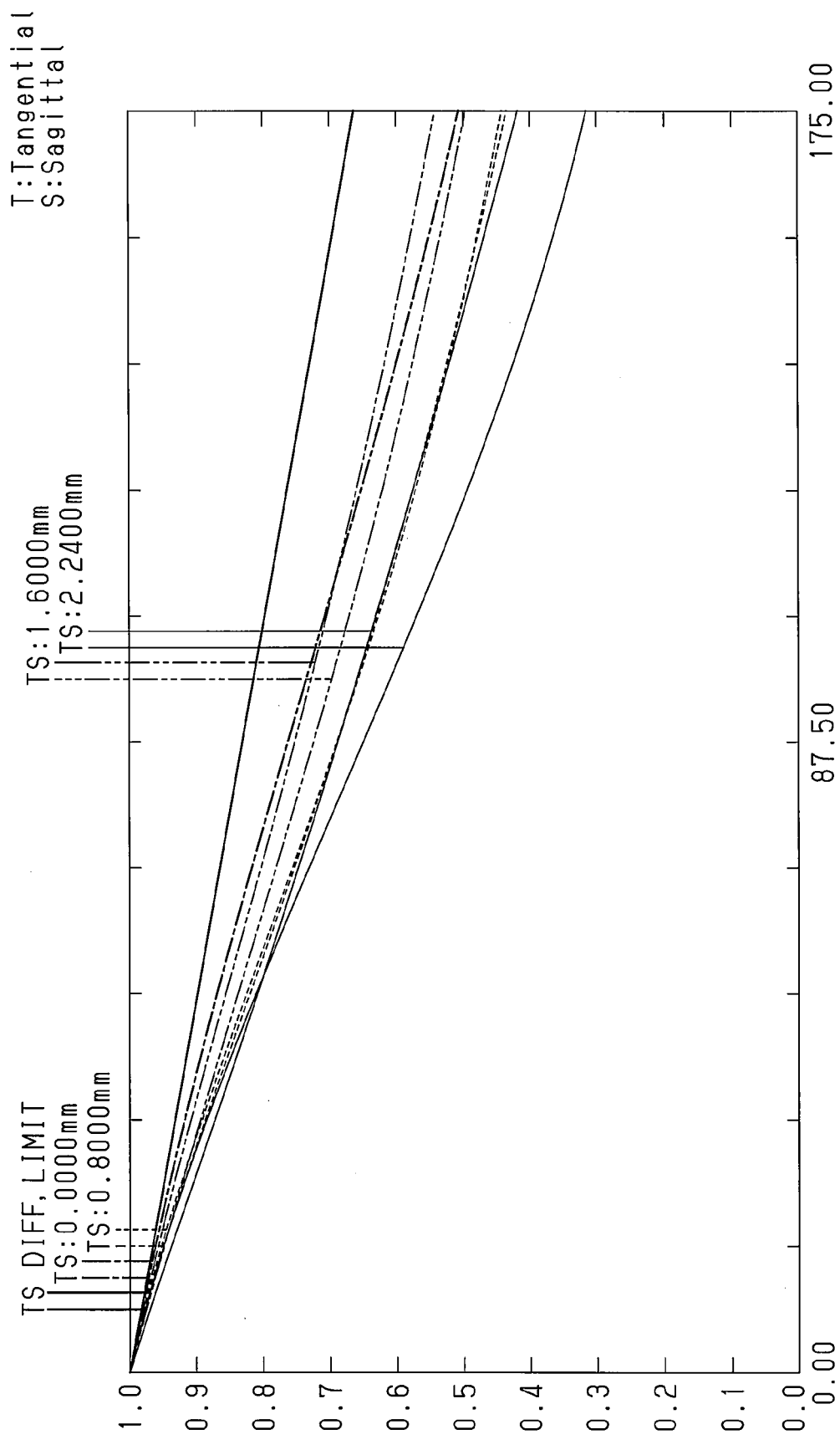
FIG. 38 is a graph showing the transfer function (MTF), which indicates one of the characteristics of the lens unit in comparative example 3.

The graph of FIG. 4 showing the transfer function (MTF) for the lens unit of example 1 will now be compared with the graphs of FIGS. 14, 26, and 38 respectively showing the transfer functions (MTF) for the lens units of comparative examples 1, 2, and 3. There is no significant difference between the graphs, and it is apparent that example 1 maintains the same MTF characteristics as the prior art.

The graph of FIG. 5A showing the curvature of field in the lens unit of example 1 will now be compared with the graphs of FIGS. 15A, 27A, and 39A respectively showing the curvatures of field in the lens units of comparative examples 1, 2, and 3. Although the graphs show different shapes, there is not much difference between the graphs in the sagittal and tangential directions, and the curvature of field in example 1 is suppressed in the same manner as in comparative examples 1 to 3.

The graph of FIG. 5B showing the distortion aberration in the lens unit of example 1 will now be compared with the graphs of FIGS. 15B, 27B, and 39B respectively showing the distortion aberration in the lens units of comparative examples 1, 2, and 3. Although the graphs show different shapes, there is not much difference between the graphs in the sagittal and tangential directions, and the distortion aberration in example 1 is suppressed in the same manner as in comparative examples 1 to 3.

Figure 16:
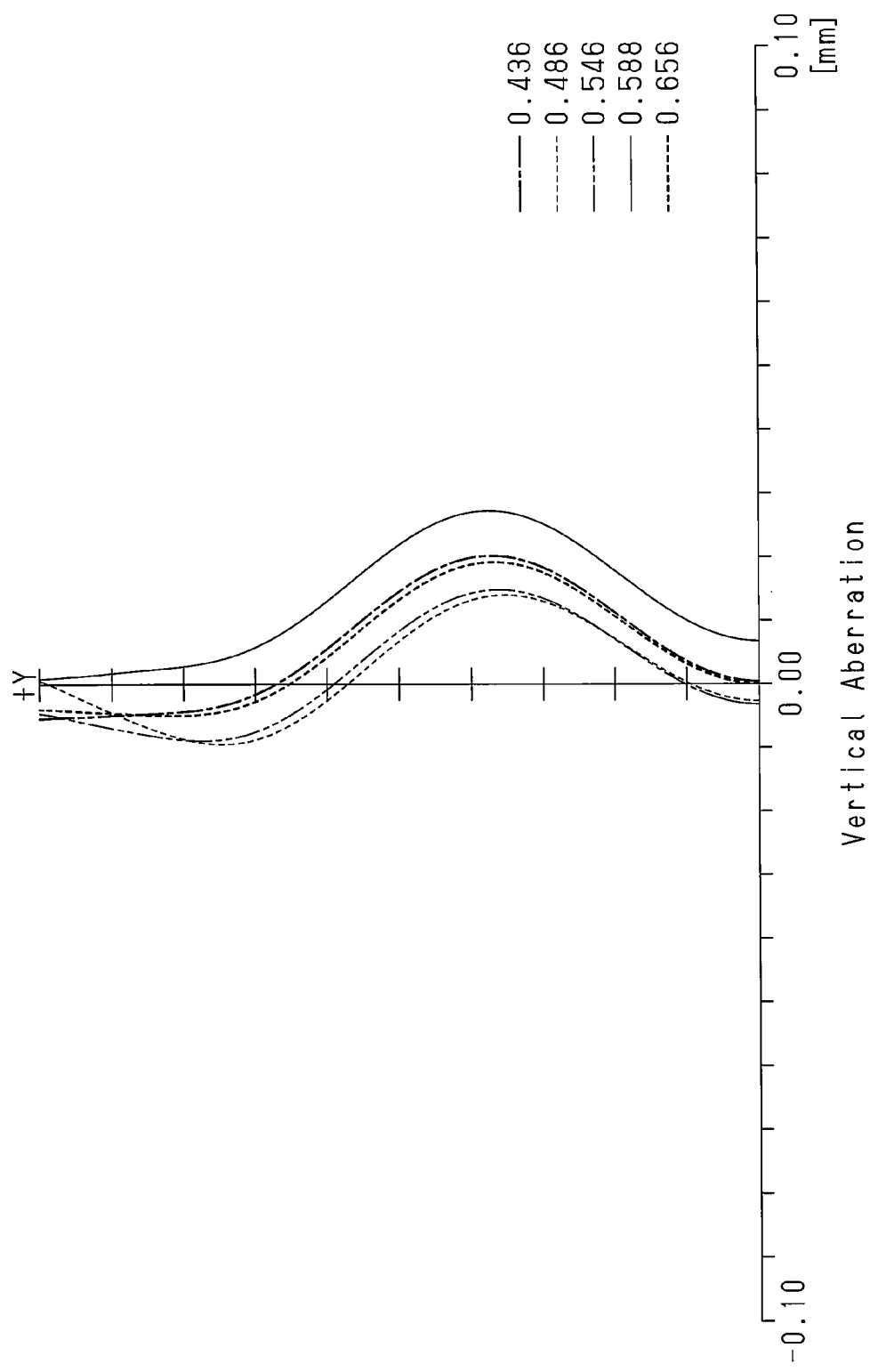
FIG. 16 is a graph showing a vertical aberration, which indicates one of the characteristics of the lens unit in comparative example 1.
Figure 17:
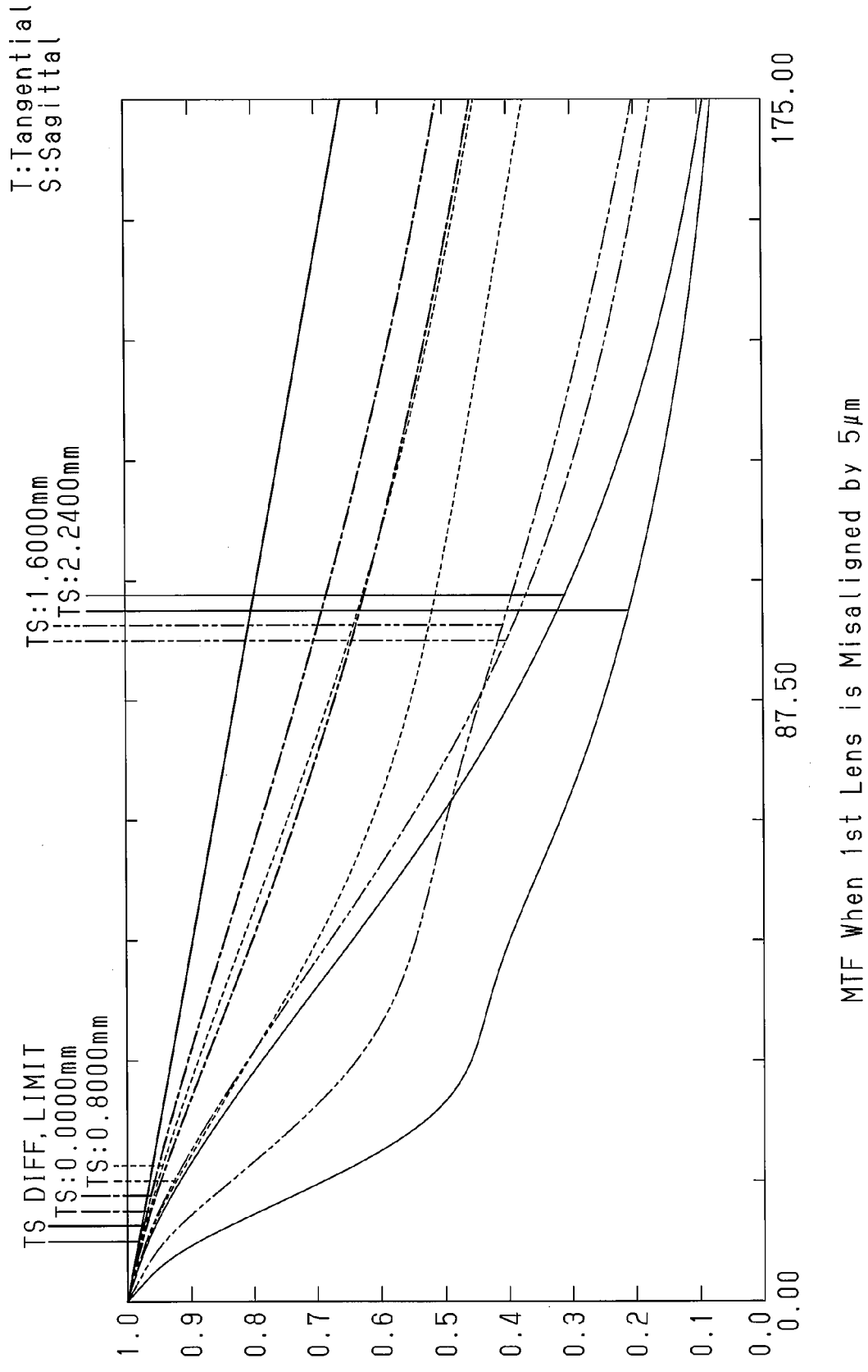
FIG. 17 is a graph showing the transfer function (MTF), which indicates one of the characteristics of the lens unit in comparative example 1, when a first lens is upwardly misaligned by 5 μm.
Figure 18:
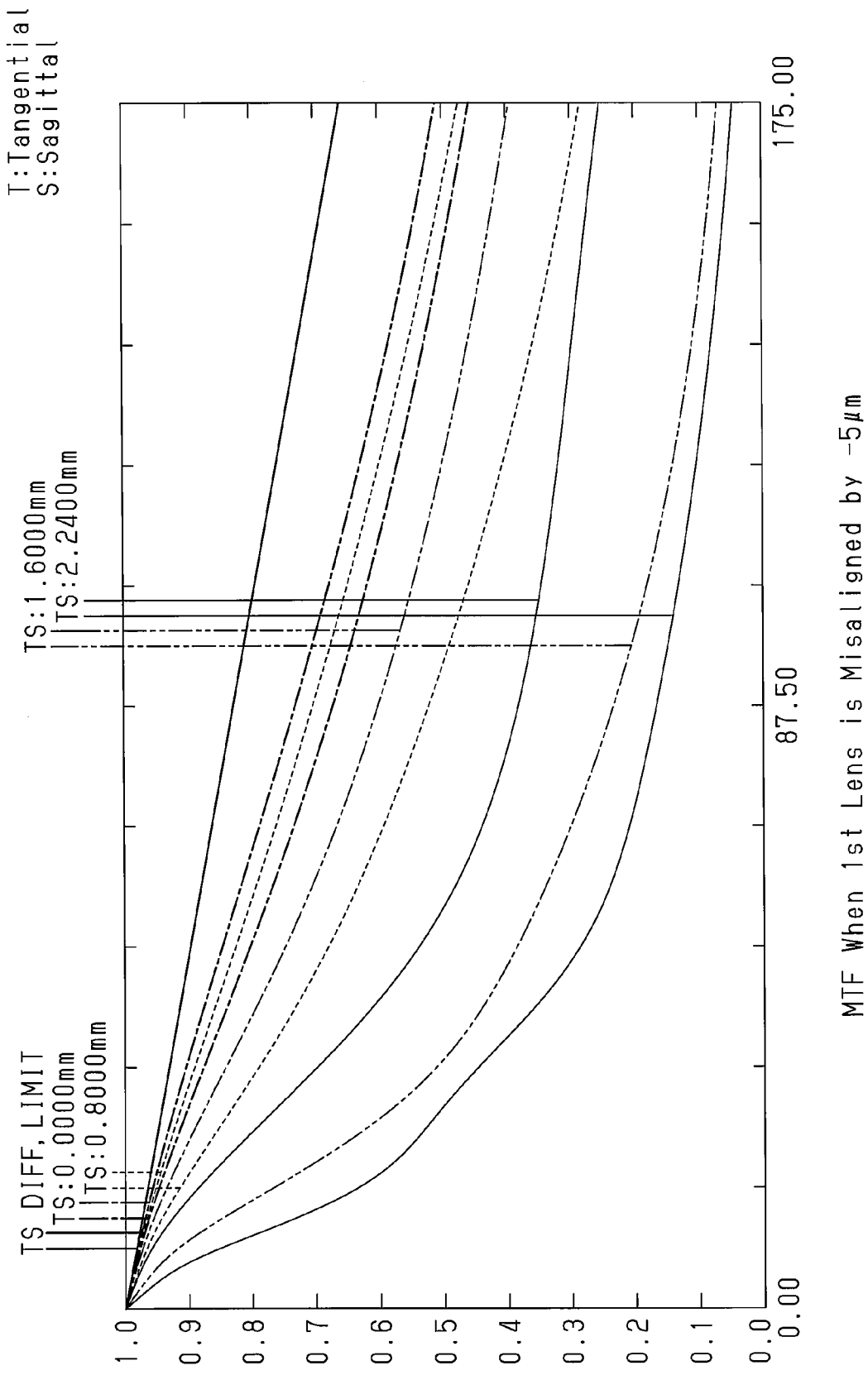
FIG. 18 is a graph showing the transfer function (MTF), which indicates one of the characteristics of the lens unit in comparative example 1, when the first lens is downwardly misaligned by 5 μm.
Figure 19:
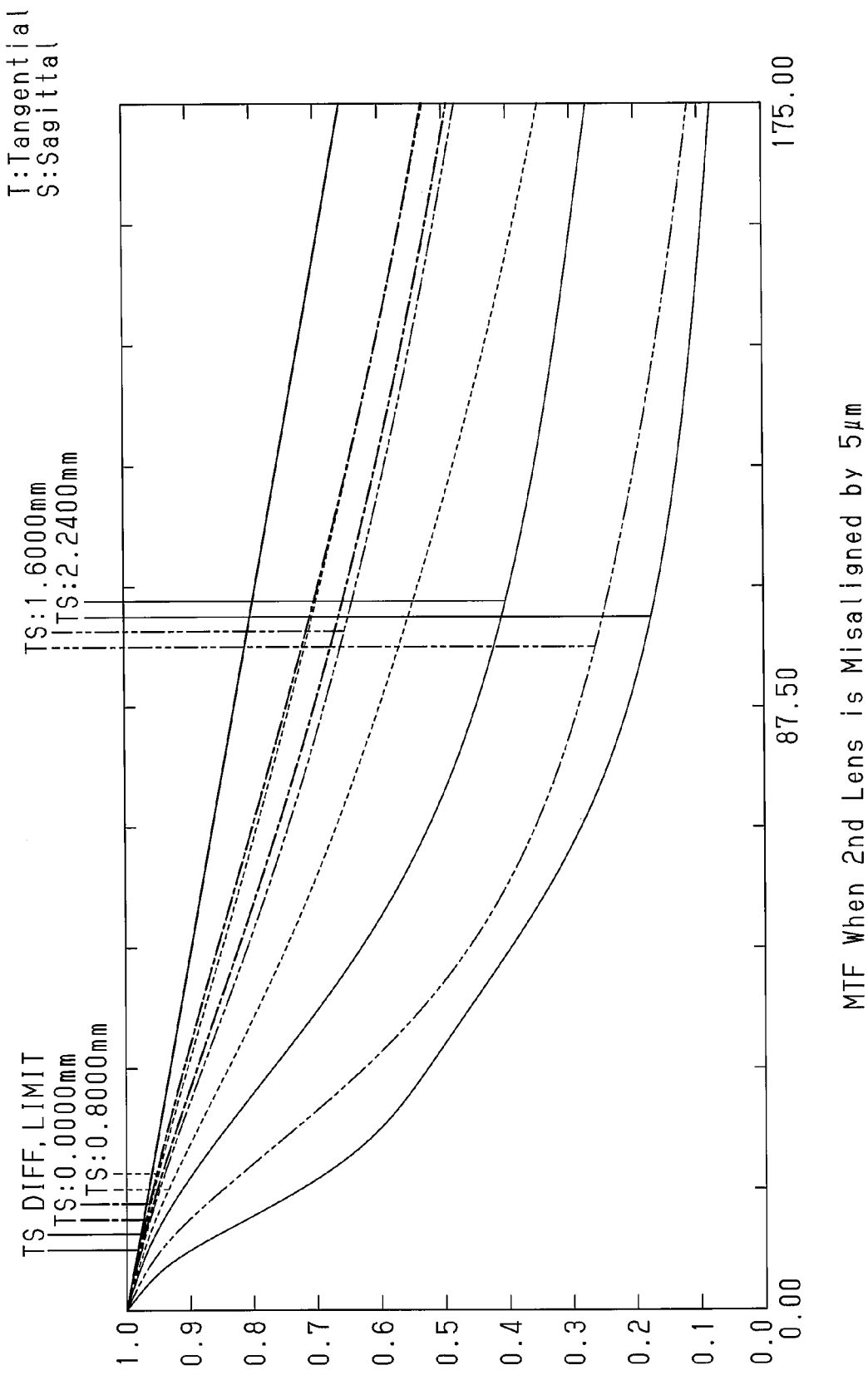
FIG. 19 is a graph showing the transfer function (MTF), which indicates one of the characteristics of the lens unit in comparative example 1, when a second lens is upwardly misaligned by 5 μm.
Figure 20:
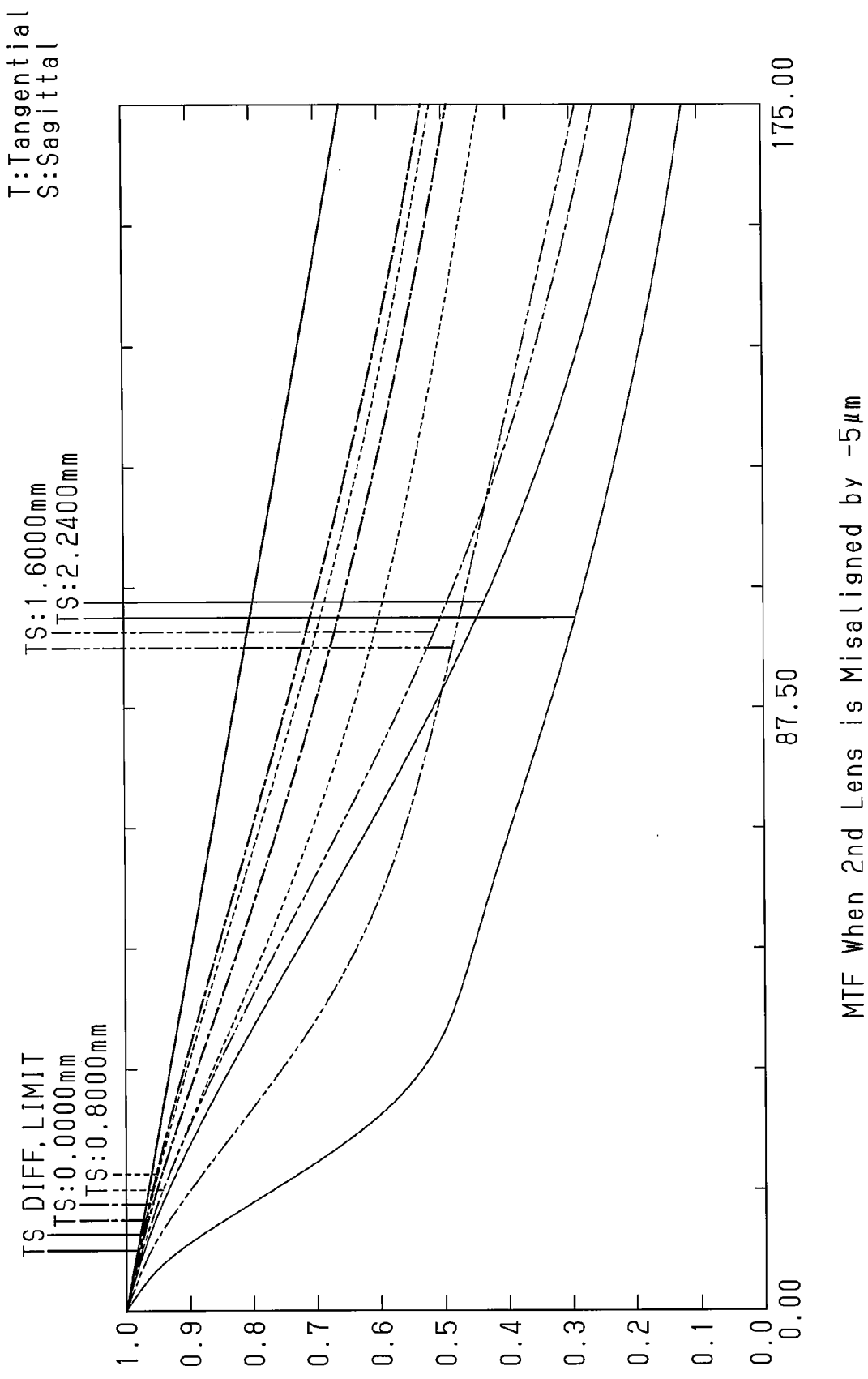
FIG. 20 is a graph showing the transfer function (MTF), which indicates one of the characteristics of the lens unit in comparative example 1, when the second lens is downwardly misaligned by 5 μm.
Figure 21:
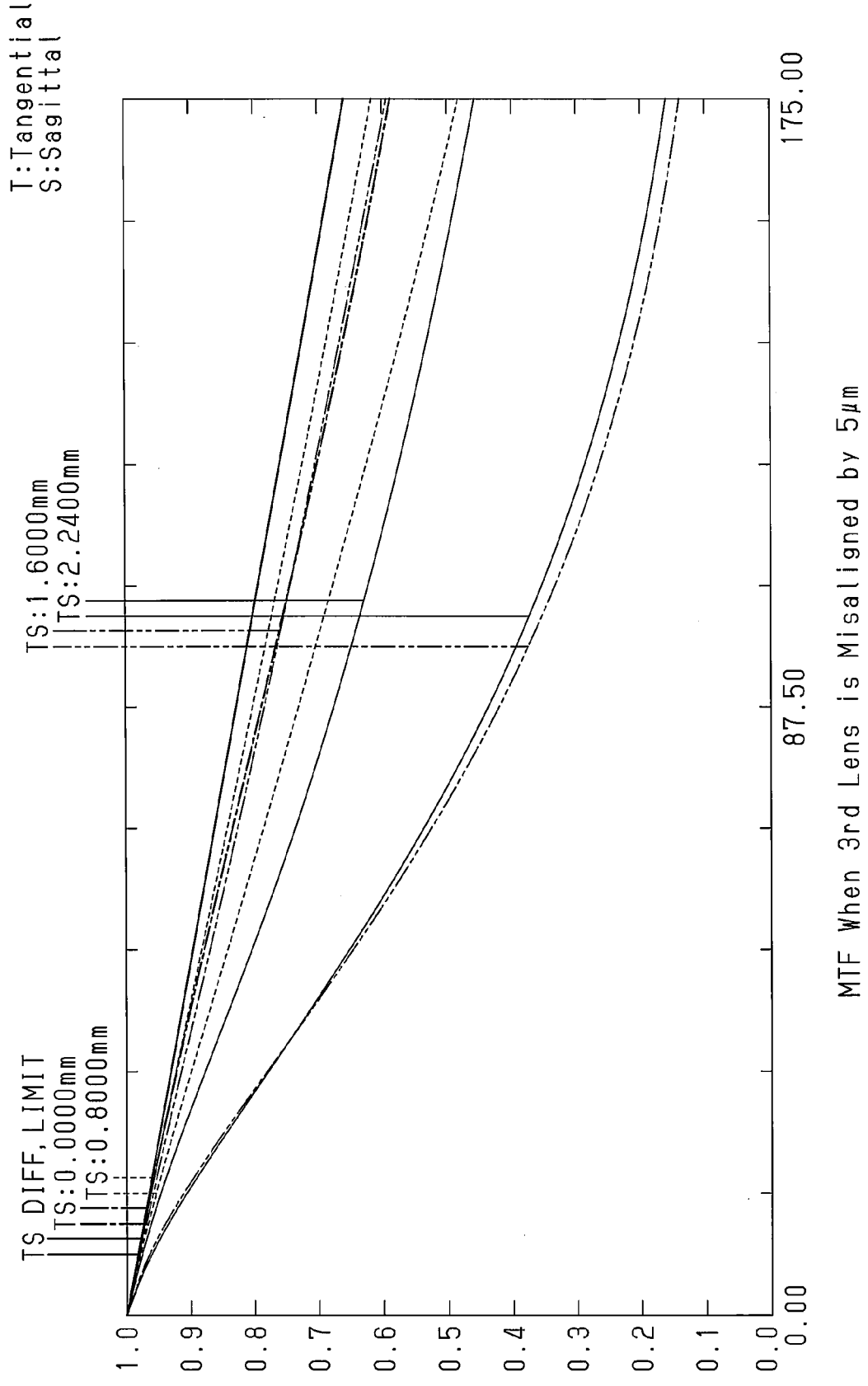
FIG. 21 is a graph showing the transfer function (MTF), which indicates one of the characteristics of the lens unit in comparative example 1, when a third lens is upwardly misaligned by 5 μm.
Figure 22:
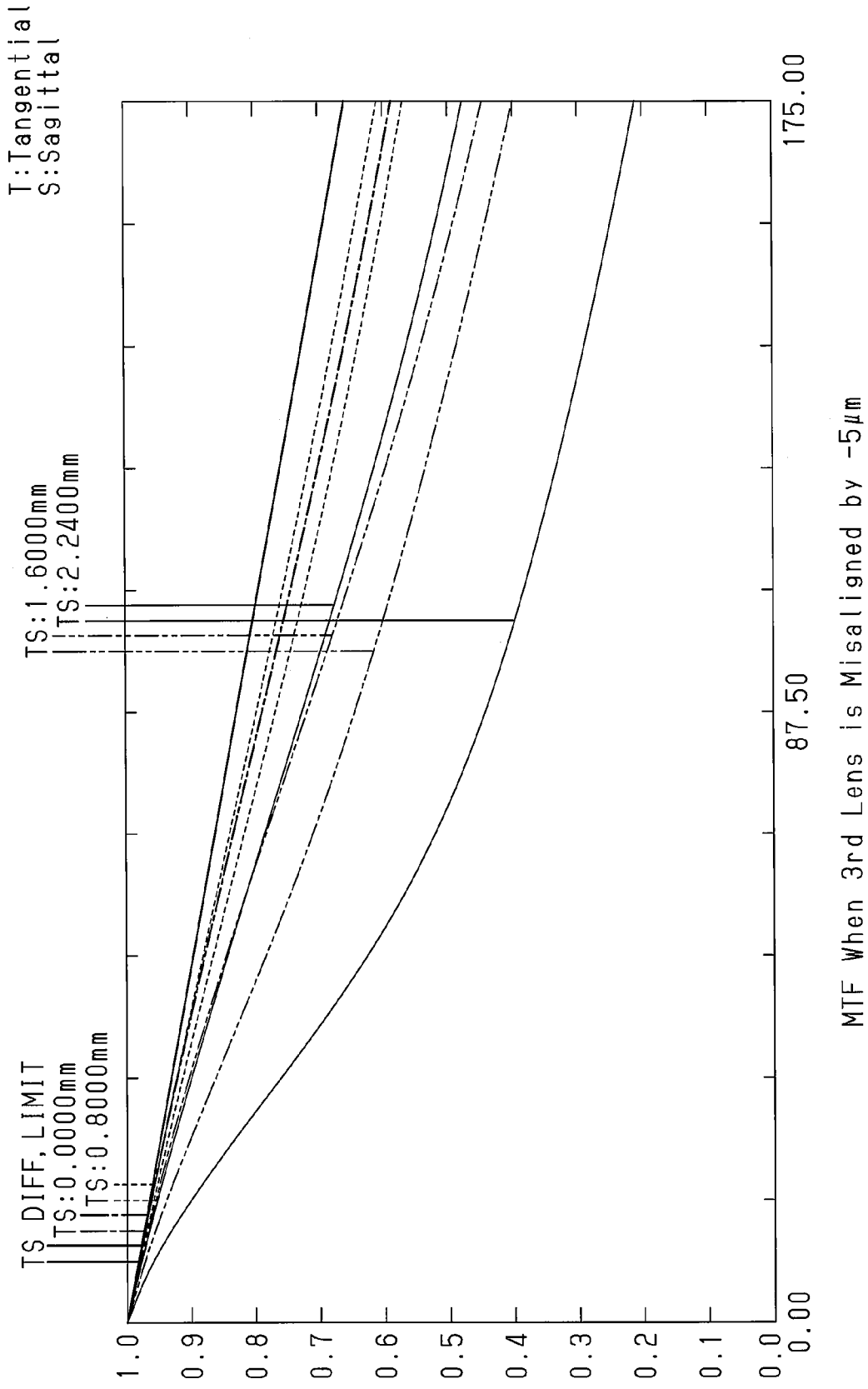
FIG. 22 is a graph showing the transfer function (MTF), which indicates one of the characteristics of the lens unit in comparative example 1, when the third lens is downwardly misaligned by 5 μm.
Figure 23:
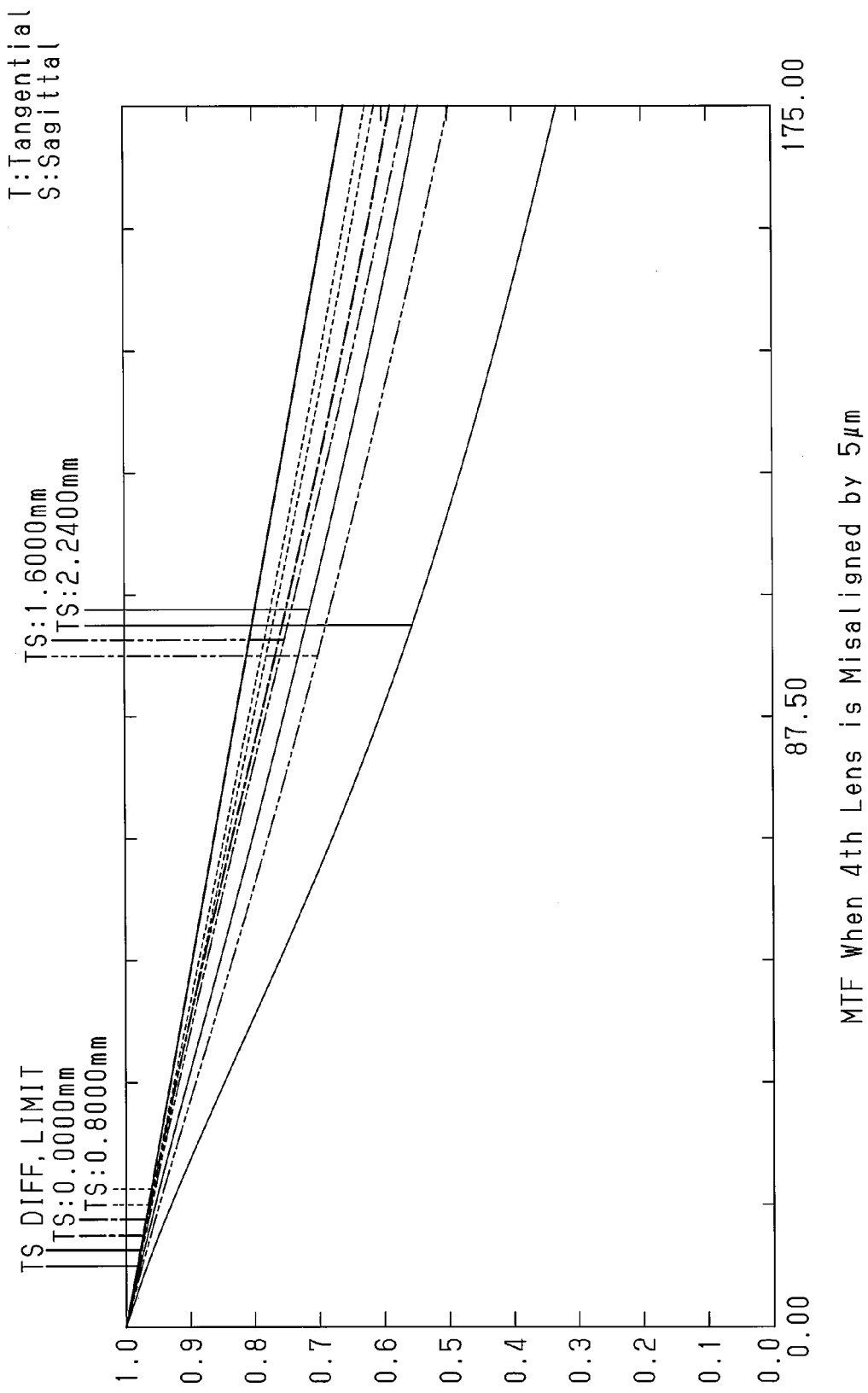
FIG. 23 is a graph showing the transfer function (MTF), which indicates one of the characteristics of the lens unit in comparative example 1, when a fourth lens is upwardly misaligned by 5 μm.
Figure 24:
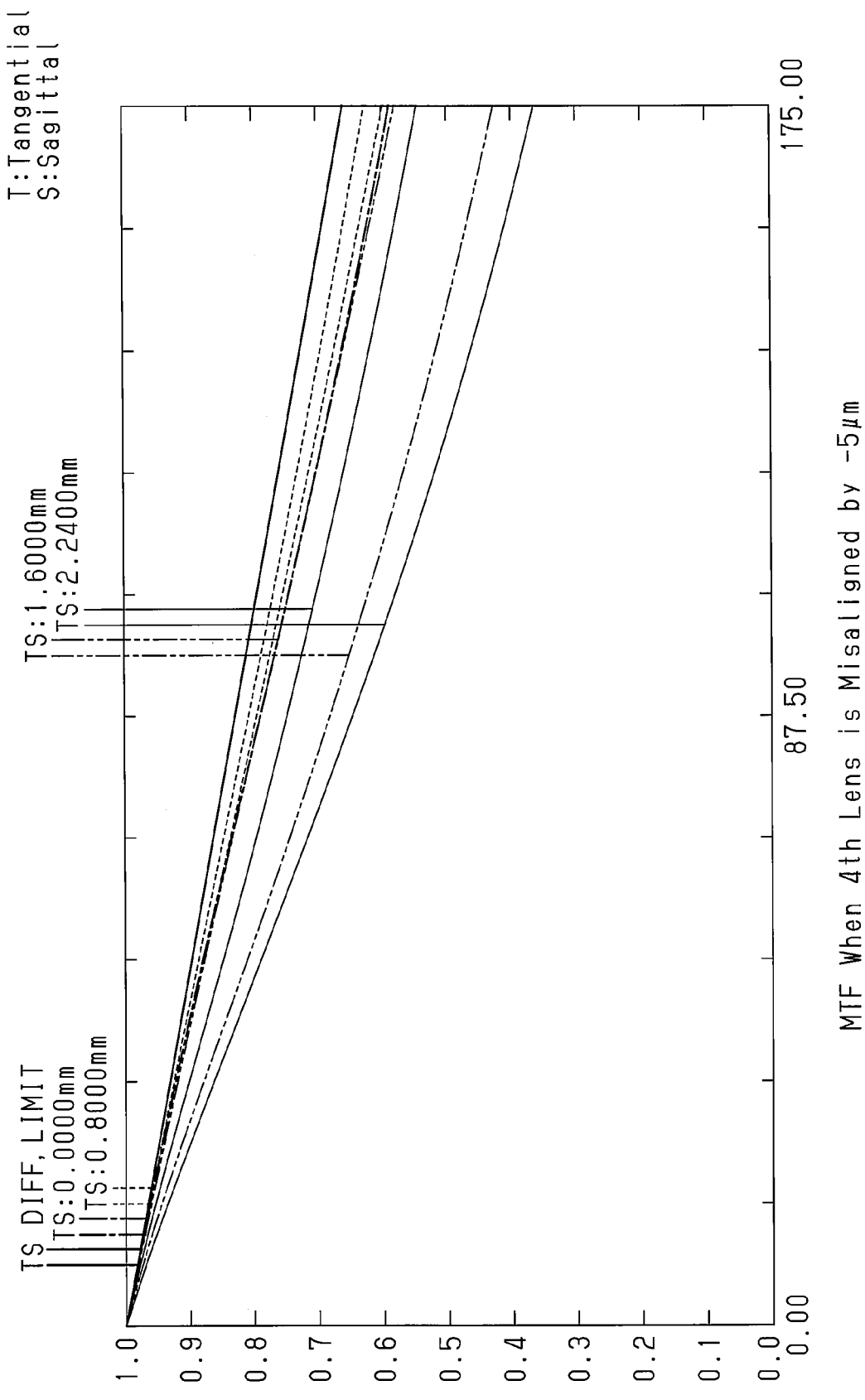
FIG. 24 is a graph showing the transfer function (MTF), which indicates one of the characteristics of the lens unit in comparative example 1, when the fourth lens is downwardly misaligned by 5 μm.
Figure 28:
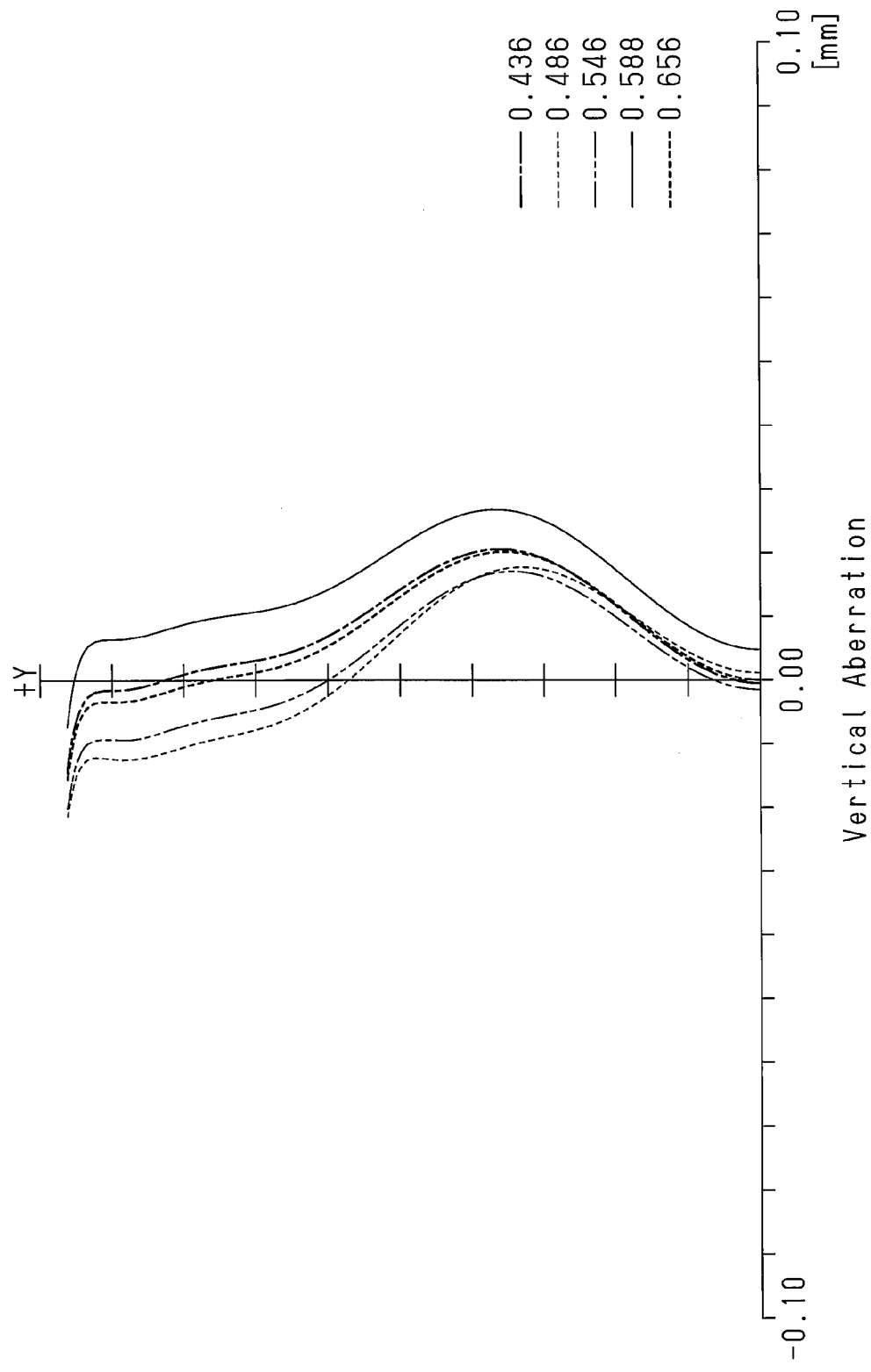
FIG. 28 is a graph showing a vertical aberration, which indicates one of the characteristics of the lens unit in comparative example 2.
Figure 29:
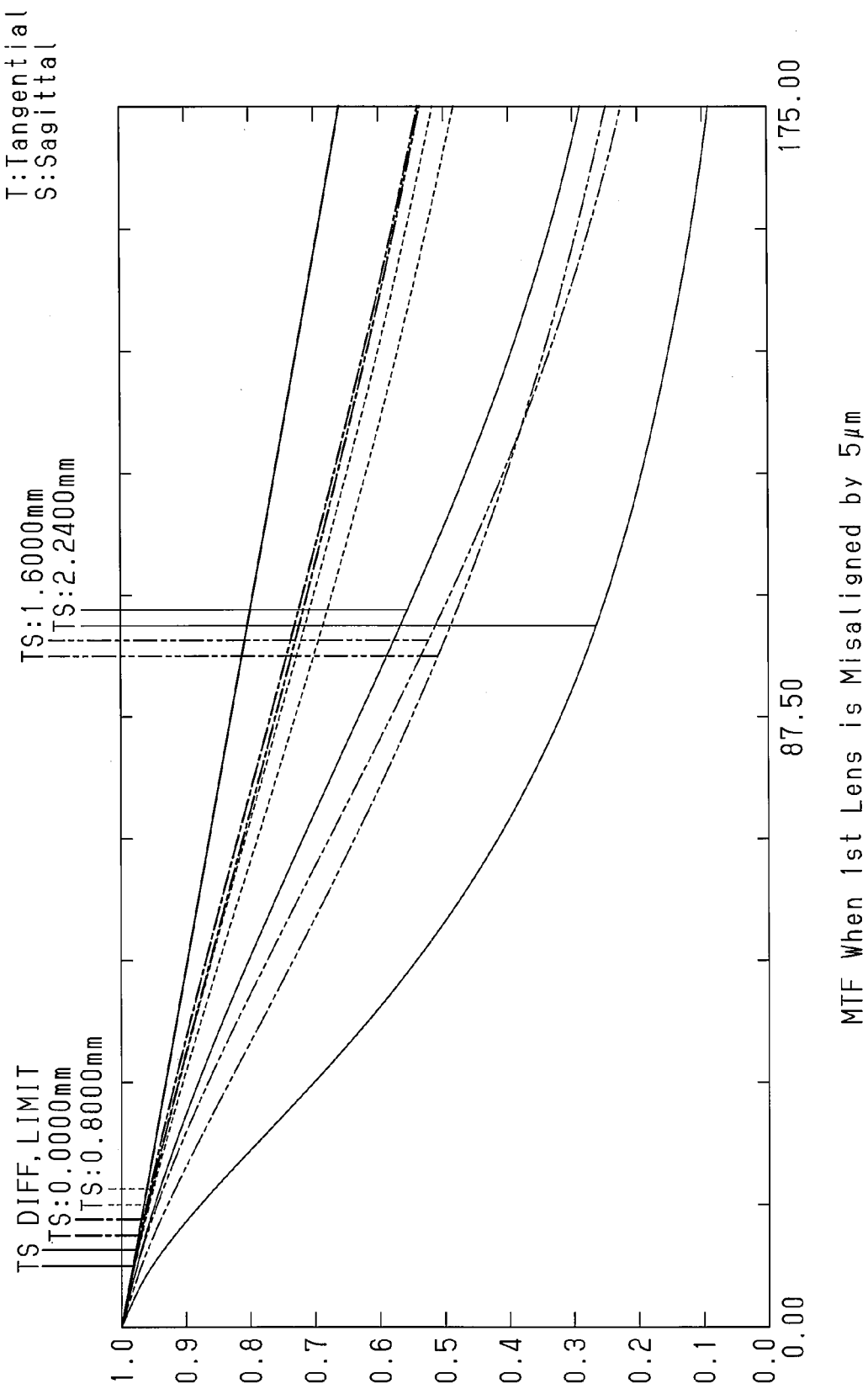
FIG. 29 is a graph showing the transfer function (MTF), which indicates one of the characteristics of the lens unit in comparative example 2, when a first lens is upwardly misaligned by 5 μm.
Figure 30:
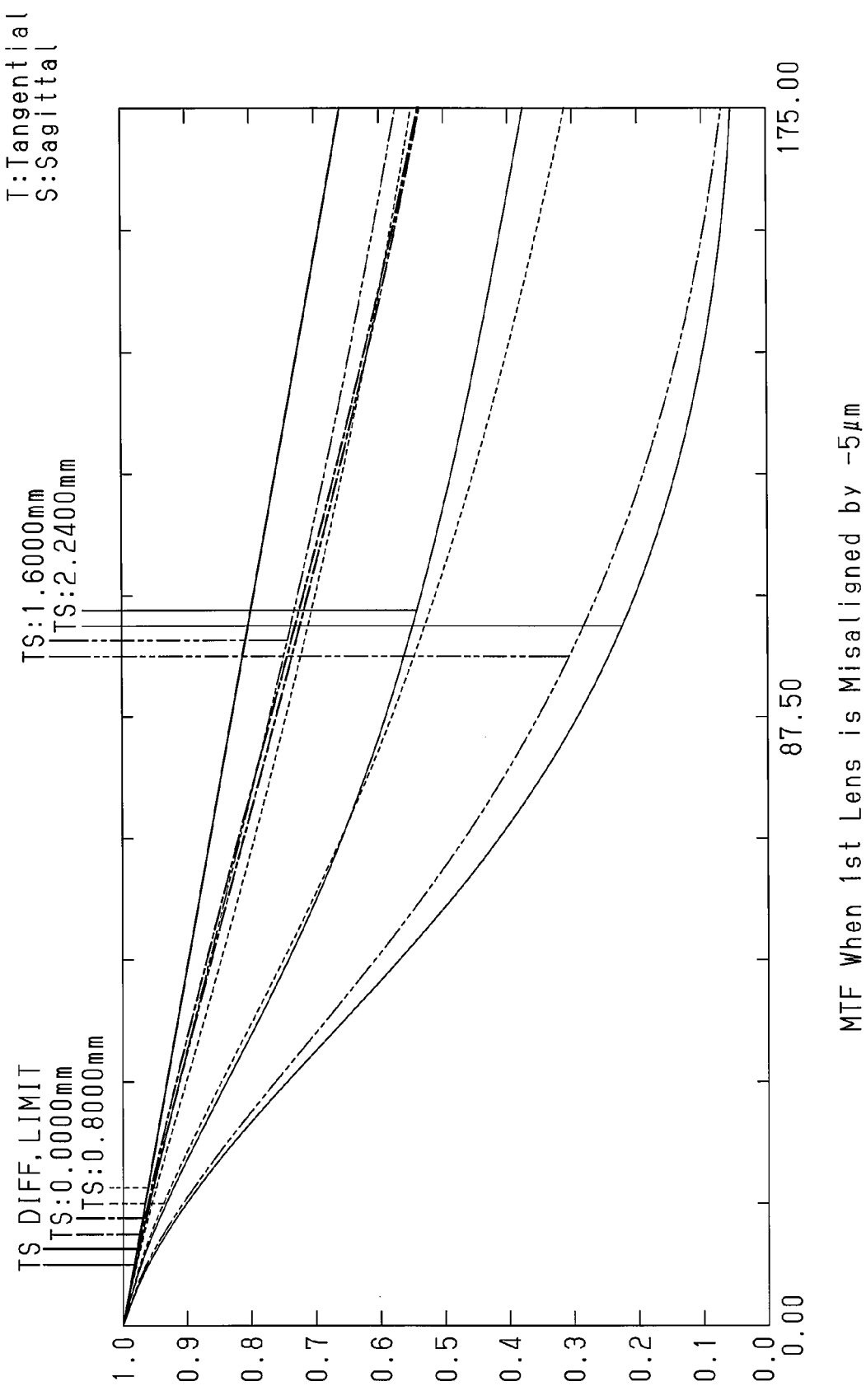
FIG. 30 is a graph showing the transfer function (MTF), which indicates one of the characteristics of the lens unit in comparative example 2, when the first lens is downwardly misaligned by 5 μm.
Figure 31:
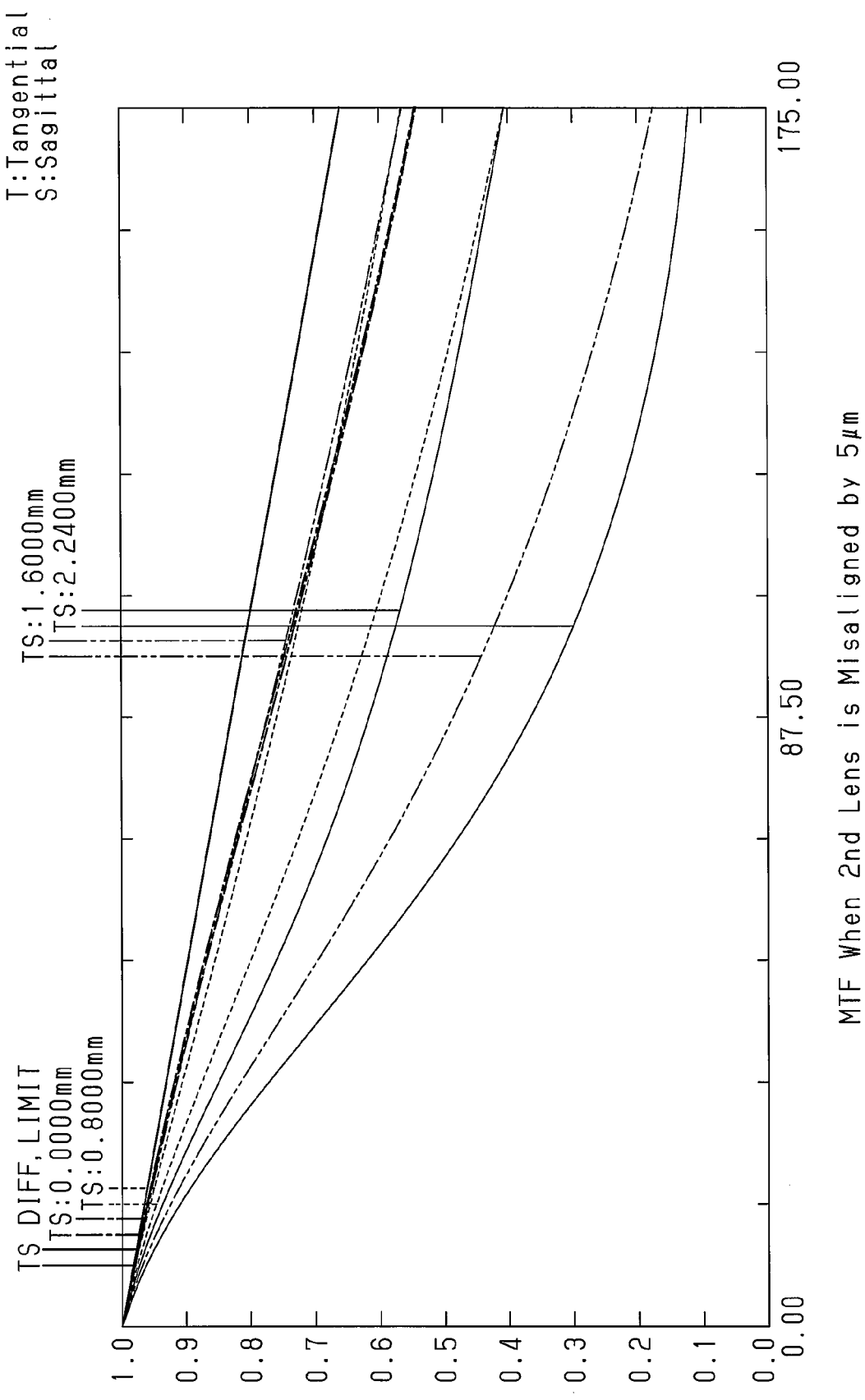
FIG. 31 is a graph showing the transfer function (MTF), which indicates one of the characteristics of the lens unit in comparative example 2, when a second lens is upwardly misaligned by 5 μm.
Figure 32:
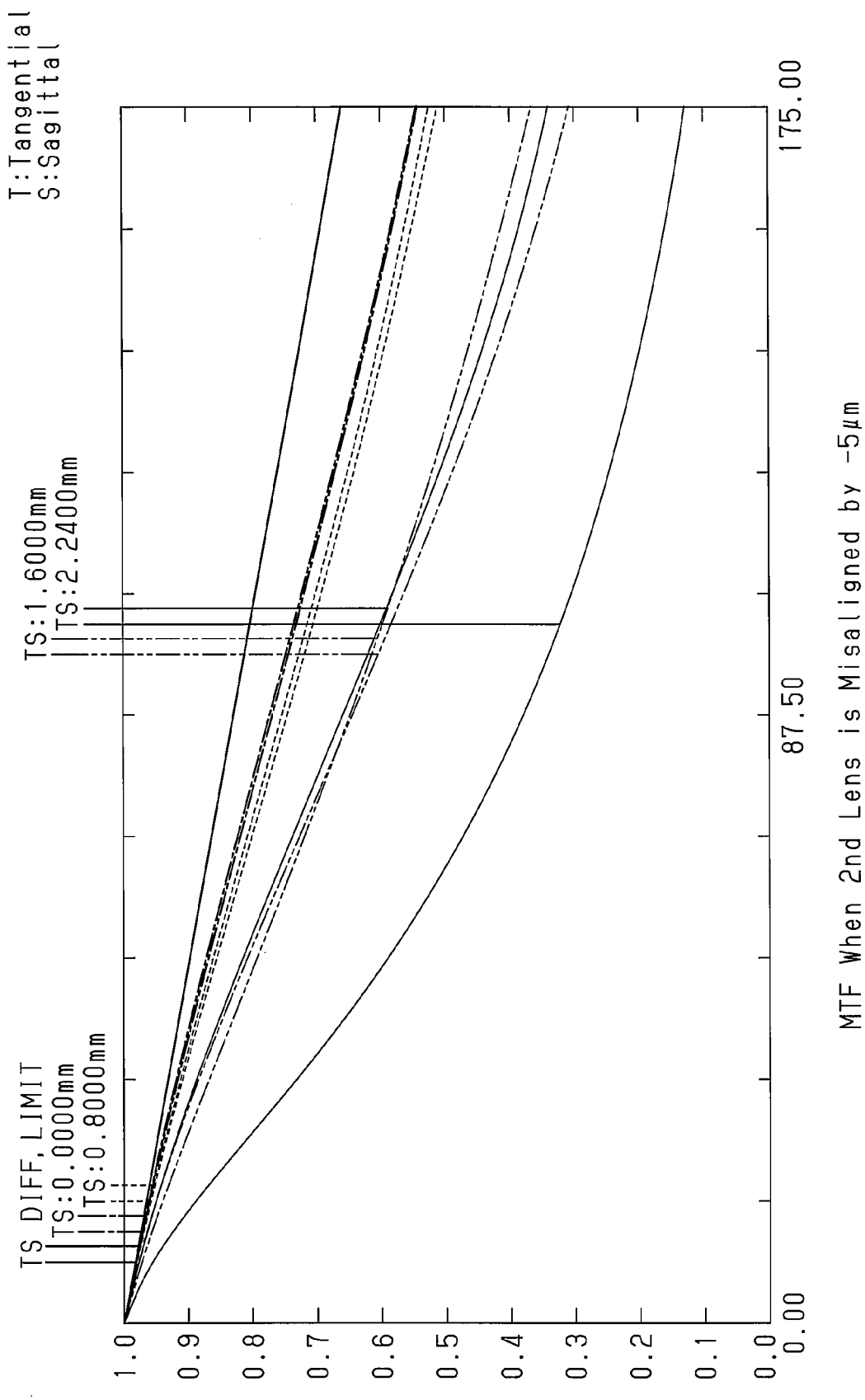
FIG. 32 is a graph showing the transfer function (MTF), which indicates one of the characteristics of the lens unit in comparative example 2, when the second lens is downwardly misaligned by 5 μm.
Figure 33:
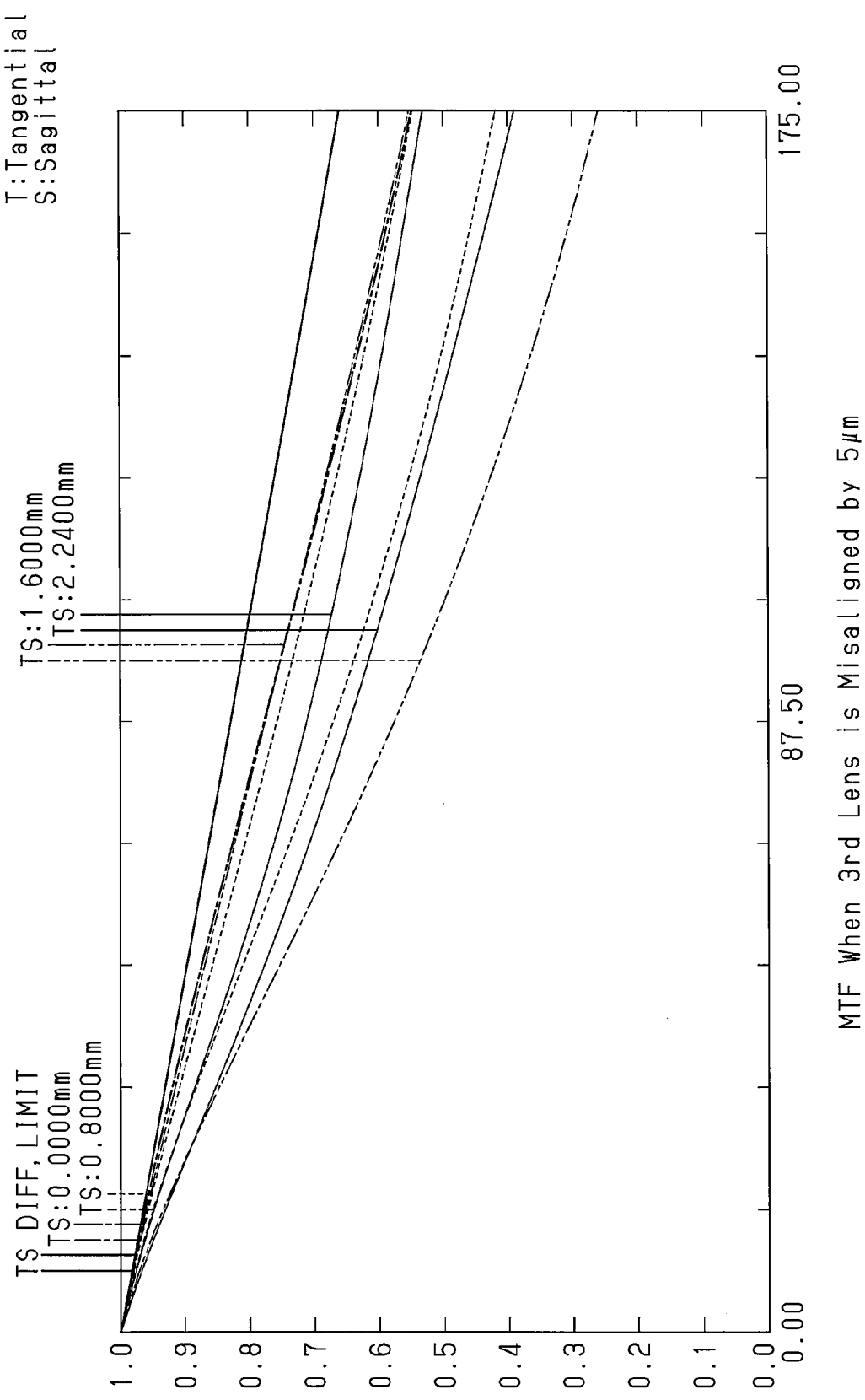
FIG. 33 is a graph showing the transfer function (MTF), which indicates one of the characteristics of the lens unit in comparative example 2, when a third lens is upwardly misaligned by 5 μm.
Figure 34:
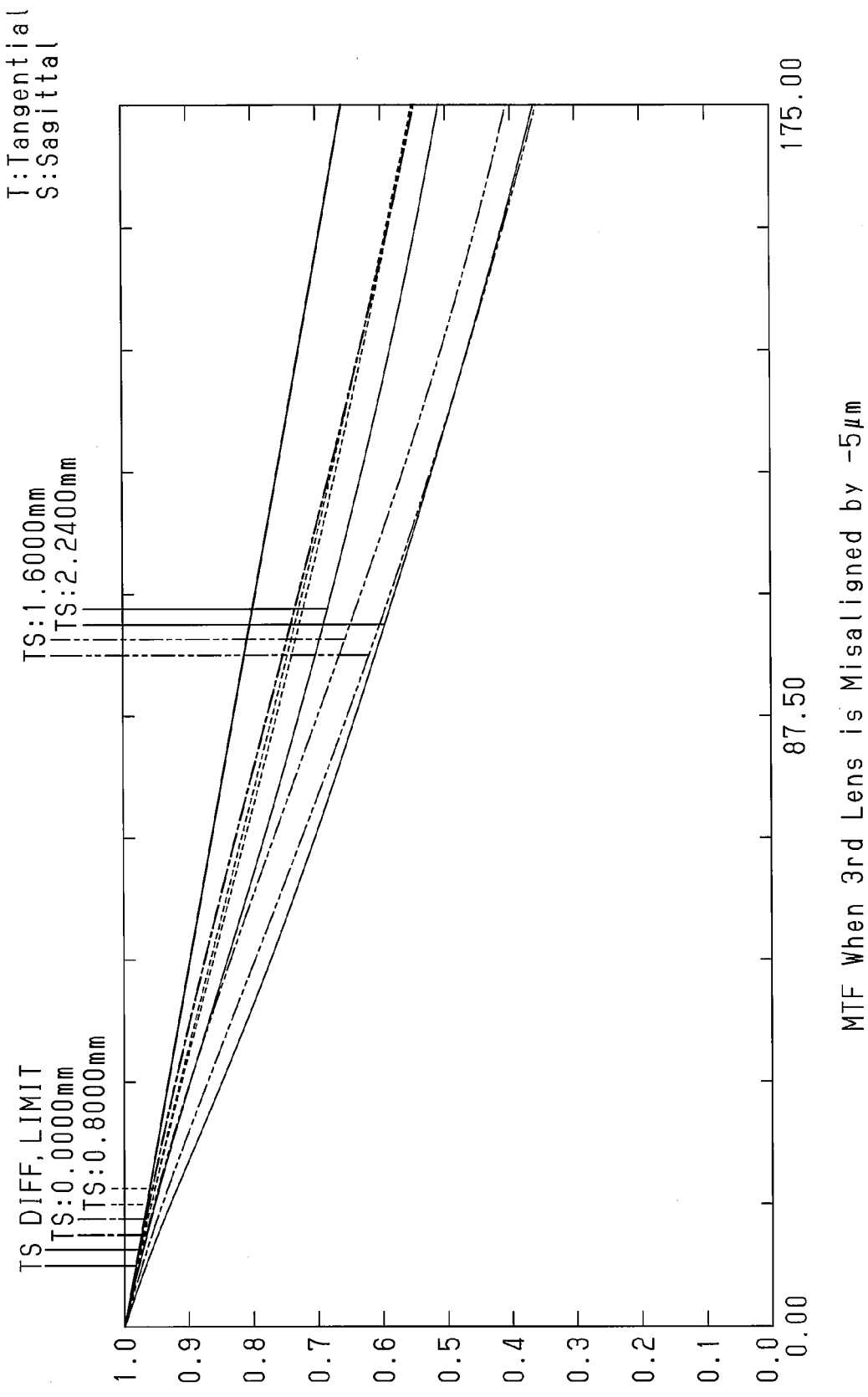
FIG. 34 is a graph showing the transfer function (MTF), which indicates one of the characteristics of the lens unit in comparative example 2, when the third lens is downwardly misaligned by 5 μm.
Figure 35:
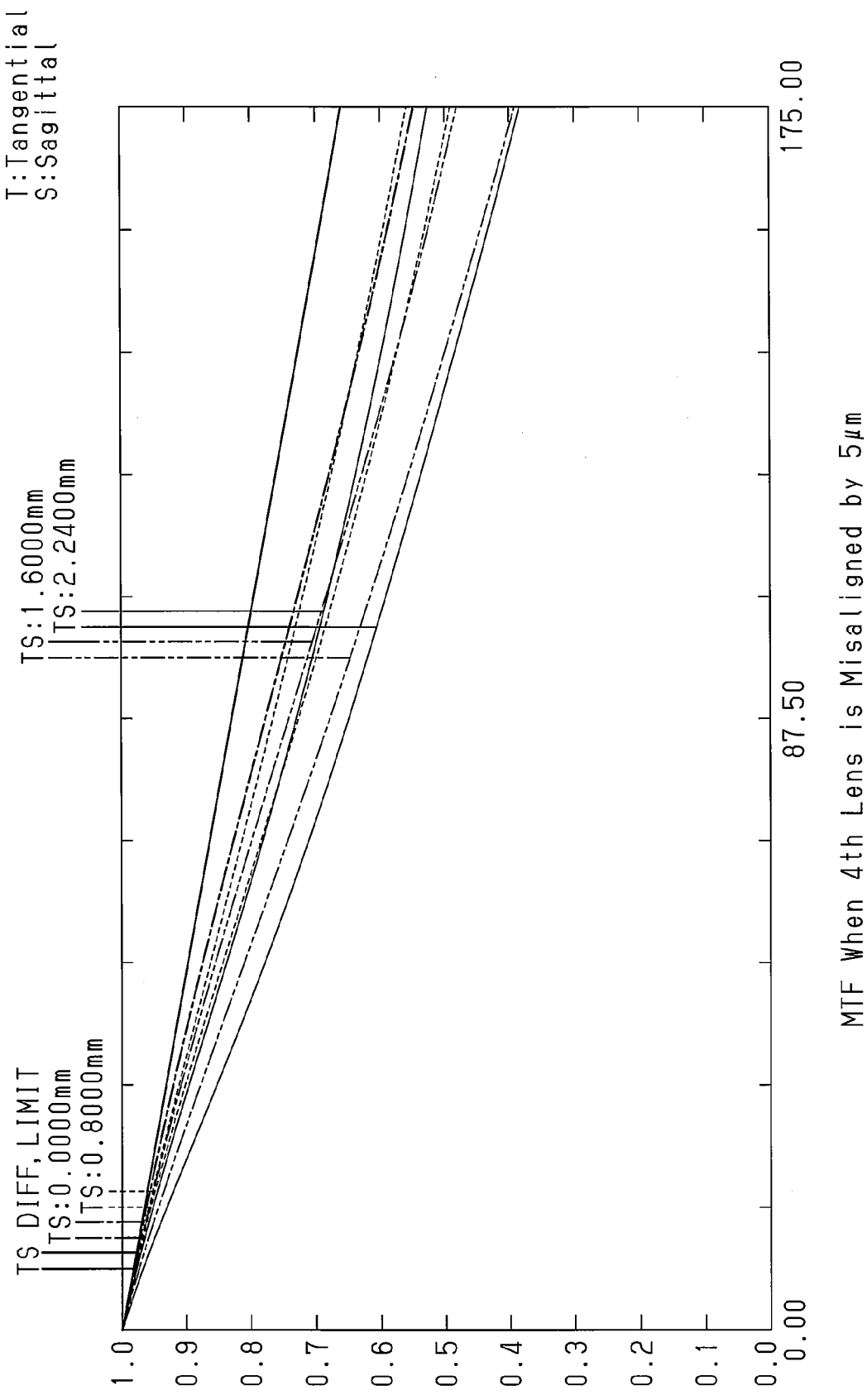
FIG. 35 is a graph showing the transfer function (MTF), which indicates one of the characteristics of the lens unit in comparative example 2, when a fourth lens is upwardly misaligned by 5 μm.
Figure 36:
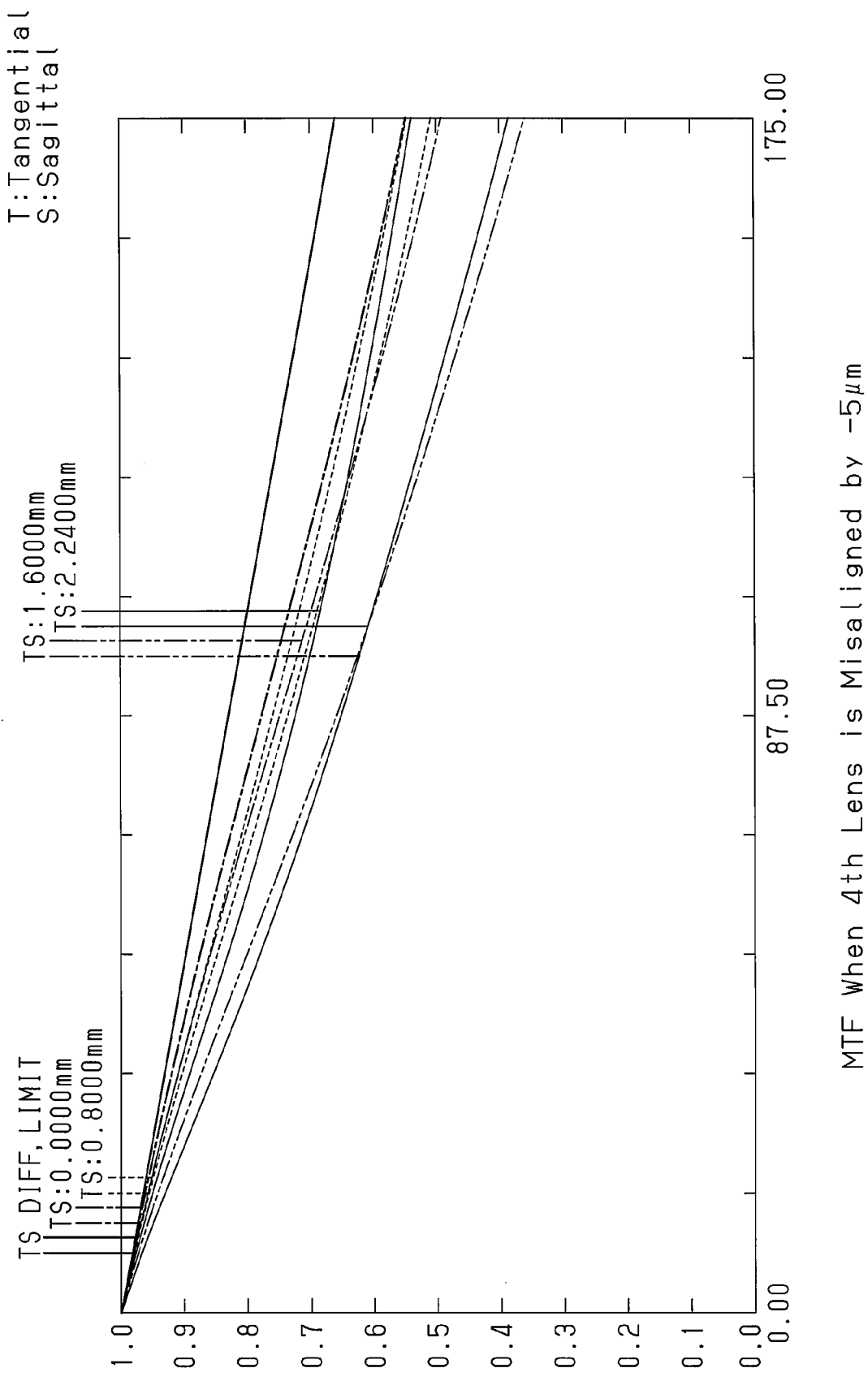
FIG. 36 is a graph showing the transfer function (MTF), which indicates one of the characteristics of the lens unit in comparative example 2, when the fourth lens is downwardly misaligned by 5 μm.
Figure 40:
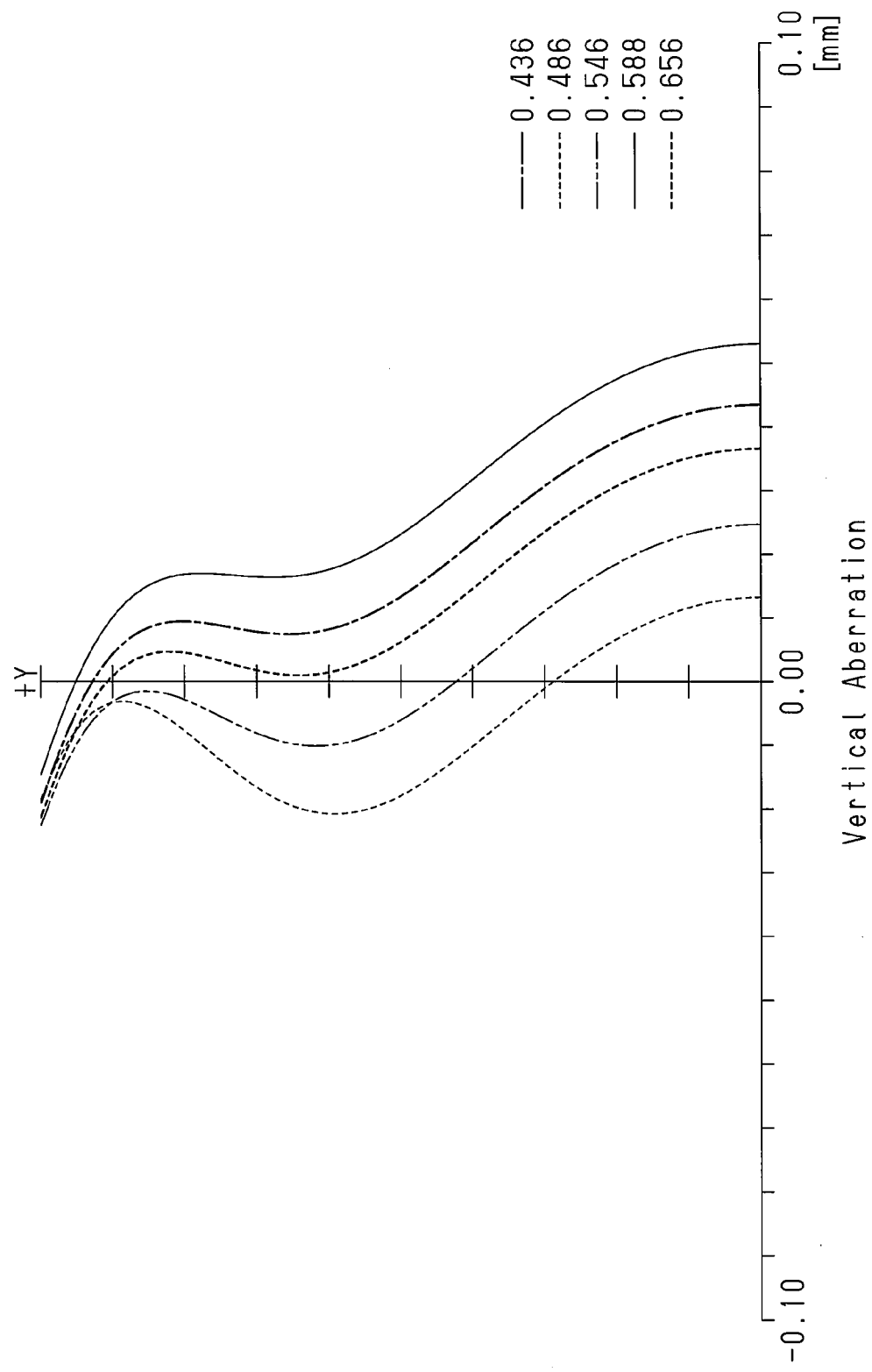
FIG. 40 is a graph showing a vertical aberration, which indicates one of the characteristics of the lens unit in comparative example 3.
Figure 41:
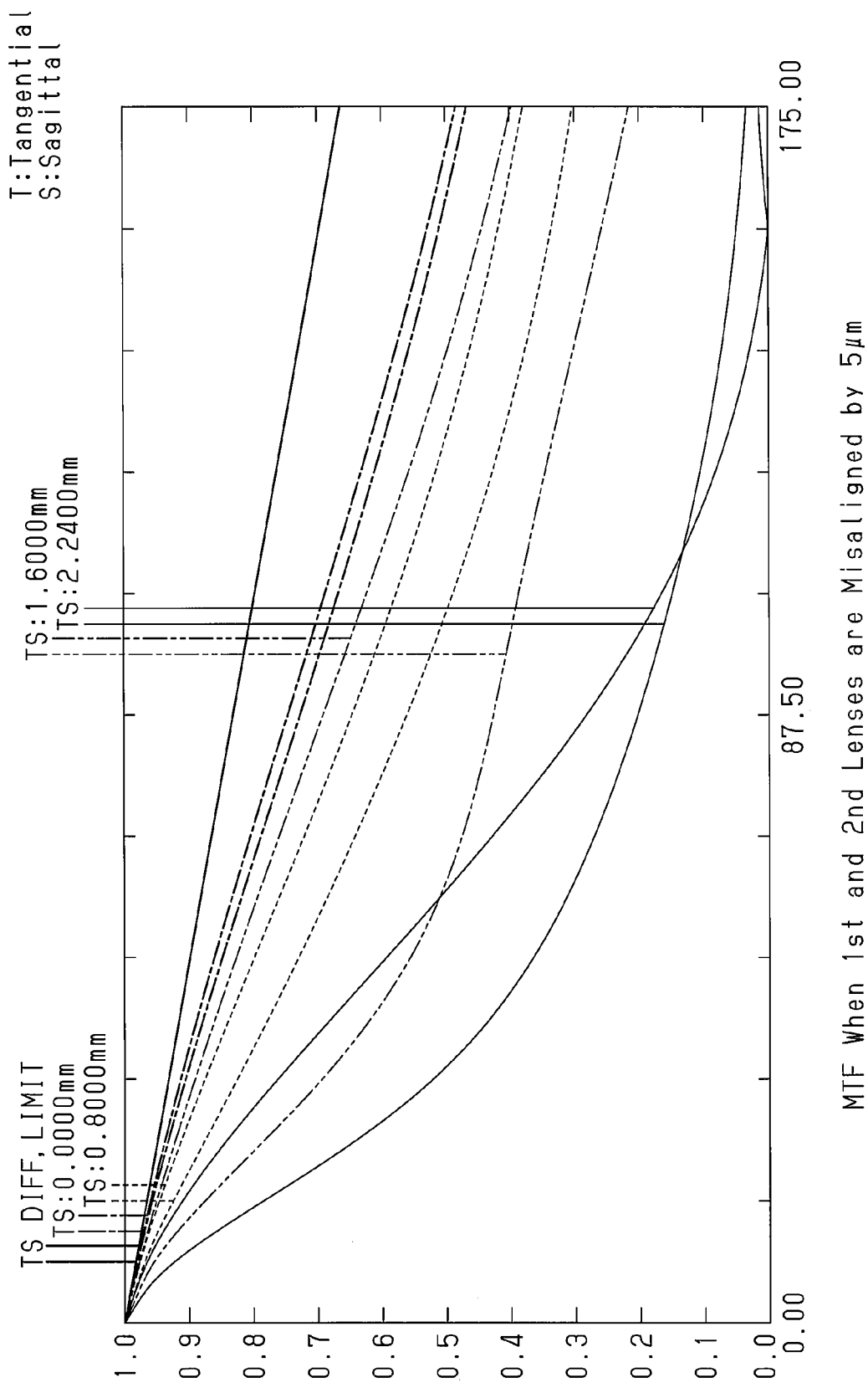
FIG. 41 is a graph showing the transfer function (MTF), which indicates one of the characteristics of the lens unit in comparative example 3, when a first lens and a second lens are upwardly misaligned by 5 μm.
Figure 42:
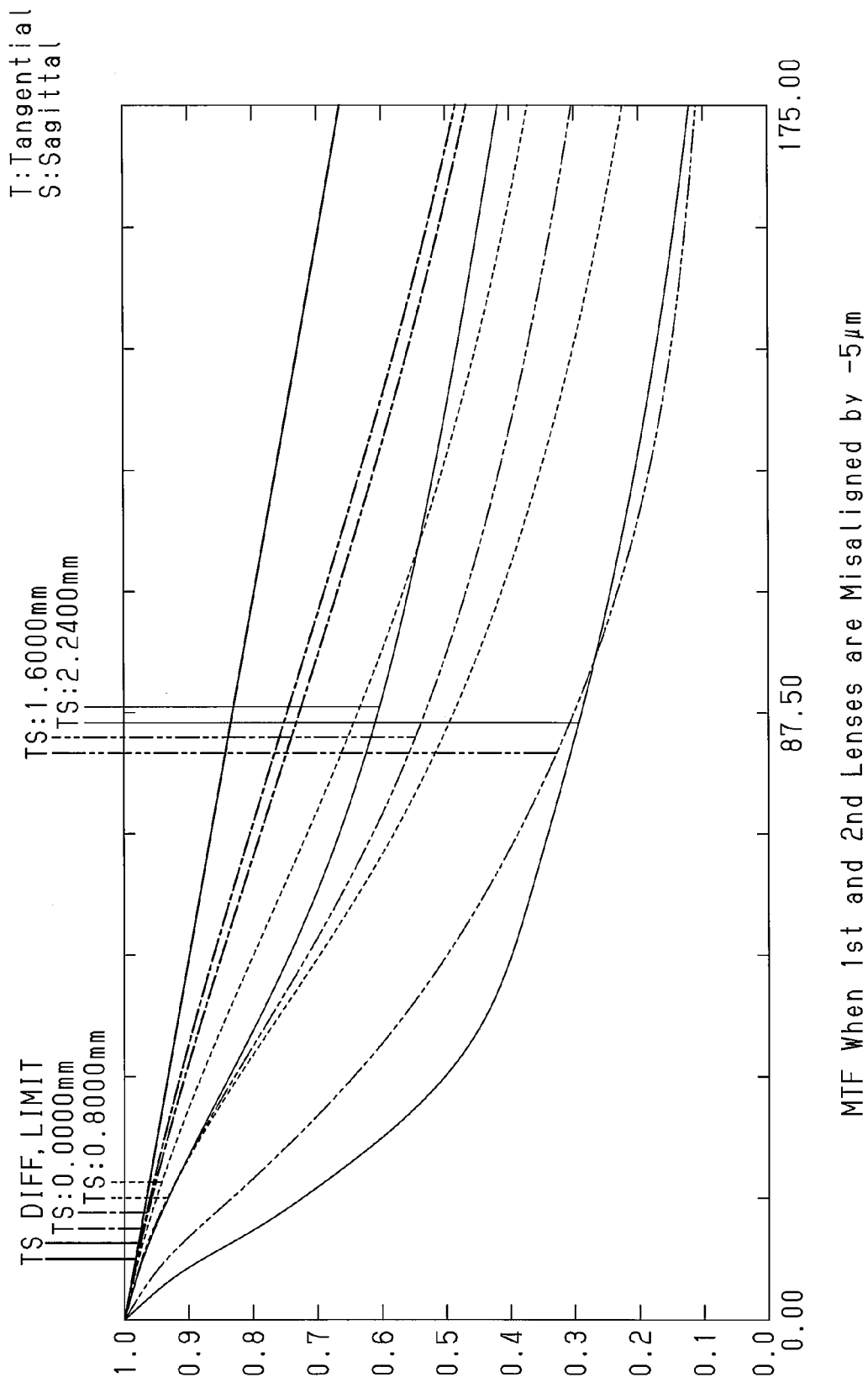
FIG. 42 is a graph showing the transfer function (MTF), which indicates one of the characteristics of the lens unit in comparative example 3, when the first lens and the second lens are downwardly misaligned by 5 μm.
Figure 43:
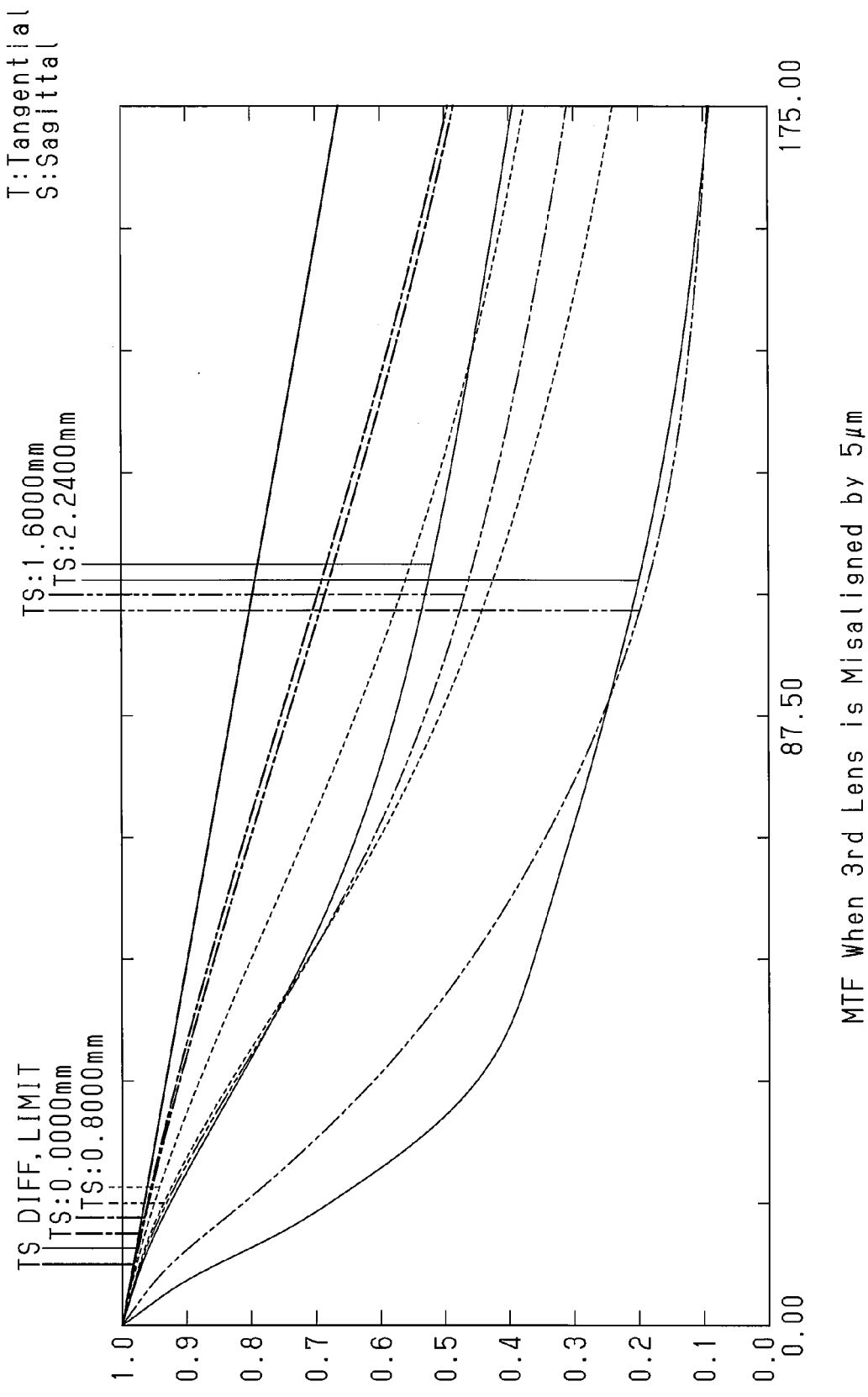
FIG. 43 is a graph showing the transfer function (MTF), which indicates one of the characteristics of the lens unit in comparative example 3, when a third lens is upwardly misaligned by 5 μm.
Figure 44:
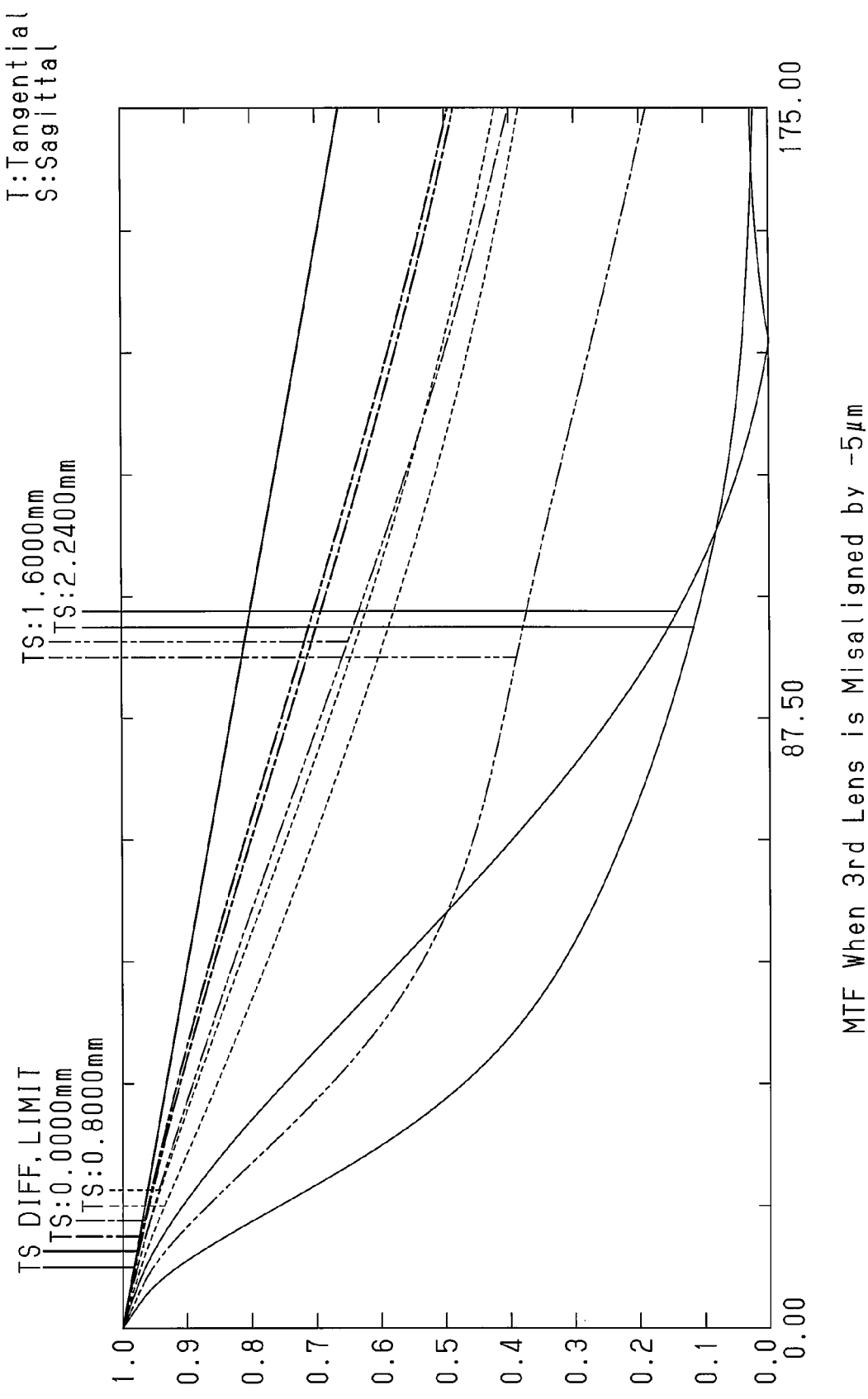
FIG. 44 is a graph showing the transfer function (MTF), which indicates one of the characteristics of the lens unit in comparative example 3, when the third lens is downwardly misaligned by 5 μm.
Figure 45:
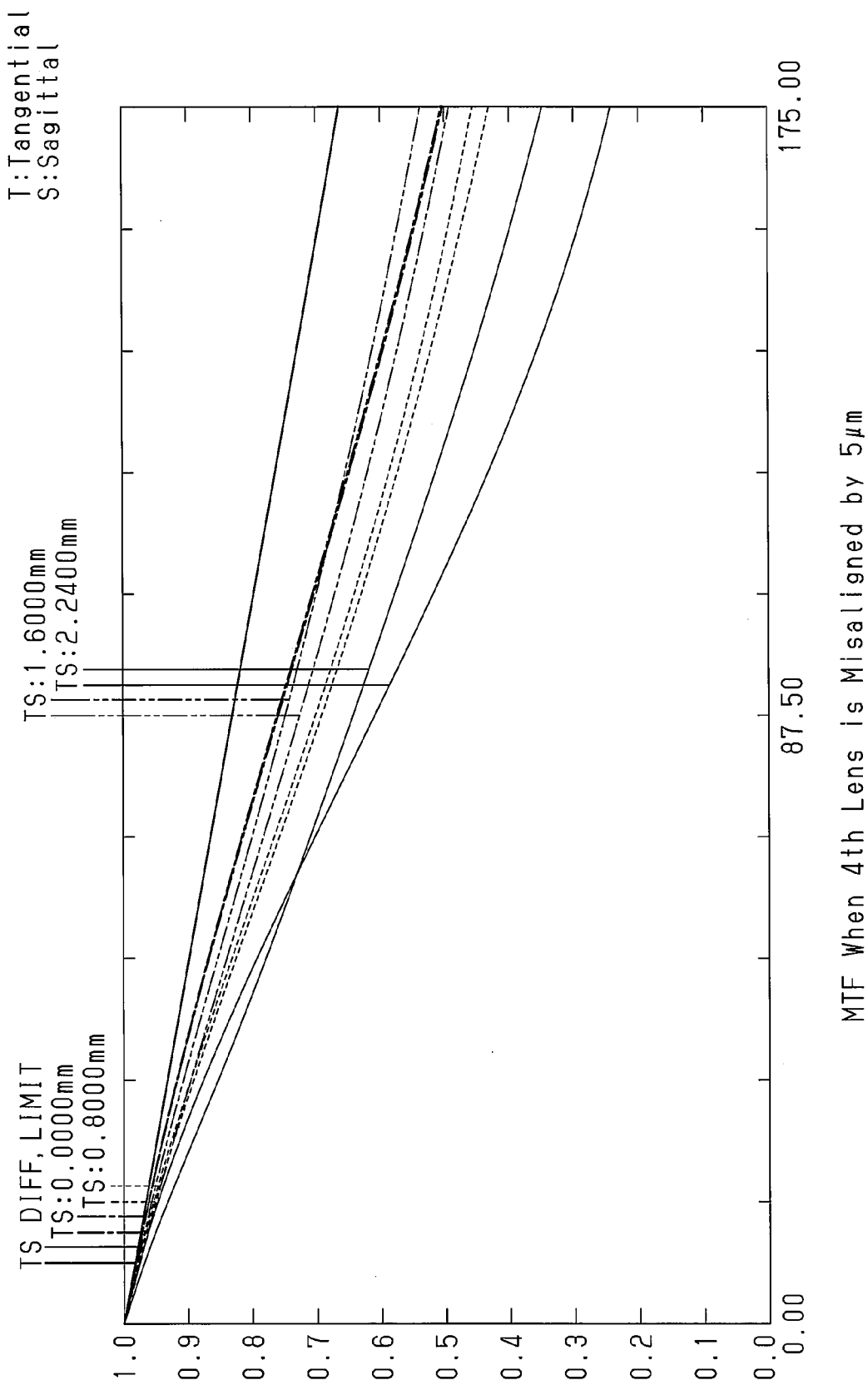
FIG. 45 is a graph showing the transfer function (MTF), which indicates one of the characteristics of the lens unit in comparative example 3, when a fourth lens is upwardly misaligned by 5 μm.
Figure 46:
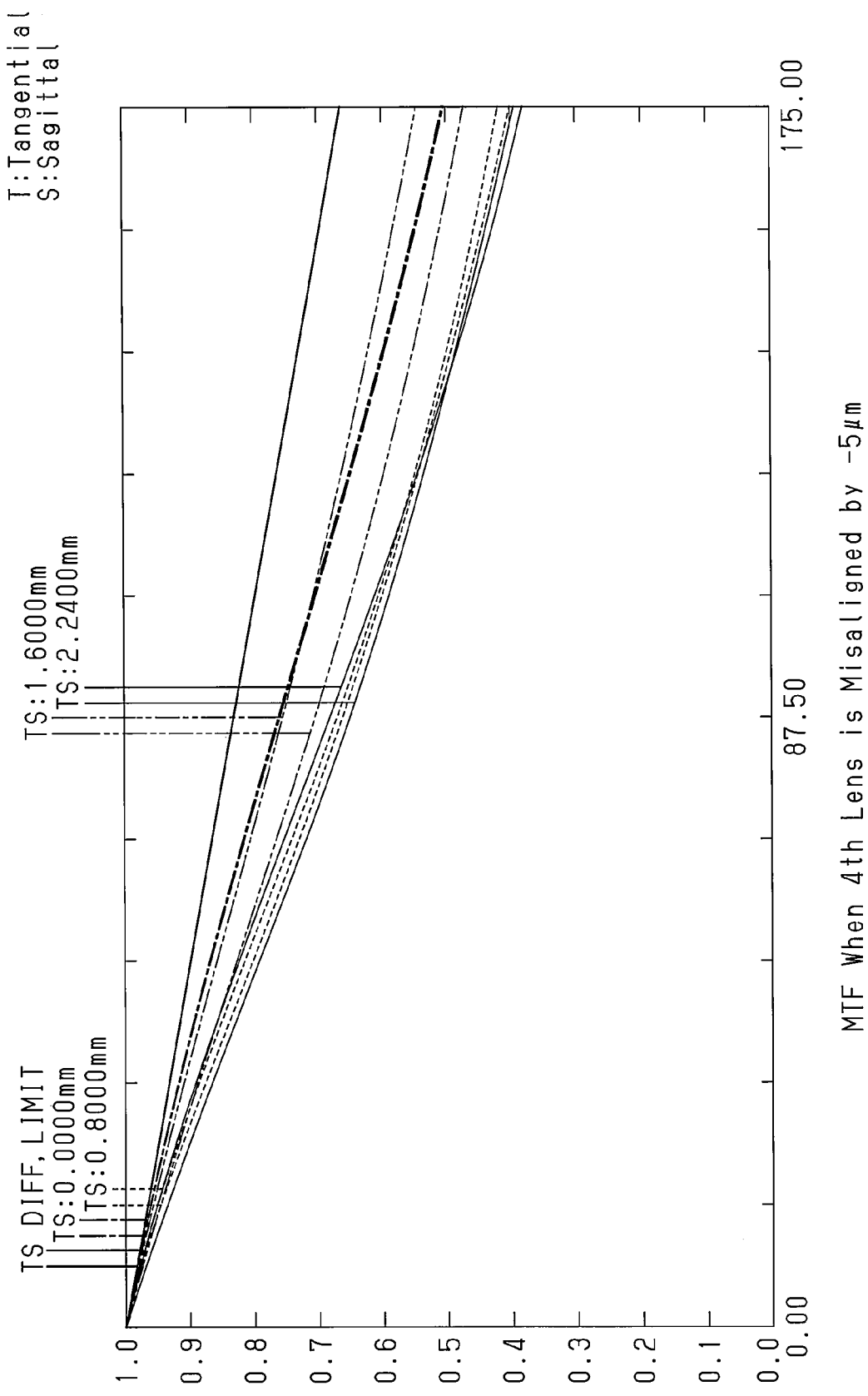
FIG. 46 is a graph showing the transfer function (MTF), which indicates one of the characteristics of the lens unit in comparative example 3, when the fourth lens is downwardly misaligned by 5 μm.

The graph of FIG. 6 showing the vertical aberration in the lens unit of example 1 will now be compared with the graphs of FIGS. 16, 28, and 40 respectively showing the vertical aberration in the lens units of comparative examples 1, 2, and 3. Although the graphs show different shapes, there is not much difference between the graphs at any wavelength, and the vertical aberration in example 1 is suppressed in the same manner as in comparative examples 1 to 3.

As described above, it may be determined that the optical characteristics of the lens unit in example 1 is equivalent to the optical characteristics of the lens units in comparative examples 1 to 3 with regard to each one of the items including the transfer function (MTF), curvature of field, distortion aberration, and vertical aberration.

2. Manufacturing Cost

There is no significant difference between example 1 and comparative examples 1 to 3 in the types and quantity of the components used in the lens units. In such a case, the manufacturing yield greatly affects costs. As described above, as the tolerable range becomes narrower when misalignments occur in the first to fourth lenses 1 to 4, the occurrence rate of defective products increases and lowers the manufacturing yield. The level of influence of such a misalignment will now be evaluated from changes in the transfer function (MTF).

The graphs of FIGS. 7 to 12 show the transfer function (MTF) in a state in which the lenses of the lens unit in example 1 are misaligned by 5 µm in an upward direction (hereinafter described as "5 µm") as viewed in FIG. 3 or misaligned by 5 µm in a downward direction (hereinafter described as "−5 µm") as viewed in FIG. 3. The graphs of FIGS. 17 to 24 show the transfer function (MTF) in a state in which the lenses of the lens unit in comparative example 1 are misaligned by 5 µm or −5 µm. The graphs of FIGS. 29 to 36 show the transfer function (MTF) in a state in which the lenses of the lens unit in comparative example 2 are misaligned by 5 µm or −5 µm. The graphs of FIGS. 41 to 46 show the transfer function (MTF) in a state in which the lenses of the lens unit in comparative example 3 are misaligned by 5 µm or −5 µm.

Comparative example 1, which is of a front stop type and has a four-group, four-lens structure, will now be compared with comparative example 2, which is of a middle stop type and also has a four-group, four-lens structure. More specifically, when comparing FIGS. 17 to 24 with FIGS. 29 to 36, regardless of which one of the lenses is misaligned, the deterioration in the MTF of the lens unit in comparative example 1 is greater than the deterioration in the MTF of the lens unit in comparative example 2. Further, comparative example 3, which is of a front stop type and has a three-group, four-lens structure, will be compared with example 1, which is of a middle stop type and also has a three-group, four-lens structure. More specifically, when comparing FIGS. 41 to 46 with FIGS. 7 to 12, regardless of which one of the lenses is misaligned, the deterioration in the MTF of the lens unit in comparative example 3 is greater than the deterioration in the MTF of the lens unit in example 1. Accordingly, if the lens structures are the same, deterioration in the MTF caused by misalignment is greater for a front stop type lens unit.

In this manner, if the lens structures are the same, the middle stop lens structure employed in the present invention lowers the probability of the production of defective products caused by misalignments of the lenses. This lowers the manufacturing cost.

3. Miniaturization

The entire length of the lens unit in example 1 is 4.07 mm and thus the smallest next to comparative example 3. However, the lens unit of comparative example 3 is of a front stop type and thus cannot sufficiently prevent the production of defective products caused by misalignments. Accordingly, the lens device of example 1, which has a middle stop type four-lens structure that sufficiently prevents the production of defective products caused by misalignments, is optimal for use as a lens device that may be further reduced in size from the prior art.

The present invention is related to a lens unit optimal for use in a compact image capturing device. Thus, the present invention is industrially applicable to a lens unit for a compact camera or a mobile phone incorporating a camera.

It should be apparent to those skilled in the art that the present invention may be embodied in many other specific forms without departing from the spirit or scope of the invention. Particularly, it should be understood that the present invention may be embodied in the following forms.

In the above-described embodiment, each of the first to fourth lenses 1 to 4 is a plastic lens but instead may be a glass lens as long as the same optical characteristics can be maintained. The use of glass lenses increases heat resistance. Further, thermal volume changes are smaller in glass than plastic. This suppresses image deterioration caused by the lens shape that changes in accordance with the temperature.

In the above-described embodiment, the first lens 1 is a plastic lens, and the second lens 2 is molded from a resin on the image side surface 12 of the first lens 1. However, these lenses may have different structures. For example, the first lens 1 may be molded from a resin on the object side surface 21 of the second lens 2. It is only required that the first lens 1 and the second lens 2 form a group of lenses, or a composite lens. This would obtain the same advantages as the above-described embodiment.

The first lens 1 and the second lens 2 may be plastic or glass lenses that are formed independently and then adhered to each other to form a laminated lens. This would obtain the same advantages as the above-described embodiment.

The first lens 1 and the second lens 2 do not have to form a composite lens. The first lens 1 and the second lens 2 may each have a single lens structure, and two lenses having positive power may be arranged at the object side of the aperture stop 5. In this case, the entire length of the lens unit may be reduced while suppressing aberrations. Further, costs may be decreased in comparison to when using a composite lens.

The cover glass 6 does not necessarily have to be arranged between the fourth lens 4 and the CCD image sensor 7 like in the above-described embodiment. For example, a filter or the like that cuts infrared light may be used in lieu of or in addition to the cover glass 6.

In the above-described embodiment, the CCD image sensor 7 is used as the image capturing element. However, other structures may be used for the image capturing element. For example, a CMOS image sensor may be used.

In the above-described embodiment, the CCD image sensor 7 is used as the image capturing element. However, other structures may be used for the image capturing element. For example, an optical film may be used as the image capturing element in an image capturing device for silver salt photographs.

In the preferred embodiment, the lens unit is used in a portable terminal but may also be used in a normal camera or personal computer. Further, the image capturing device may be used not only for capturing still images but also for capturing moving pictures.

The present examples and embodiments are to be considered as illustrative and not restrictive, and the invention is not to be limited to the details given herein, but may be modified within the scope and equivalence of the appended claims.

What is claimed is:

1. A lens unit comprising:
    a first lens having positive power;
    a second lens having positive power;
    an aperture stop;
    a third lens having negative power; and
    a fourth lens;
    wherein the first lens, the second lens, the aperture stop, the third lens, and the fourth lens are arranged adjacent to one another with no other lenses therebetween in order from an object side toward an image side.

2. The lens unit according to claim 1, wherein the fourth lens includes an object side surface and an image side surface, and at least one of the object side surface and the image side surface is aspherical and includes an inflection point.

3. The lens unit according to claim 1, wherein the fourth lens includes an image side surface which is concave at the image side.

4. The lens unit according to claim 1, wherein the third lens is a meniscus lens including an object side surface which is concave at the object side.

5. The lens unit according to claim 1, wherein:
    the second lens includes an image side surface which is concave at the image side; and
    the third lens is a meniscus lens including an object side surface which is concave at the object side.

6. The lens unit according to claim 1, wherein the first lens and the second lens form a composite lens which groups and joins the first and second lens.

7. The lens unit according to claim 6, wherein the composite lens is a molded lens formed by molding one of the first and second lenses on the other one of the first and second lenses.

8. An image capturing device comprising:
    a lens unit including:
        a first lens having positive power;
        a second lens having positive power;
        an aperture stop;
        a third lens having negative power; and
        a fourth lens;
        wherein the first lens, the second lens, the aperture stop, the third lens, and the fourth lens are arranged adjacent to one another with no other lenses therebetween in order from an object side toward an image side.

9. The image capturing device according to claim 8, wherein one of the first and second lenses is molded on the other one of the first and second lenses to group the lenses and form a composite lens.

10. A lens unit comprising:
    a first lens having positive power;
    a second lens having positive power;
    an aperture stop;
    a third lens having negative power; and
    a fourth lens;
    wherein the first lens, the second lens, the aperture stop, the third lens, and the fourth lens are arranged in order from an object side toward an image side;
    wherein the fourth lens includes an object side surface and an image side surface, at least one of the object side and the image side surface is aspherical and includes an inflection point.

11. The lens unit according to claim 10, wherein the first lens and the second lens form a composite lens which groups and joins the first and second lens.

12. The lens unit according to claim 11, wherein the composite lens is a molded lens formed by molding one of the first and second lenses on the other one of the first and second lenses.

13. The lens unit according to claim 10, wherein the fourth lens includes an image side surface which is concave at the image side.

14. The lens unit according to claim 13, wherein:
    the second lens includes an image side surface which is concave at the image side; and
    the third lens is a meniscus lens including an object side surface which is concave at the object side.

* * * * *